(12) United States Patent
Kazmer et al.

(10) Patent No.: US 6,514,440 B1
(45) Date of Patent: Feb. 4, 2003

(54) APPARATUS AND METHOD FOR PURGING INJECTION MOLDING SYSTEM

(75) Inventors: David O. Kazmer, Amherst, MA (US); Mark D. Moss, Boxford, MA (US); Brian Bassett, Gloucester, MA (US); Mark J. Doyle, Newburyport, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

(21) Appl. No.: 09/656,846

(22) Filed: Sep. 7, 2000

Related U.S. Application Data

(63) Continuation-in-part of application No. 09/503,832, filed on Feb. 15, 2000, which is a continuation-in-part of application No. 09/400,533, filed on Sep. 21, 1999, which is a continuation-in-part of application No. 09/063,762, filed on Apr. 21, 1998.
(60) Provisional application No. 60/156,925, filed on Sep. 28, 1999, and provisional application No. 60/152,714, filed on Sep. 7, 1999.

(51) Int. Cl.[7] .............................................. B29C 45/24
(52) U.S. Cl. ..................... 264/39; 264/40.1; 264/328.8; 425/146; 425/225; 425/542
(58) Field of Search ........................ 264/39, 40.1, 40.5, 264/37.33, 37.27, 328.8; 425/145, 146, 149, 161, 225, 542

(56) References Cited

U.S. PATENT DOCUMENTS

| 3,535,742 A | 10/1970 | Marcus |
| 3,780,764 A | 12/1973 | Geist |
| 3,820,928 A | 6/1974 | Lemelson |
| 3,861,841 A | 1/1975 | Hanning |
| 3,952,927 A | 4/1976 | Schaumburg et al. |
| 4,389,002 A | 6/1983 | Devellian et al. |
| 4,500,279 A | 2/1985 | Devellian et al. ........... 425/548 |
| 4,521,179 A | 6/1985 | Gellert |
| 4,588,367 A | 5/1986 | Schad |
| 4,592,711 A | 6/1986 | Capy |
| 4,701,292 A | * 10/1987 | Valyi ........................... 264/255 |
| 4,863,369 A | 9/1989 | Schad et al. |
| 4,931,234 A | * 6/1990 | Schad et al. ................. 264/255 |
| 4,932,854 A | 6/1990 | Matsuda et al. |
| 5,078,589 A | 1/1992 | Osuna-Diaz |
| 5,141,696 A | 8/1992 | Osuna-Diaz |
| 5,149,547 A | 9/1992 | Gill |
| 5,281,374 A | * 1/1994 | Matsuda et al. .......... 264/328.1 |
| 5,288,222 A | 2/1994 | Wieser ........................ 425/190 |

(List continued on next page.)

FOREIGN PATENT DOCUMENTS

| DE | 2034163 | 2/1971 | |
| DE | 2401168 | 7/1975 | |
| DE | 299 09 535 U 1 | 8/1999 | ........... B29C/45/77 |
| EP | 0 911 137 | 4/1999 | ........... B29C/45/16 |
| JP | 58 142833 | 8/1983 | ............. B29F/1/03 |

(List continued on next page.)

OTHER PUBLICATIONS

Translation of DE 299 09 535 5 U 1.
International Search Report, mailed Jun. 22, 2001.

(List continued on next page.)

Primary Examiner—Jill L. Heitbrink
(74) Attorney, Agent, or Firm—Finnegan, Henderson, Farabow, Garrett & Dunner LLP

(57) ABSTRACT

An injection molding apparatus, system and method are provided in which the rate of material flow during the injection cycle is controlled. According to one preferred embodiment, a method of open-mold purging is provided in an injection molding system including a manifold to receive material injected from an injection molding machine. The method includes the steps of selecting a target purge pressure; injecting material from the injection molding machine into the manifold; and controlling the purge pressure to substantially track the target purge pressure, wherein the purge pressure is controllable independently from the injection molding machine pressure.

10 Claims, 33 Drawing Sheets

U.S. PATENT DOCUMENTS

| | | | |
|---|---|---|---|
| 5,356,576 | A | 10/1994 | Fischbach |
| 5,389,315 | A | 2/1995 | Yabushita |
| 5,492,467 | A | 2/1996 | Hume et al. |
| 5,545,028 | A | 8/1996 | Hume et al. |
| 5,554,395 | A | 9/1996 | Hume et al. |
| 5,556,582 | A | 9/1996 | Kazmer |
| 5,601,773 | A * | 2/1997 | Schmidt et al. ............. 264/255 |
| 5,674,439 | A | 10/1997 | Hume et al. |
| 5,871,786 | A | 2/1999 | Hume et al. |
| 5,885,624 | A * | 3/1999 | Katsuta et al. ............. 425/149 |
| 5,885,628 | A | 3/1999 | Swenson et al. |
| 5,894,025 | A | 4/1999 | Lee et al. |
| 5,916,605 | A | 6/1999 | Swenson et al. |
| 5,948,448 | A | 9/1999 | Schmidt |
| 5,948,450 | A | 9/1999 | Swenson et al. |
| 5,980,237 | A | 11/1999 | Swenson et al. |
| 6,000,831 | A | 12/1999 | Triplett |
| 6,027,328 | A | 2/2000 | Herbst |
| 6,062,840 | A | 5/2000 | Lee et al. .................... 425/130 |
| 6,254,377 | B1 | 7/2001 | Kazmer et al. |
| 6,261,075 | B1 | 7/2001 | Lee et al. .................... 425/130 |
| 6,261,084 | B1 | 7/2001 | Schmidt .................... 425/564 |
| 6,287,107 | B1 | 9/2001 | Kazmer et al. ............. 425/562 |
| 6,294,122 | B1 | 9/2001 | Moss et al. ............. 264/328.9 |
| 6,309,208 | B1 | 10/2001 | Kazmer et al. ............. 425/562 |
| 6,343,921 | B1 | 2/2002 | Kazmer et al. ............. 425/145 |
| 6,343,922 | B1 | 2/2002 | Kazmer et al. ............. 425/145 |
| 6,361,300 | B1 | 3/2002 | Kazmer ...................... 425/145 |
| 6,419,870 | B1 | 7/2002 | Lee et al. ................. 264/328.1 |
| 6,436,320 | B1 | 8/2002 | Kazmer et al. ............. 264/40.1 |

FOREIGN PATENT DOCUMENTS

| | | | |
|---|---|---|---|
| JP | 60-212321 | 10/1985 | |
| JP | 61-63428 | 4/1986 | |
| WO | WO 97/43105 | 11/1997 | |
| WO | 98/56564 | 12/1998 | ........... B29C/45/80 |
| WO | WO 99/54109 | 10/1999 | |
| WO | 99/54109 | 10/1999 | ........... B29C/45/30 |
| WO | WO 99/59795 | 11/1999 | |
| WO | 01/08462 | 2/2001 | |

OTHER PUBLICATIONS

Patent Abstracts of Japan, Publication No. 58 142833, published Aug. 25, 1983, vol. 10, No. 66: 1 pg.

Patent Abstracts of Japan, Publication No. 60 212321, published Oct. 24, 1985, vol. 10, No. 66: 1 pg.

Patent Abstracts of Japan, Publication No. 61 063428, published Apr. 1, 1986, vol. 10, No. 231: 1 pg.

Kazmer, et al., "Multi–Cavity Pressure Control in the Filling and Packing Stages of the Injection Molding Process," *Polymer Engineering and Science*, 11/97, vol. 37, No. 11, pp. 1865–1879.

Kazmer, et al., "The Process Capability of Multi–Cavity Pressure Control for the Injection Molding Process," *Polymer Engineering and Science*, 11/97, vol. 37, No. 11, pp. 1880–1895.

Kazmer, "Dynamic Feed Control: A New Method for Injection Molding of High Quality Plastic Parts," A Dissertation submitted to the Design Division of Mechanical Engineering and the Committee on Graduate Studies in Partial Fulfillment of the Requirements for the Degree of Doctor of Philosophy in Mechanical Engineering, Jun. 1995.

Translation—Japanese Unexamined Patent Application No. 61–63428.

Abstract—Japanese Publication No. 2000141439, May 23, 2000, Kobe Steel Ltd., "Injection Compression Molding Device".

Abstract—Japanese Publication No. 63166511, Jul. 9, 1988, Nissei Palstics Ind. Co., "Injection Molding.".

Abstract—Japanese Publication No. 61–63428, Apr. 1, 1986, Nippon Denso Co., Ltd., "Mold Assembly.".

* cited by examiner

APPARATUS AND METHOD FOR PURGING INJECTION MOLDING SYSTEM

RELATED APPLICATIONS

This application is a Continuation-in-Part under 35 U.S.C. §120 of U.S. application Ser. No. 09/503,832, filed Feb. 15, 2000 which is a Continuation-in-Part of U.S. application Ser. No. 09/400,533. entitled "MANIFOLD SYSTEM HAVING FLOW CONTROL", filed Sep. 21, 1999, which is a Continuation-in-Part of U.S. application Ser. No 09/063, 762, entitled "MANIFOLD SYSTEM HAVING FLOW CONTROL" filed Apr. 21, 1998, and claims priority under 35 U.S.C. §119(e) to Provisional Application Ser. No. 60/156,925, entitled "DYNAMIC FEED CONTROL" filed Sep. 28, 1999, and Provisional Application Ser. No. 60/152, 714, entitled "DYNISCO DYNAMIC FEED CONTROL SYSTEM OPEN-MOLD PURGE" filed Sep. 7, 2000.

FIELD OF THE INVENTION

This invention relates to injection of pressurized materials through a manifold, such as injection molding of plastic melt in a hot runner system. More specifically, this invention relates to an improved injection molding hot runner system in which the rate of melt flow is controlled through the gate during an injection molding cycle.

DESCRIPTION OF THE RELATED ART

U.S. Pat. No. 5,556,582 discloses a multi-gate single cavity system in which the rate of melt flow through the individual gates is controlled independently via a control system according to specific target process conditions. This system enables the weld line of the part (the section of the part in which the melt from one gate meets the melt from another gate) to be selectively located. It also enables the shape of the weld line to be altered to form a stronger bond.

The '582 patent discloses controlling the rate of melt flow with a tapered valve pin at the gate to the mold cavity. It also discloses placing a pressure transducer inside the mold cavity. Placing the pressure transducer inside the mold cavity can result in the pressure transducer sensing pressure spikes which can occur when the valve pin is closed. A pressure spike sensed by the transducer can cause an unintended response from the control system, and result in a less precise control of the melt flow than desired.

The control system disclosed in the '582 patent uses the variables of valve pin position and cavity pressure to determine what position the valve pin should be in. Thus, the algorithm performed by the control system in the '582 patent utilizes two variables to control the rate of melt flow into the cavity.

SUMMARY OF THE INVENTION

An injection molding apparatus, system and method are provided in which the rate of material flow during the injection cycle is controlled. According to one preferred embodiment, a method of open-mold purging is provided in an injection molding system including a manifold to receive material injected from an injection molding machine. The method includes the steps of selecting a target purge pressure; injecting material from the injection molding machine into the manifold; and controlling the purge pressure to substantially track the target purge pressure, wherein the purge pressure is controllable independently from the injection molding machine pressure.

According to another illustrative embodiment, an injection molding system is provided that includes a mold, an injection molding machine, a manifold, and a controller used to control open mold purging of the manifold. The controller controls a pressure of material used to purge the manifold, independently from the injection molding machine injection pressure.

According to another illustrative embodiment, an injection molding system is provided that includes a manifold to deliver material into a mold that is injected into the manifold from an injection molding machine; and a controller used to control open mold purging of the manifold, the controller to control a pressure of material used to purge the manifold, independently from the injection molding machine injection pressure.

DETAILED DESCRIPTION

Figure 1:
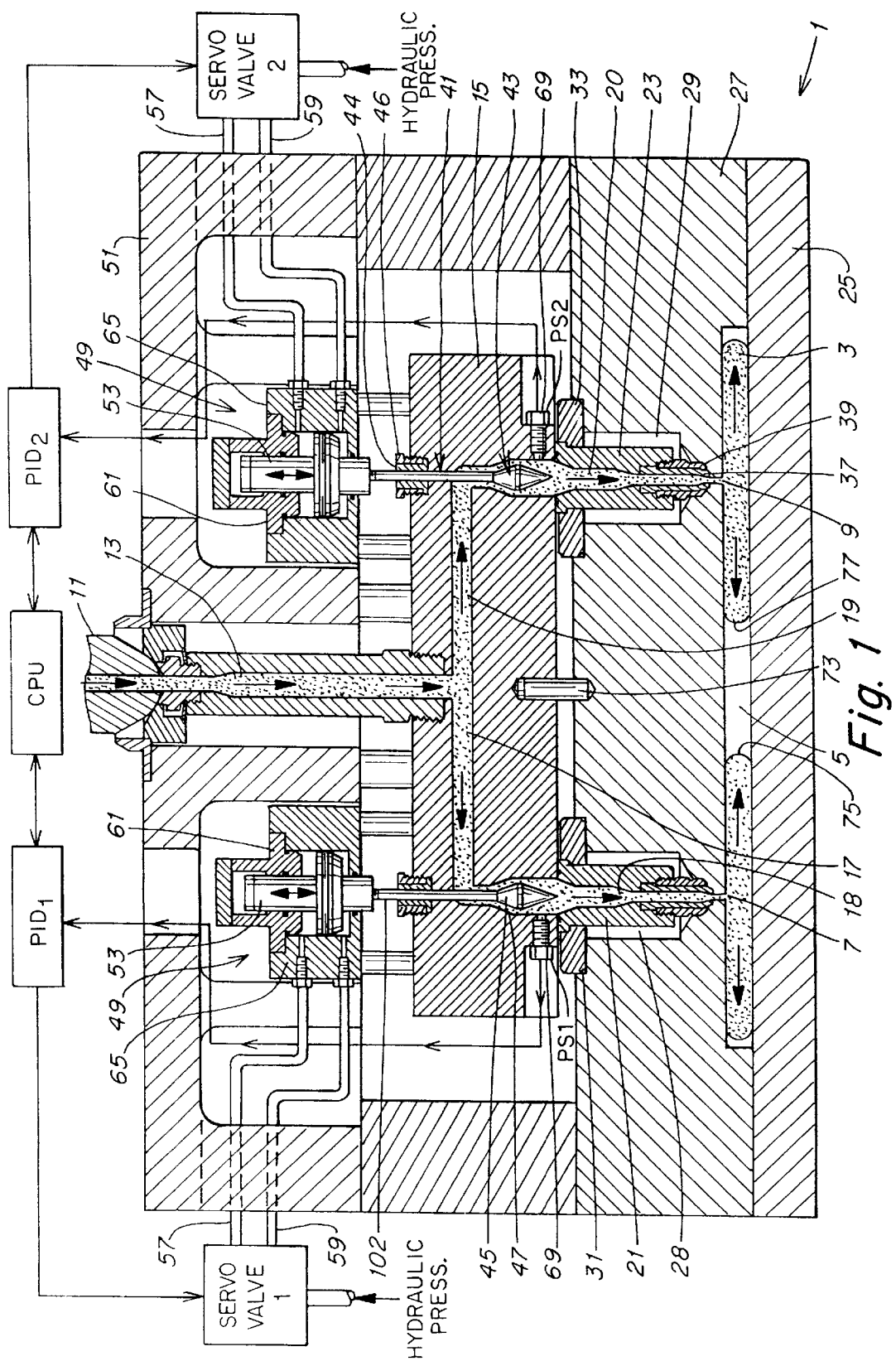
FIG. 1 is a partially schematic cross-sectional view of an injection molding system according to one embodiment of the present invention.
Figure 2:
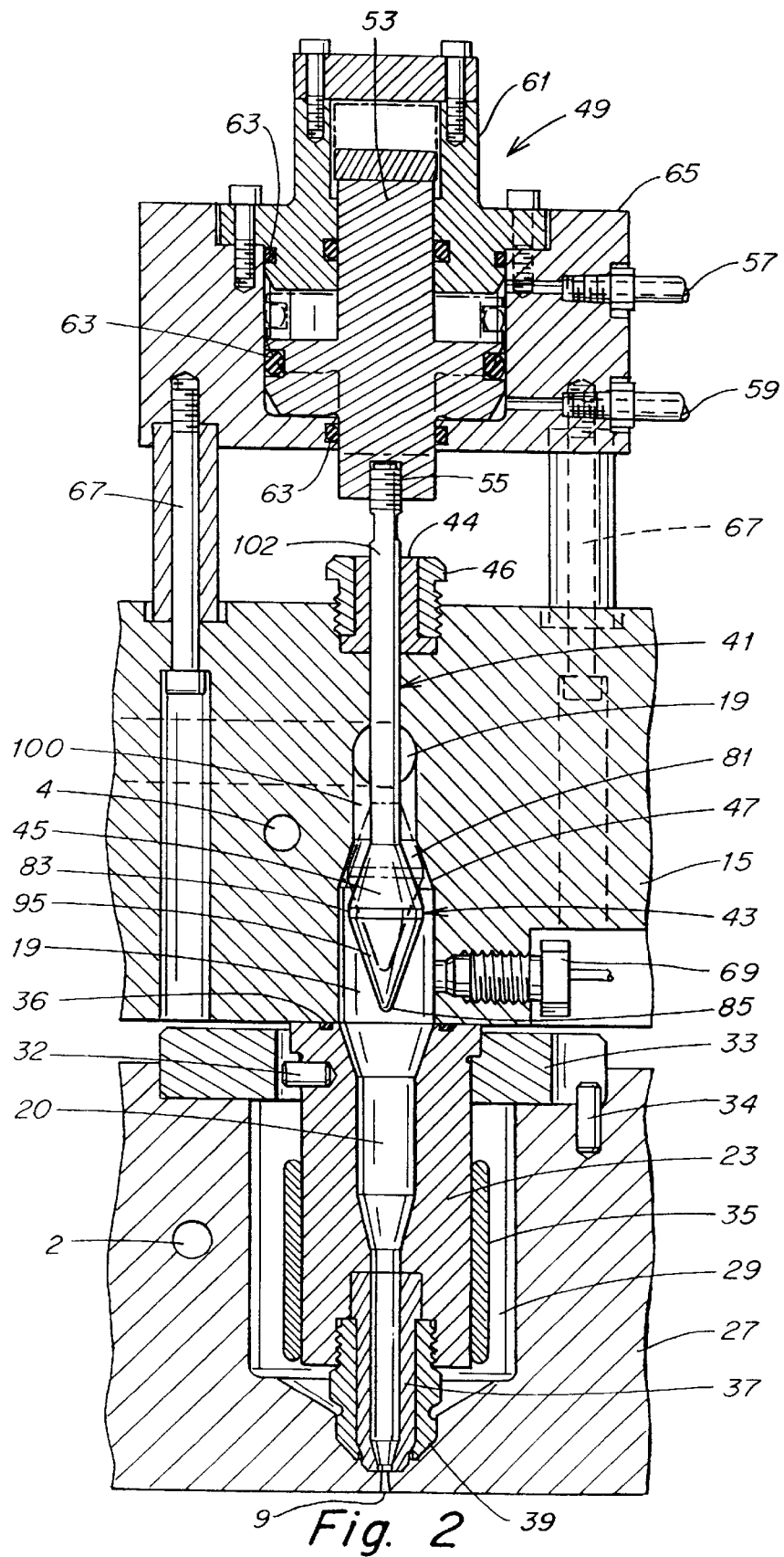
FIG. 2 is an enlarged fragmentary cross-sectional view of one side of the injection molding system of FIG. 1.

FIGS. 1–2 show one embodiment of the injection molding system according to the present invention. The injection molding system 1 is a multi-gate single cavity system in which melt material 3 is injected into a cavity 5 from gates 7 and 9. Melt material 3 is injected from an injection molding machine 11 through an extended inlet 13 and into a manifold 15. Manifold 15 distributes the melt through channels 17 and 19. Although a hot runner system is shown in which plastic melt is injected, the invention is applicable to other types of injection systems in which it is useful to control the rate at which a material (e.g., metallic or composite materials) is delivered to a cavity.

Melt is distributed by the manifold through channels 17 and 19 and into bores 18 and 20 of nozzles 21 and 23, respectively. Melt is injected out of nozzles 21 and 23 and into cavity 5 (where the part is formed) which is formed by mold plates 25 and 27. Although a multi-gate single-cavity system is shown, the invention is not limited to this type of system, and is also applicable to, for example, multi-cavity systems, as discussed in greater detail below.

The injection nozzles 21 and 23 are received in respective wells 28 and 29 formed in the mold plate 27. The nozzles 21 and 23 are each seated in support rings 31 and 33. The support rings serve to align the nozzles with the gates 7 and 9 and insulate the nozzles from the mold. The manifold 15 sits atop the rear end of the nozzles and maintains sealing contact with the nozzles via compression forces exerted on the assembly by clamps (not shown) of the injection molding machine. An O-ring 36 is provided to prevent melt leakage between the nozzles and the manifold. A dowel 73 centers the manifold on the mold plate 27. Dowels 32 and 34 prevent the nozzle 23 and support ring 33, respectively, from rotating with respect to the mold 27.

The nozzles also include a heater 35 (FIG. 2). Although an electric band heater is shown, other heaters may be used. Furthermore, heat pipes (for example those disclosed in U.S. Pat. No. 4,389,002) may be disposed in each nozzle and used alone or in conjunction with heater 35. The heater is used to maintain the melt material at its processing temperature up to the gates 7 and 9. The nozzles 21 and 23 also include an insert 37 and a tip 39. The insert can be made of a material (for example beryllium copper) having high thermal conductivity in order to maintain the melt at its processing temperature up to the gate by imparting heat to the melt from the heater 35. The tip 39 is used to form a seal with the mold plate 27 and is preferably a material (for example titanium alloy or stainless steel) having low thermal conductivity so as to reduce heat transfer from the nozzle to the mold.

A valve pin 41 having a head 43 is used to control the rate of flow of the melt material to the respective gates 7 and 9. The valve pin reciprocates through the manifold. A valve pin bushing 44 is provided to prevent melt from leaking along stem 102 of the valve pin. The valve pin bushing is held in place by a threadably mounted cap 46. The valve pin is opened at the beginning of the injection cycle and closed at the end of the cycle. During the cycle, the valve pin can assume intermediate positions between the fully open and closed positions, in order to decrease or increase the rate of flow of the melt. The head includes a tapered portion 45 that forms a gap 81 with a surface 47 of the bore 19 of the manifold. Increasing or decreasing the size of the gap by displacing the valve pin correspondingly increases or decreases the flow of melt material to the gate. When the valve pin is closed the tapered portion 45 of the valve pin head contacts and seals with the surface 47 of the bore of the manifold.

FIG. 2 shows the head of the valve pin in a Phantom dashed line in the closed position and a solid line in the fully opened position in which the melt is permitted to flow at a maximum rate. To reduce the flow of melt, the pin is retracted away from the gate by an actuator 49, to thereby decrease the width of the gap 81 between the valve pin and the bore 19 of the manifold.

The actuator 49 (for example, the type disclosed in application Ser. No. 08/874,962) is mounted in a clamp plate 51 which covers the injection molding system 1. The actuator 49 is a hydraulic actuator, however, pneumatic or electronic actuators can be used. The actuator 49 includes a hydraulic circuit that includes a movable piston 53 in which the valve pin 41 is threadably mounted at 55. Thus, as the piston 53 moves, the valve pin 41 moves with it. The actuator 49 includes hydraulic lines 57 and 59 which are controlled by servo valves 1 and 2. Hydraulic line 57 is energized to move the valve pin 41 toward the gate to the open position, and hydraulic line 59 is energized to retract the valve pin away from the gate toward the close position. An actuator cap 61 limits longitudinal movement in the vertical direction of the piston 53. O-rings 63 provide respective seals to prevent hydraulic fluid from leaking out of the actuator. The actuator body 65 is mounted to the manifold via screws 67.

A pressure transducer 69 is used to sense the pressure in the manifold bore 19 downstream of the valve pin head 43. In operation, the conditions sensed by the pressure transducer 69 associated with each nozzle are fed back to a control system that includes controllers PID 1 and PID 2 and a CPU shown schematically in FIG. 1. The CPU executes a PID (proportional, integral, derivative) algorithm which compares the sensed pressure (at a given time) from the pressure transducer to a programmed target pressure (for the given time). The CPU instructs the PID controller to adjust the valve pin using the actuator 49 in order to mirror the target pressure for that given time. In this way a programmed target pressure profile for an injection cycle for a particular part for each gate 7 and 9 can be followed.

Although in the disclosed embodiment the sensed condition is pressure, other sensed conditions can be used which relate to melt flow rate. For example, the position of the valve pin or the load on the valve pin could be the sensed condition. If so, a position sensor or load sensor, respectively, could be used to feed back the sensed condition to the PID controller. In the same manner as explained above, the CPU would use a PID algorithm to compare the sensed condition to a programmed target position profile or load profile for the particular gate to the mold cavity, and adjust the valve pin accordingly.

Melt flow rate is directly related to the pressure sensed in bore 19. Thus, using the controllers PID 1 and PID 2, the rate at which the melt flows into the gates 7 and 9 can be adjusted during a given injection molding cycle, according to the desired pressure profile. The pressure (and rate of melt flow) is decreased by retracting the valve pin and decreasing the width of the gap 81 between the valve pin and the manifold bore, while the pressure (and rate of melt flow) is increased by displacing the valve pin toward the gate 9, and increasing the width of the gap 81. The PID controllers adjust the position of the actuator piston 51 by sending instructions to servo valves 1 and 2.

By controlling the pressure in a single cavity system (as shown in FIG. 1) it is possible to adjust the location and shape of the weld line formed when melt flow 75 from gate 7 meets melt flow 77 from gate 9 as disclosed in U.S. Pat. No. 5,556,582. However, the invention also is useful in a multi-cavity system. In a multi-cavity system the invention can be used to balance fill rates and packing profiles in the respective cavities. This is useful, for example, when molding a plurality of like parts in different cavities. In such a system, to achieve a uniformity in the parts, the fill rates and packing profiles of the cavities should be as close to identical as possible. Using the same programmed pressure profile for each nozzle, unpredictable fill rate variations from cavity to cavity are overcome, and consistently uniform parts are produced from each cavity.

Another advantage of the present invention is seen in a multi-cavity system in which the nozzles are injecting into cavities which form different sized parts that require different fill rates and packing profiles. In this case, different pressure profiles can be programmed for each respective controller of each respective cavity. Still another advantage is when the size of the cavity is constantly changing, i.e., when making different size parts by changing a mold insert in which the part is formed. Rather than change the hardware (e.g., the nozzle) involved in order to change the fill rate and packing profile for the new part, a new program is chosen by the user corresponding to the new part to be formed.

The embodiment of FIGS. 1 and 2 has the advantage of controlling the rate of melt flow away from the gate inside manifold 15 rather than at the gates 7 and 9. Controlling the melt flow away from the gate enables the pressure transducer to be located away from the gate (in FIGS. 1–5). In this way, the pressure transducer does not have to be placed inside the mold cavity, and is not susceptible to pressure spikes which can occur when the pressure transducer is located in the mold cavity or near the gate. Pressure spikes in the mold cavity result from the valve pin being closed at the gate. This pressure spike could cause an unintended response from the control system, for example, an opening of the valve pin to reduce the pressure when the valve pin should be closed.

Avoidance of the effects of a pressure spike resulting from closing the gate to the mold makes the control system behave more accurately and predictably. Controlling flow away from the gate enables accurate control using only a single sensed condition (e.g., pressure) as a variable. The '582 patent disclosed the use of two sensed conditions (valve position and pressure) to compensate for an unintended response from the pressure spike. Sensing two conditions resulted in a more complex control algorithm (which used two variables) and more complicated hardware (pressure and position sensors).

Another advantage of controlling the melt flow away from the gate is the use of a larger valve pin head 43 than would be used if the valve pin closed at the gate. A larger valve pin head can be used because it is disposed in the manifold in which the melt flow bore 19 can be made larger to accommodate the larger valve pin head. It is generally undesirable to accommodate a large size valve pin head in the gate area within the end of the nozzle 23, tip 39 and insert 37. This is because the increased size of the nozzle, tip and insert in the gate area could interfere with the construction of the mold, for example, the placement of water lines within the mold which are preferably located close to the gate. Thus, a larger valve pin head can be accommodated away from the gate.

Figure 3:
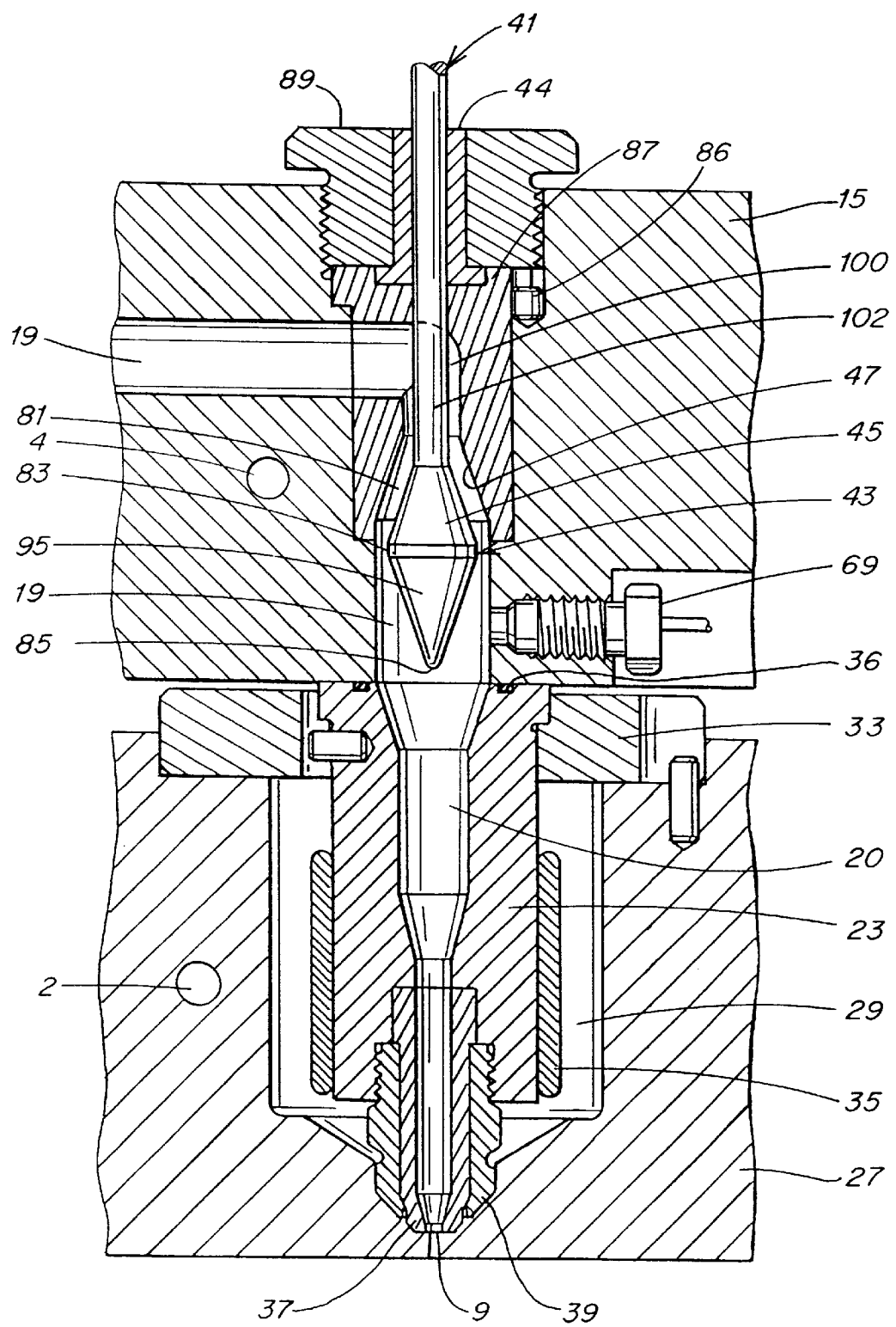
FIG. 3 is an enlarged fragmentary cross-sectional view of an alternative embodiment of a system similar to FIG. 1, in which a plug is used for easy removal of the valve pin.

The use of a larger valve pin head enables the use of a larger surface 45 on the valve pin head and a larger surface 47 on the bore to form the control gap 81. The more "control" surface (45 and 47) and the longer the "control" gap (81)—the more precise control of the melt flow rate and pressure can be obtained because the rate of change of melt flow per movement of the valve pin is less. In FIGS. 1–3 the size of the gap and the rate of melt flow is adjusted by adjusting the width of the gap, however, adjusting the size of the gap and the rate of material flow can also be accomplished by changing the length of the gap, i.e., the longer the gap the more flow is restricted. Thus, changing the size of the gap and controlling the rate of material flow can be accomplished by changing the length or width of the gap.

The valve pin head includes a middle section 83 and a forward cone shaped section 95 which tapers from the middle section to a point 85. This shape assists in facilitating uniform melt flow when the melt flows past the control gap 81. The shape of the valve pin also helps eliminates dead spots in the melt flow downstream of the gap 81.

FIG. 3 shows another aspect in which a plug 87 is inserted in the manifold 15 and held in place by a cap 89. A dowel 86 keeps the plug from rotating in the recess of the manifold that the plug is mounted. The plug enables easy removal of the valve pin 41 without disassembling the manifold, nozzles and mold. When the plug is removed from the manifold, the valve pin can be pulled out of the manifold where the plug was seated since the diameter of the recess in the manifold that the plug was in is greater than the diameter of the valve pin head at its widest point. Thus, the valve pin can be easily replaced without significant downtime.

Figure 4:
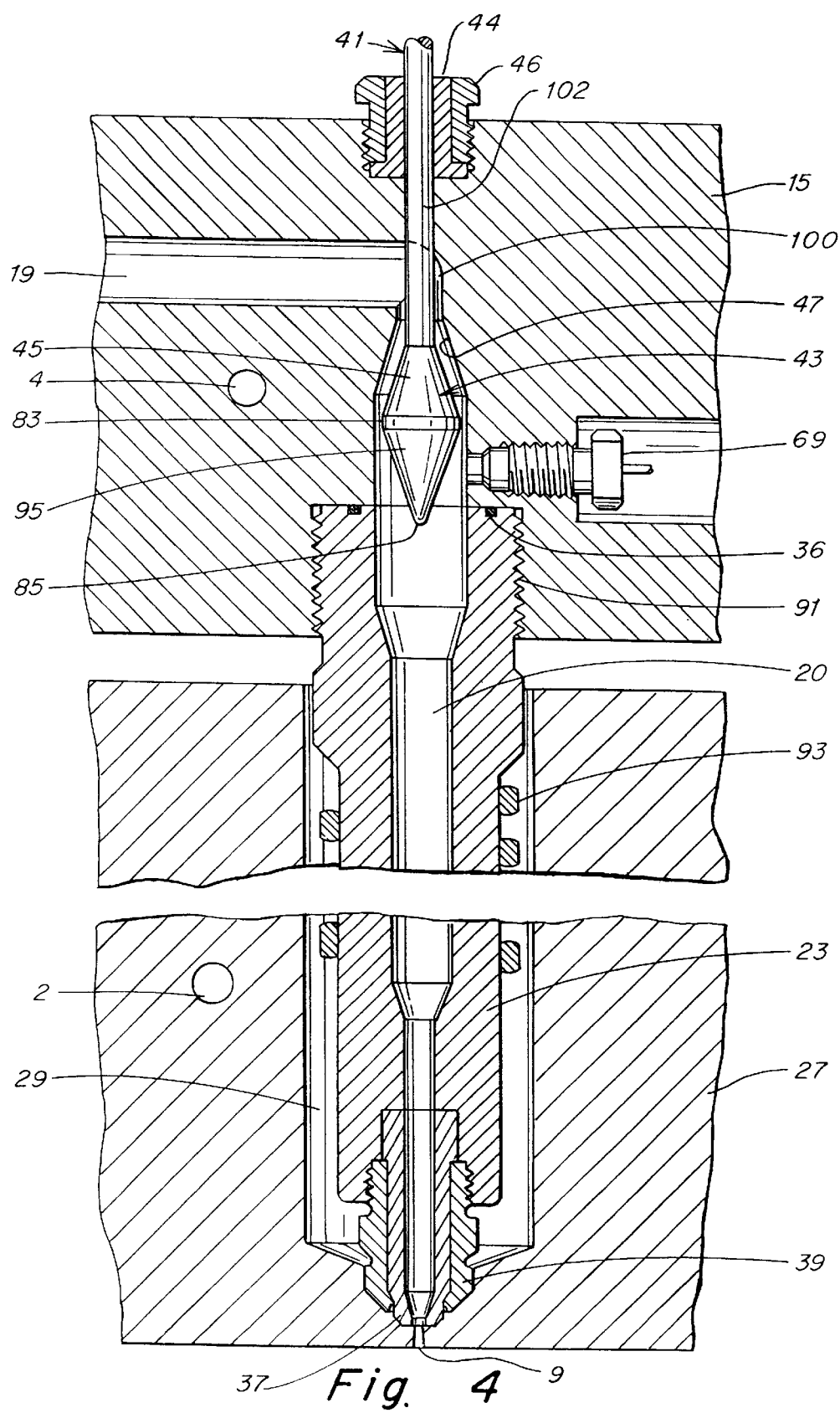
FIG. 4 is an enlarged fragmentary cross-sectional view of an alternative embodiment of a system similar to FIG. 1, in which a threaded nozzle is used.
Figure 5:
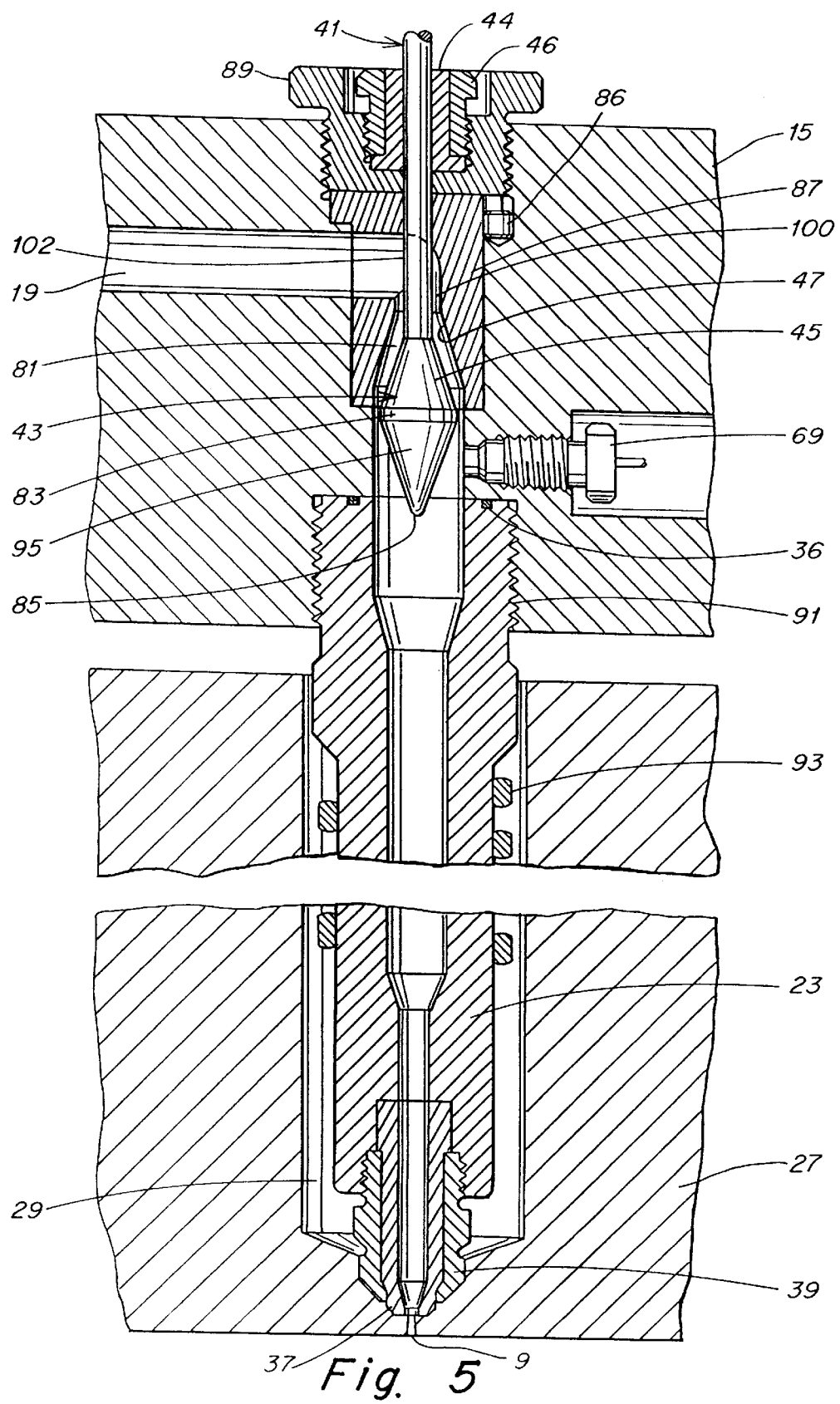
FIG. 5 is a view similar to FIG. 4, showing an alternative embodiment in which a plug is used for easy removal of the valve pin.

FIGS. 4 and 5 show additional alternative embodiments of the invention in which a threaded nozzle style is used instead of a support ring nozzle style. In the threaded nozzle style, the nozzle 23 is threaded directly into manifold 15 via threads 91. Also, a coil heater 93 is used instead of the band heater shown in FIGS. 1–3. The threaded nozzle style is advantageous in that it permits removal of the manifold and nozzles (21 and 23) as a unitary element. There is also less of a possibility of melt leakage where the nozzle is threaded on the manifold. The support ring style (FIGS. 1–3) is advantageous in that one does not need to wait for the manifold to cool in order to separate the manifold from the nozzles. FIG. 5 also shows the use of the plug 87 for convenient removal of valve pin 41.

Figure 6:
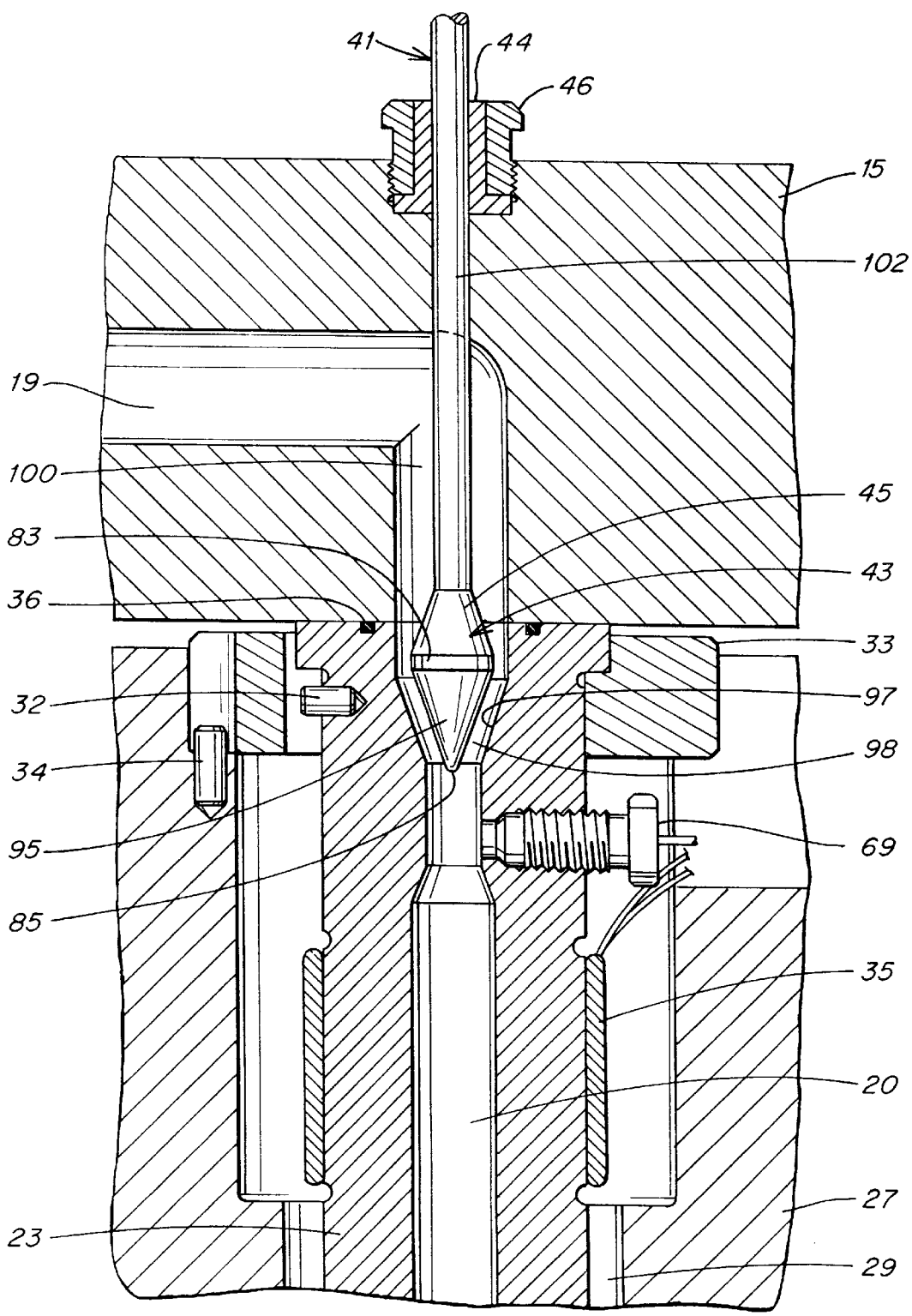
FIG. 6 shows a fragmentary cross-sectional view of a system similar to FIG. 1, showing an alternative embodiment in which a forward shut-off is used.
Figure 7:
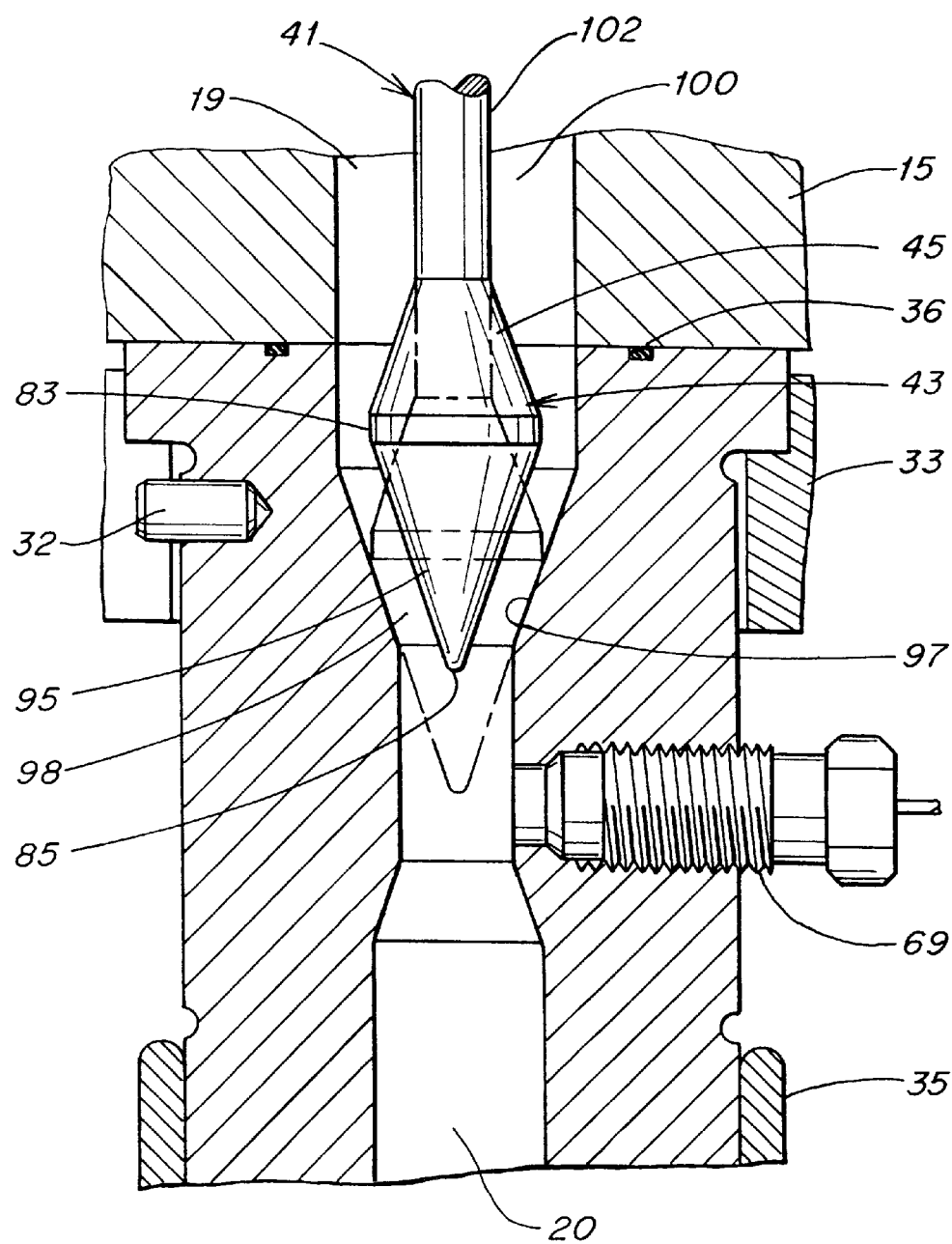
FIG. 7 shows an enlarged fragmentary view of the embodiment of FIG. 6, showing the valve pin in the open and closed positions, respectively.

FIGS. 6–10 show an alternative embodiment of the invention in which a "forward" shutoff is used rather than a retracted shutoff as shown in FIGS. 1–5. In the embodiment of FIGS. 6 and 7, the forward cone-shaped tapered portion 95 of the valve pin head 43 is used to control the flow of melt with surface 97 of the inner bore 20 of nozzle 23. An advantage of this arrangement is that the valve pin stem 102 does not restrict the flow of melt as in FIGS. 1–5. As seen in FIGS. 1–5, the clearance 100 between the stem 102 and the bore 19 of the manifold is not as great as the clearance 100 in FIGS. 6 and 7. The increased clearance 100 in FIGS. 6–7 results in a lesser pressure drop and less shear on the plastic.

In FIGS. 6 and 7 the control gap 98 is formed by the front cone-shaped portion 95 and the surface 97 of the bore 20 of the rear end of the nozzle 23. The pressure transducer 69 is located downstream of the control gap—thus, in FIGS. 6 and 7, the nozzle is machined to accommodate the pressure transducer as opposed to the pressure transducer being mounted in the manifold as in FIGS. 1–5.

FIG. 7 shows the valve pin in solid lines in the open position and Phantom dashed lines in the closed position. To restrict the melt flow and thereby reduce the melt pressure, the valve pin is moved forward from the open position towards surface 97 of the bore 20 of the nozzle which reduces the width of the control gap 98. To increase the flow of melt the valve pin is retracted to increase the size of the gap 98.

The rear 45 of the valve pin head 43 remains tapered at an angle from the stem 102 of the valve pin 41. Although the surface 45 performs no sealing function in this embodiment, it is still tapered from the stem to facilitate even melt flow and reduce dead spots.

As in FIGS. 1–5, pressure readings are fed back to the control system (CPU and PID controller), which can accordingly adjust the position of the valve pin 41 to follow a target pressure profile. The forward shut-off arrangement shown in FIGS. 6 and 7 also has the advantages of the embodiment shown in FIGS. 1–5 in that a large valve pin head 43 is used to create a long control gap 98 and a large control surface 97. As stated above, a longer control gap and greater control surface provides more precise control of the pressure and melt flow rate.

Figure 8:
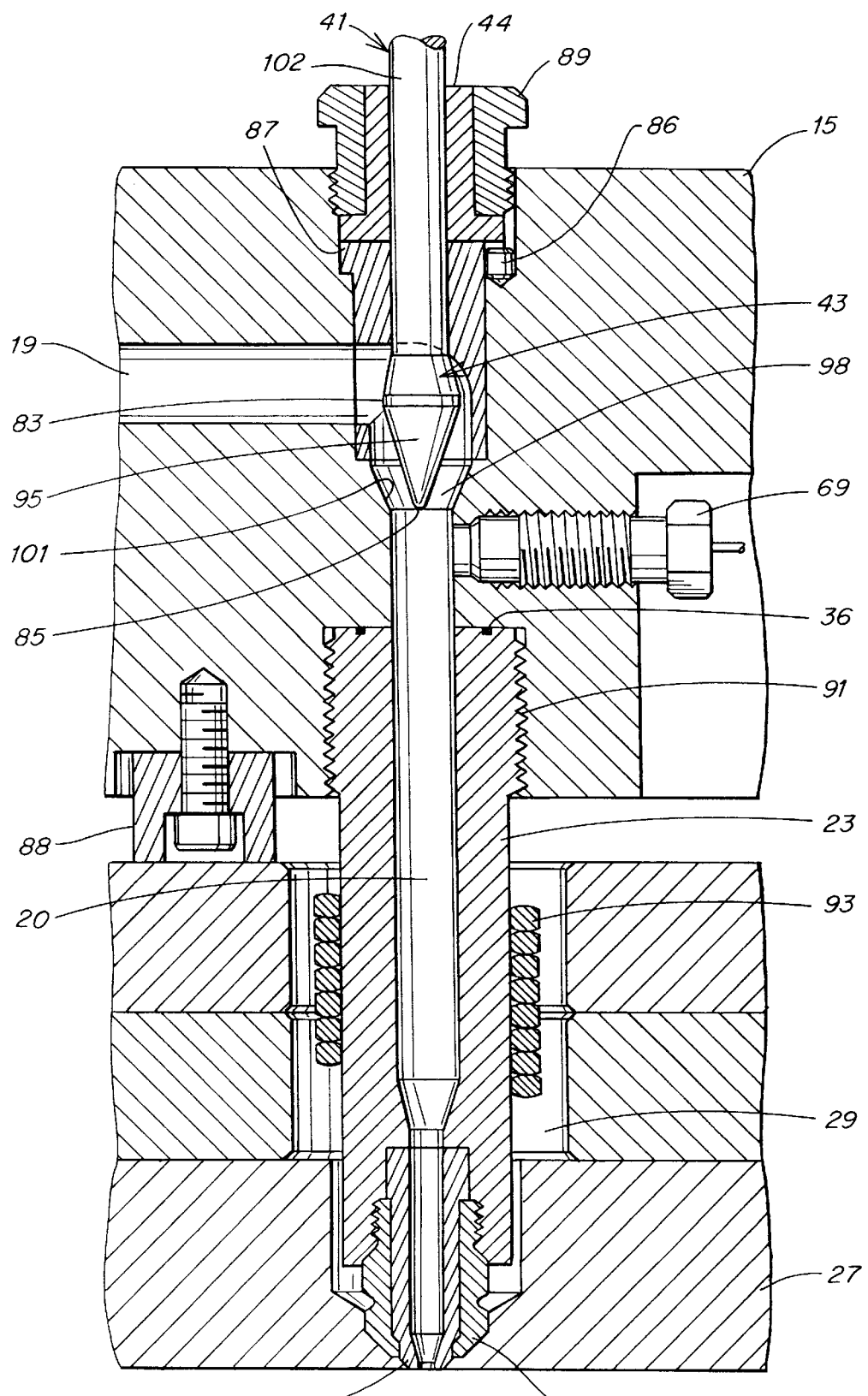
FIG. 8 is a cross-sectional view of an alternative embodiment of the present invention similar to FIG. 6, in which a threaded nozzle is used with a plug for easy removal of the valve pin.
Figure 9:
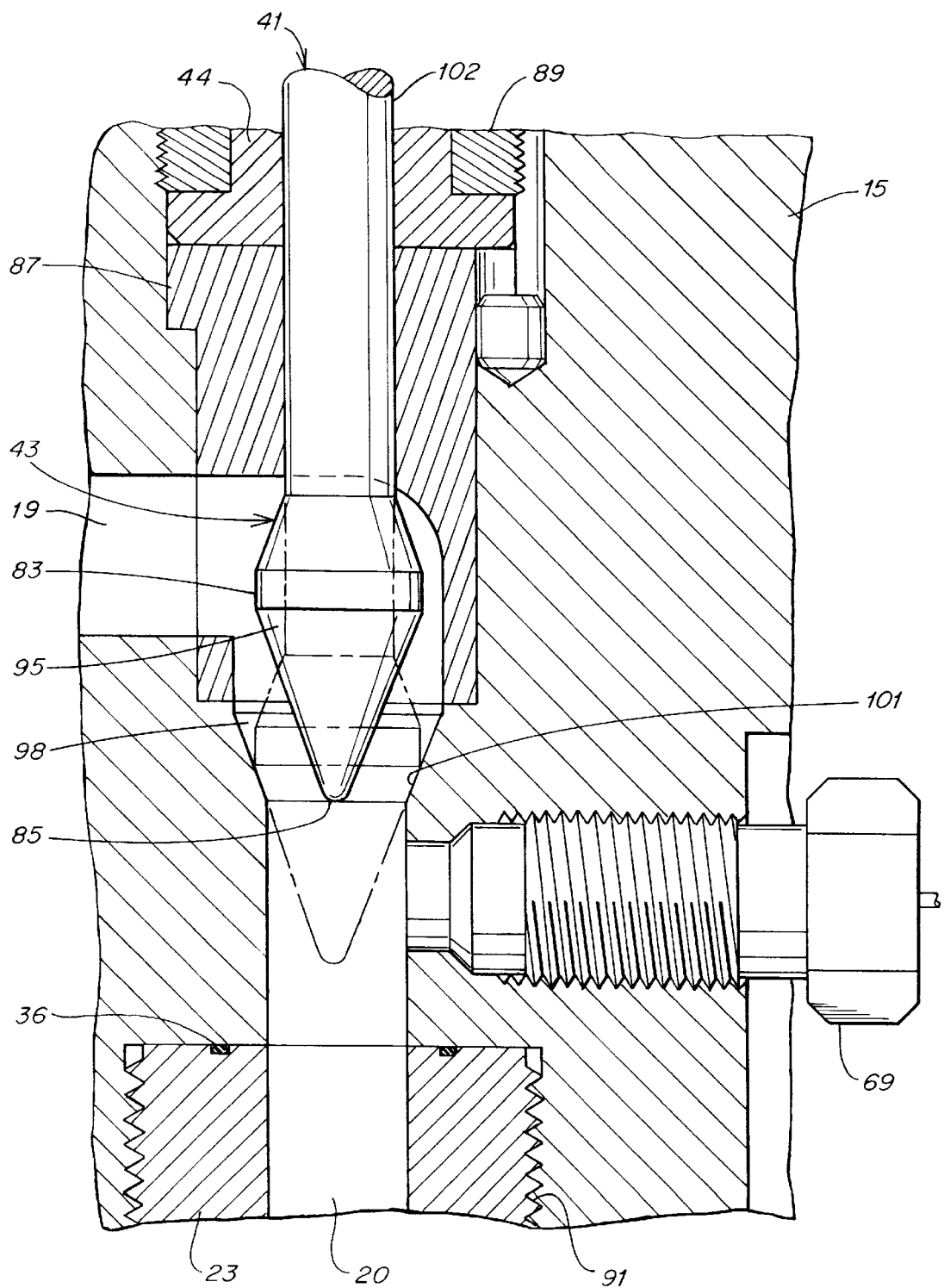
FIG. 9 is an enlarged fragmentary view of the embodiment of FIG. 8, in which the valve pin is shown in the open and closed positions.

FIGS. 8 and 9 show a forward shutoff arrangement similar to FIGS. 6 and 7, but instead of shutting off at the rear of the nozzle 23, the shut-off is located in the manifold at surface 101. Thus, in the embodiment shown in FIGS. 8 and 9, a conventional threaded nozzle 23 may be used with a manifold 15, since the manifold is machined to accommodate the pressure transducer 69 as in FIGS. 1–5. A spacer 88 is provided to insulate the manifold from the mold. This embodiment also includes a plug 87 for easy removal of the valve pin head 43.

Figure 10:
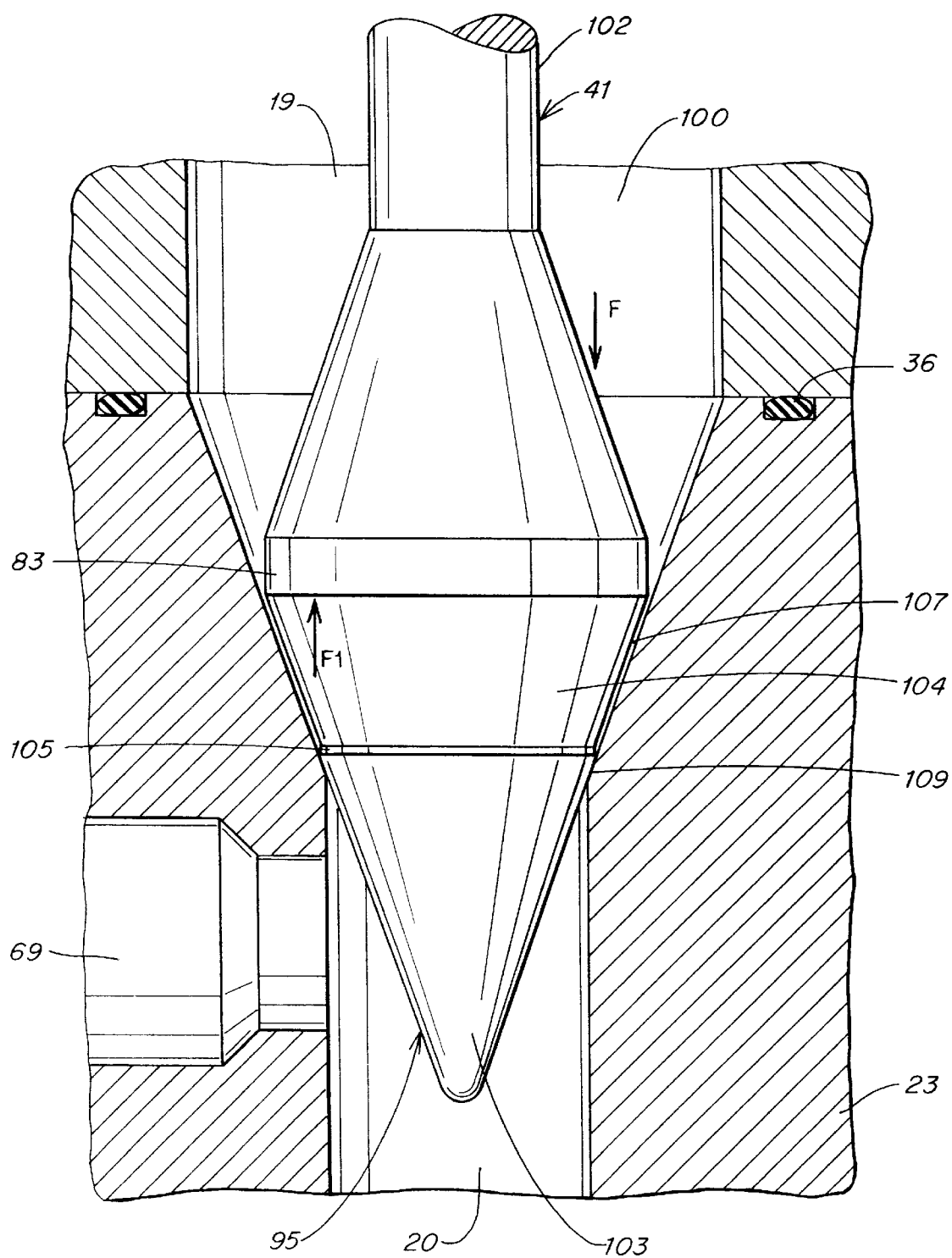
FIG. 10 is an enlarged view of an alternative embodiment of the valve pin, shown in the closed position.

FIG. 10 shows an alternative embodiment of the invention in which a forward shutoff valve pin head is shown as used in FIGS. 6–9. However, in this embodiment, the forward cone-shaped taper 95 on the valve pin includes a raised section 103 and a recessed section 104. Ridge 105 shows where the raised portion begins and the recessed section ends. Thus, a gap 107 remains between the bore 20 of the nozzle through which the melt flows and the surface of the valve pin head when the valve pin is in the closed position. Thus, a much smaller surface 109 is used to seal and close the valve pin. The gap 107 has the advantage in that it assists opening of the valve pin which is subjected to a substantial force F from the melt when the injection machine begins an injection cycle. When injection begins melt will flow into gap 107 and provide a force component F1 that assists the actuator in retracting and opening the valve pin. Thus, a smaller actuator, or the same actuator with less hydraulic pressure applied, can be used because it does not need to generate as much force in retracting the valve pin. Further, the stress forces on the head of the valve pin are reduced.

Despite the fact that the gap 107 performs no sealing function, its width is small enough to act as a control gap when the valve pin is open and correspondingly adjust the melt flow pressure with precision as in the embodiments of FIGS. 1–9.

Figure 11:
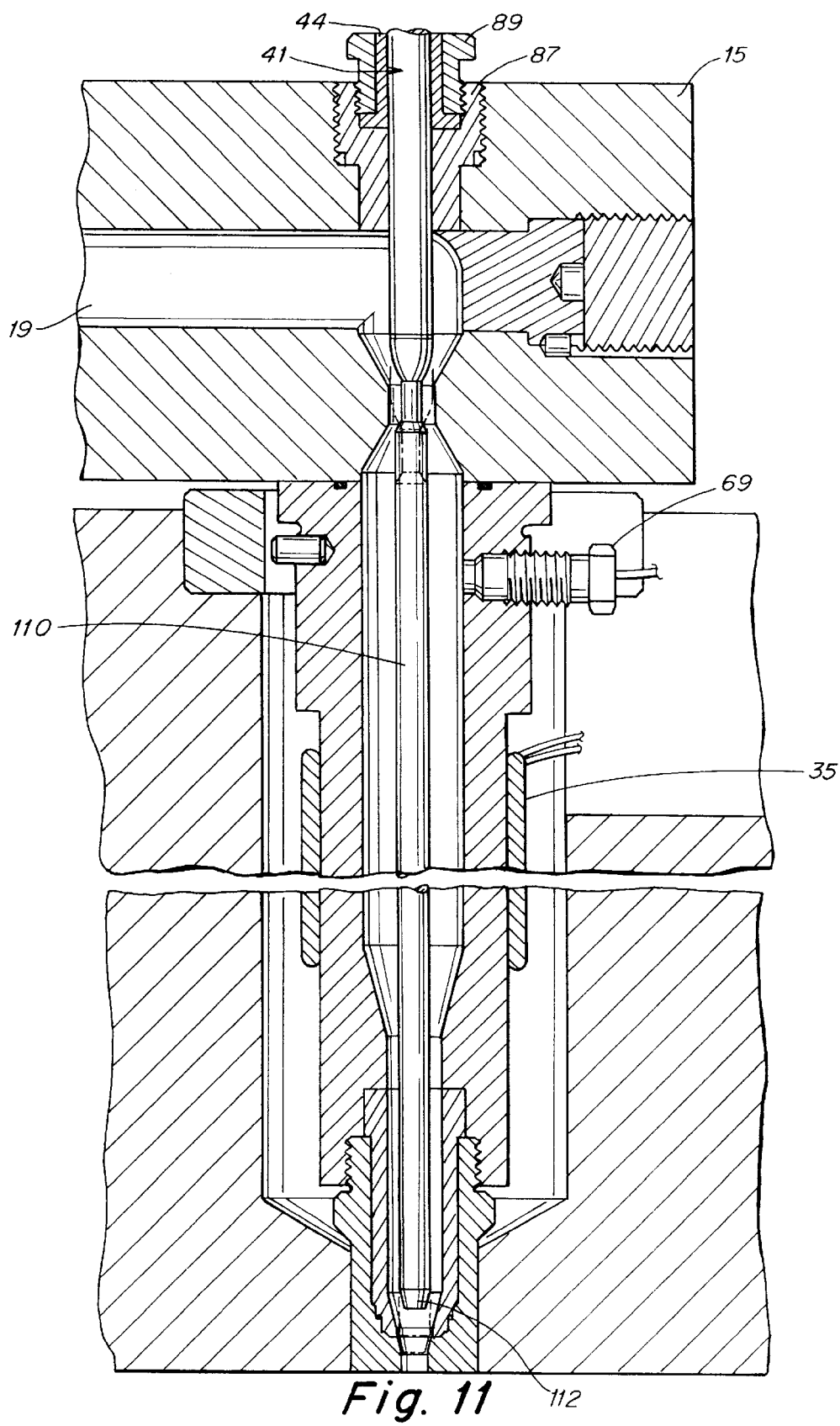
FIG. 11 is a fragmentary cross sectional view of an alternative embodiment of an injection molding system having flow control that includes a valve pin that extends to the gate.
Figure 12:
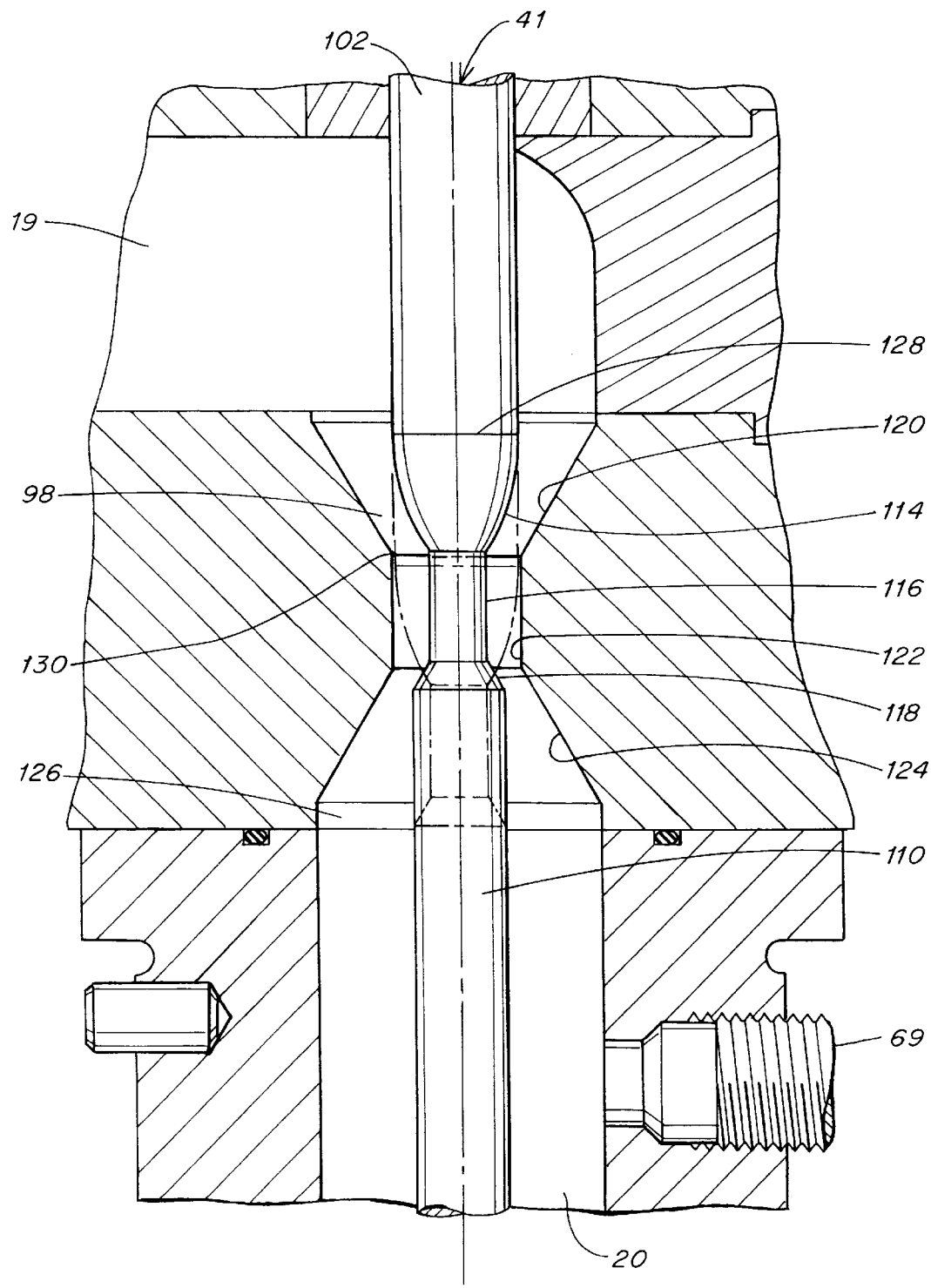
FIG. 12 is an enlarged fragmentary cross-sectional detail of the flow control area.

FIGS. 11 and 12 show an alternative hot-runner system having flow control in which the control of melt flow is still away from the gate as in previous embodiments. Use of the pressure transducer 69 and PID control system is the same as in previous embodiments. In this embodiment, however, the valve pin 41 extends past the area of flow control via extension 110 to the gate. The valve pin is shown in solid lines in the fully open position and in Phantom dashed lines in the closed position. In addition to the flow control advantages away from the gate described above, the extended valve pin has the advantage of shutting off flow at the gate with a tapered end 112 of the valve pin 41.

Extending the valve pin to close the gate has several advantages. First, it shortens injection cycle time. In previous embodiments thermal gating is used. In thermal gating, plastication does not begin until the part from the previous cycle is ejected from the cavity. This prevents material from exiting the gate when the part is being ejected. When using a valve pin, however, plastication can be performed simultaneously with the opening of the mold when the valve pin is closed, thus shortening cycle time by beginning plastication sooner. Using a valve pin can also result in a smoother gate surface on the part.

The flow control area is shown enlarged in FIG. 12. In solid lines the valve pin is shown in the fully open position in which maximum melt flow is permitted. The valve pin includes a convex surface 114 that tapers from edge 128 of the stem 102 of the valve pin 41 to a throat area 116 of reduced diameter. From throat area 116, the valve pin expands in diameter in section 118 to the extension 110 which extends in a uniform diameter to the tapered end of the valve pin.

In the flow control area the manifold includes a first section defined by a surface 120 that tapers to a section of reduced diameter defined by surface 122. From the section of reduced diameter the manifold channel then expands in diameter in a section defined by surface 124 to an outlet of the manifold 126 that communicates with the bore of the nozzle 20. FIGS. 11 and 12 show the support ring style nozzle similar to FIGS. 1–3. However, other types of nozzles may be used such as, for example, a threaded nozzle as shown in FIG. 8.

As stated above, the valve pin is shown in the fully opened position in solid lines. In FIG. 12, flow control is achieved and melt flow reduced by moving the valve pin 41 forward toward the gate thereby reducing the width of the control gap 98. Thus, surface 114 approaches surface 120 of the manifold to reduce the width of the control gap and reduce the rate of melt flow through the manifold to the gate.

To prevent melt flow from the manifold bore 19, and end the injection cycle, the valve pin is moved forward so that edge 128 of the valve pin, i.e., where the stem 102 meets the beginning of curved surface 114, will move past point 130 which is the beginning of surface 122 that defines the section of reduced diameter of the manifold bore 19. When edge 128 extends past point 130 of the manifold bore melt flow is prevented since the surface of the valve stem 102 seals with surface 122 of the manifold. The valve pin is shown in dashed lines where edge 128 is forward enough to form a seal with surface 122. At this position, however, the valve pin is not yet closed at the gate. To close the gate the valve pin moves further forward, with the surface of the stem 102 moving further along, and continuing to seal with, surface 122 of the manifold until the end 112 of the valve pin closes with the gate.

In this way, the valve pin does not need to be machined to close the gate and the flow bore 19 of the manifold simultaneously, since stem 102 forms a seal with surface 122 before the gate is closed. Further, because the valve pin is closed after the seal is formed in the manifold, the valve pin closure will not create any unwanted pressure spikes. Likewise, when the valve pin is opened at the gate, the end 112 of the valve pin will not interfere with melt flow, since once the valve pin is retracted enough to permit melt flow through gap 98, the valve pin end 112 is a predetermined distance from the gate. The valve pin can, for example, travel 6 mm. from the fully open position to where a seal is first created between stem 102 and surface 122, and another 6 mm. to close the gate. Thus, the valve pin would have 12 mm. of travel, 6 mm. for flow control, and 6 mm. with the flow prevented to close the gate. Of course, the invention is not limited to this range of travel for the valve pin, and other dimensions can be used.

Figure 13:
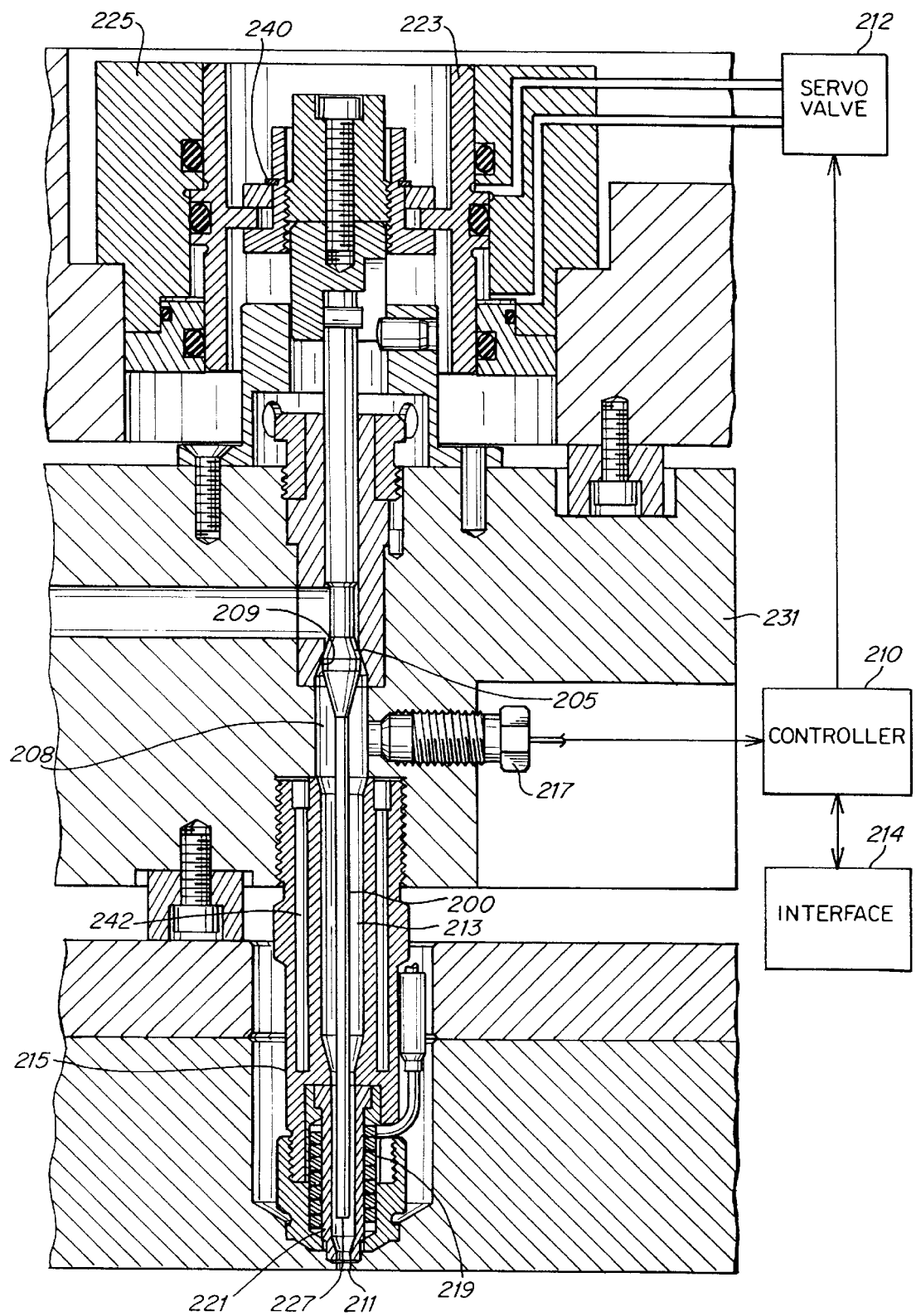
FIG. 13 is a fragmentary cross sectional view of another alternative embodiment of an injection molding system having flow control that includes a valve pin that extends to the gate, showing the valve pin in the starting position prior to the beginning of an injection cycle.
Figure 14:
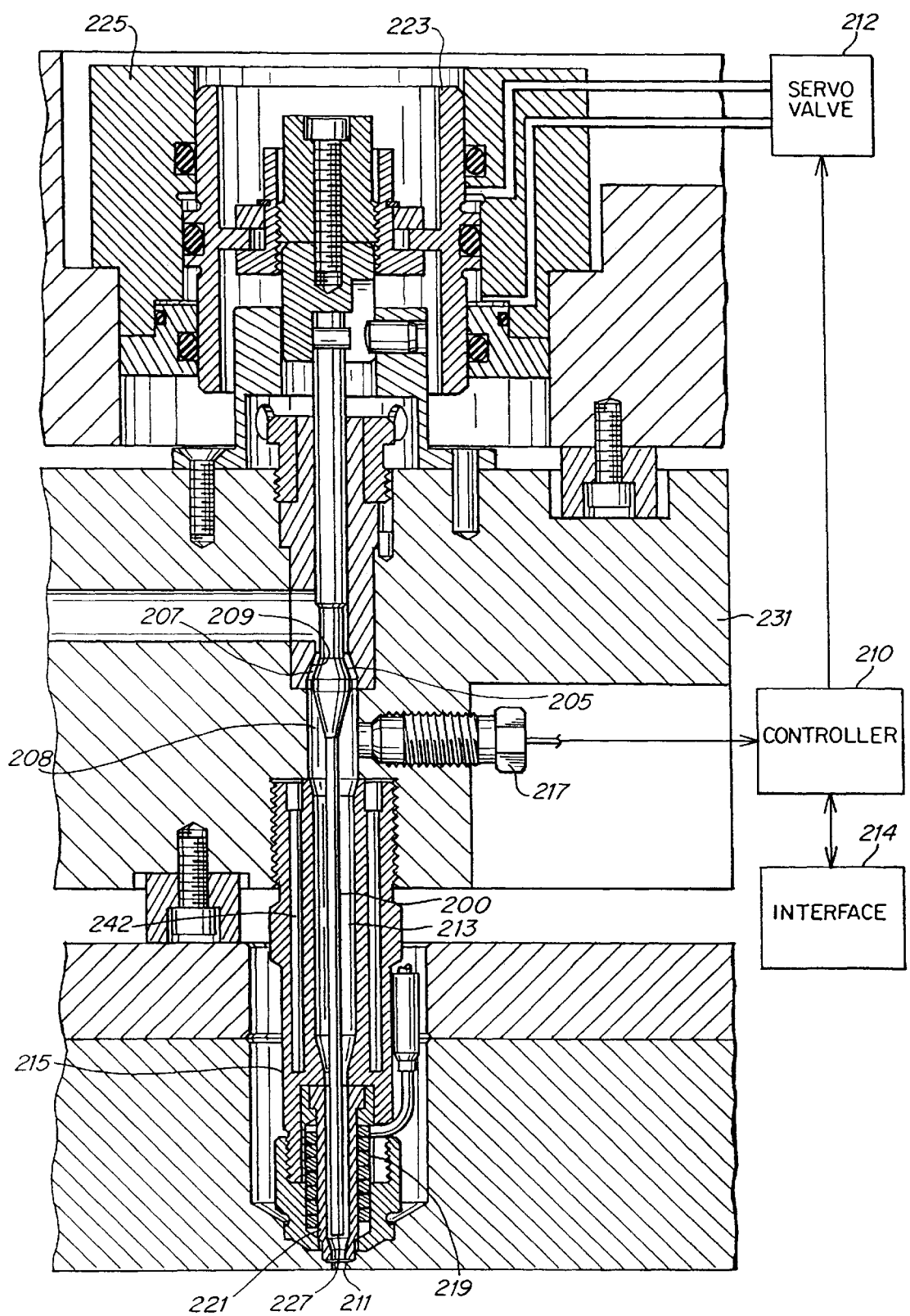
FIG. 14 is view of the injection molding system of FIG. 13, showing the valve pin in an intermediate position in which material flow is permitted.
Figure 15:
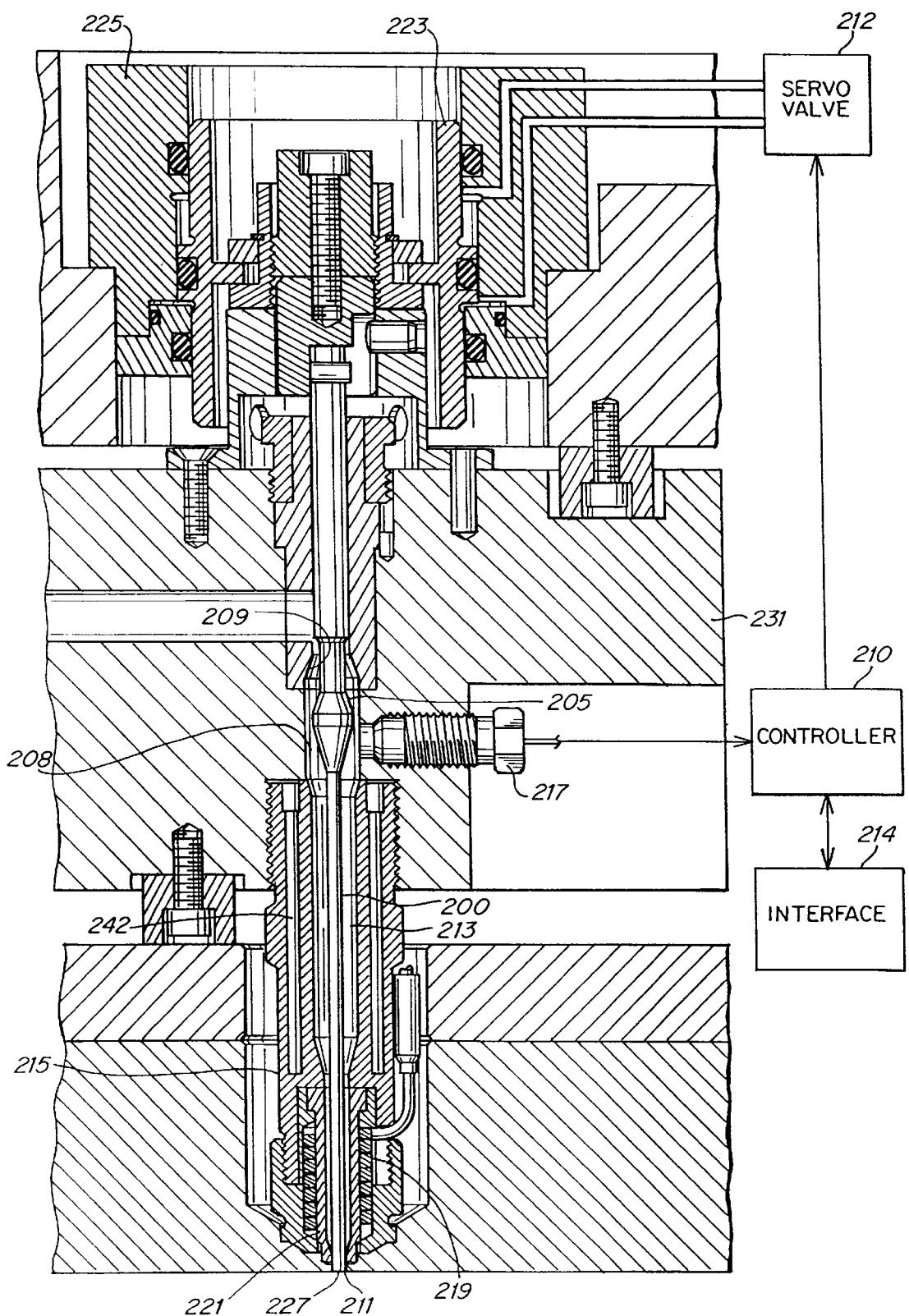
FIG. 15 is a view of the injection molding system of FIG. 13, showing the valve pin in the closed position at the end of an injection cycle.
Figure 16A:
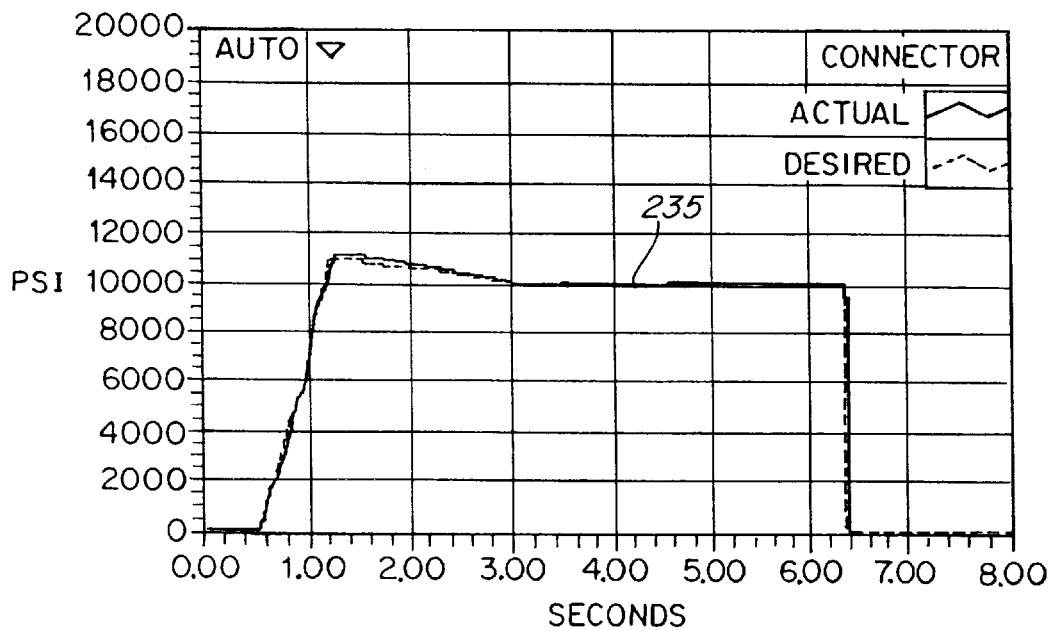
FIG. 16 shows a series of graphs representing the actual pressure versus the target pressure measured in four injection nozzles coupled to a manifold as shown in FIG. 13.
Figure 16B:
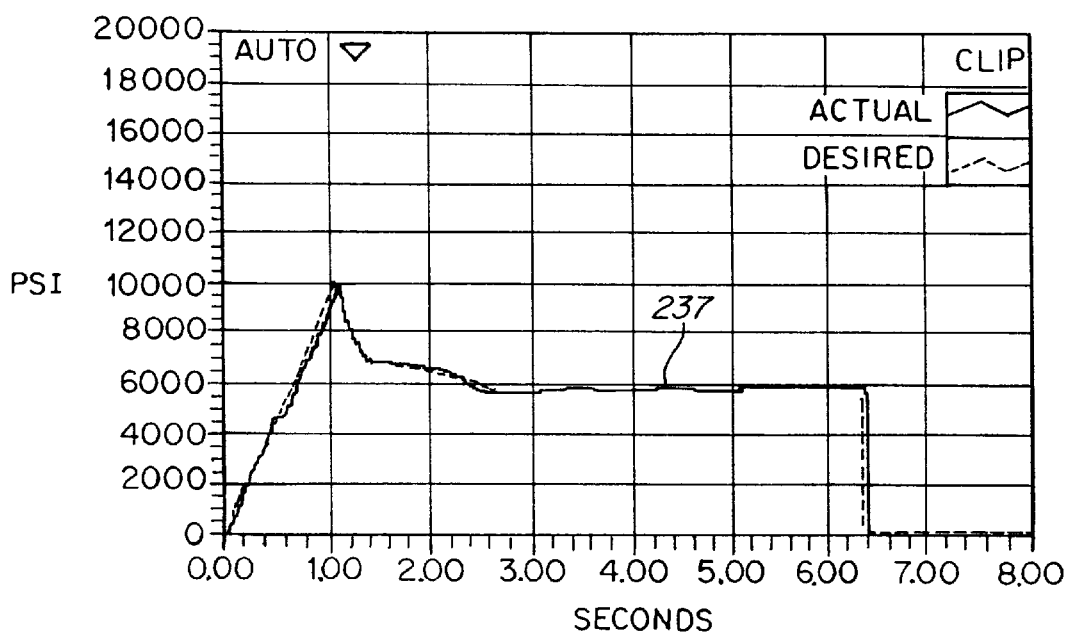
Figure 16C:
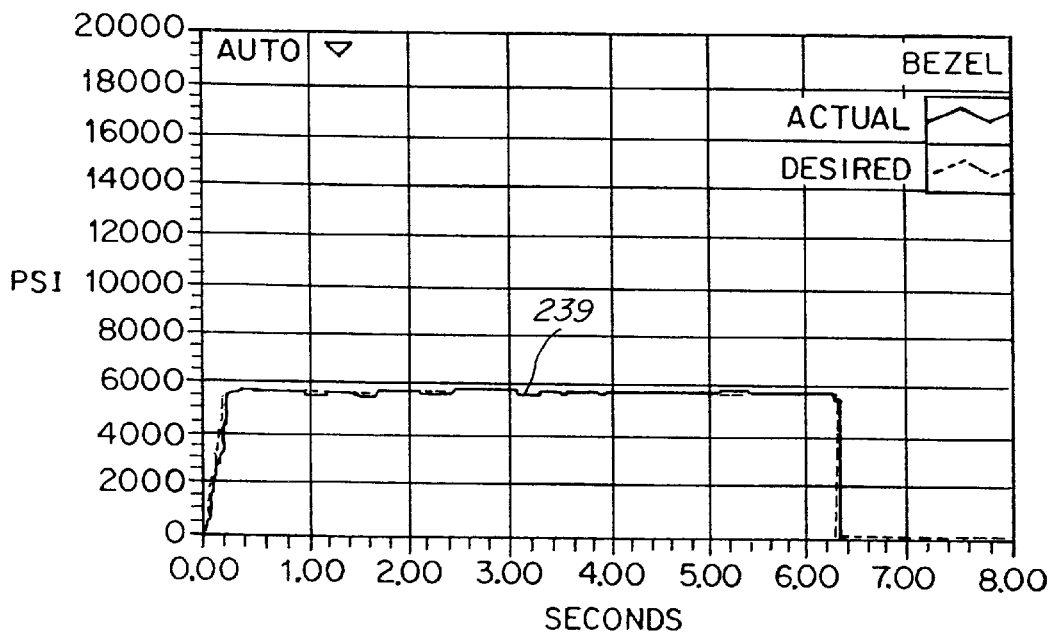
Figure 16D:
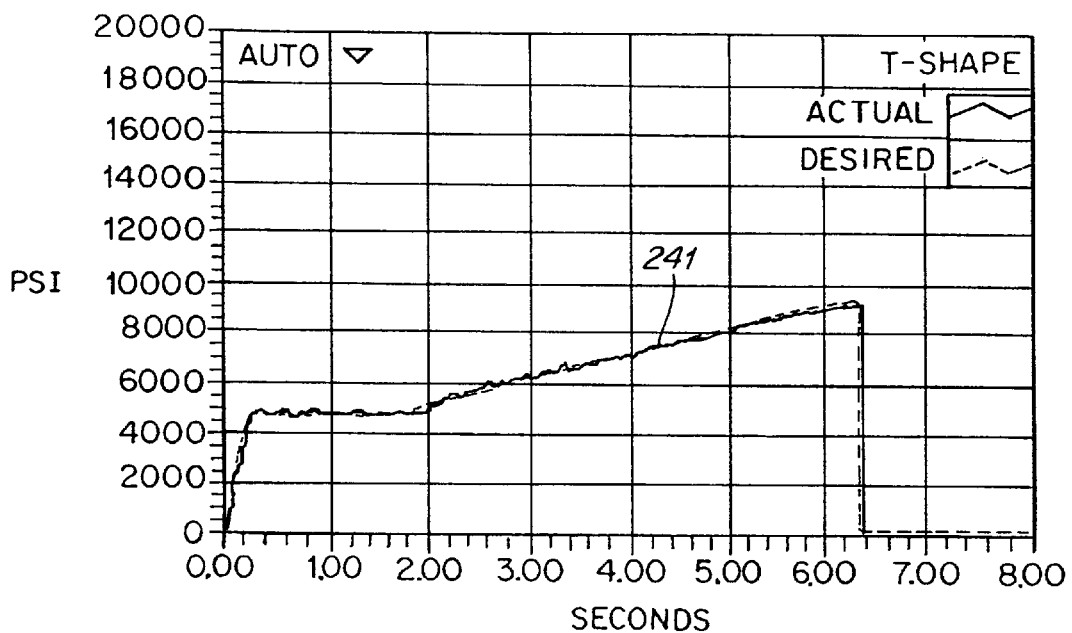

FIGS. 13–15 show another alternative hot runner system having flow control in which the control of material flow is away from the gate. Like the embodiment shown in FIGS. 11 and 12, the embodiment shown in FIGS. 13–15 also utilizes an extended valve pin design in which the valve pin closes the gate after completion of material flow. Unlike the embodiment of FIGS. 11 and 12, however, flow control is performed using a "reverse taper" pin design, similar to the valve pin design shown in FIGS. 1–5.

The valve pin 200 includes a reverse tapered control surface 205 for forming a gap 207 with a surface 209 of the manifold (see FIG. 14). The action of displacing the pin 200 away from the gate 211 reduces the size of the gap 207. Consequently, the rate of material flow through bores 208 and 214 of nozzle 215 and manifold 231, respectively, is reduced, thereby reducing the pressure measured by the pressure transducer 217. Although only one nozzle 215 is shown, manifold 231 supports two or more like nozzle arrangements shown in FIGS. 13–15, each nozzle for injecting into a single or multiple cavities.

The valve pin 200 reciprocates by movement of piston 223 disposed in an actuator body 225. This actuator is described in co-pending application Ser. No. 08/874,962. As disclosed in that application, the use of this actuator enables easy access to valve pin 200 in that the actuator body 225 and piston 223 can be removed from the manifold and valve pin simple by releasing retaining ring 240.

The reverse closure method offers an advantage over the forward closure method shown in FIGS. 6–9, 11 and 12, in that the action of the valve pin 200 moving away from the gate acts to displace material away from the gate, thereby assisting in the desired effect of decreasing flow rate and pressure.

In the forward closure method shown in FIGS. 6–9, forward movement of the pin is intended to reduce the control gap between the pin and the manifold (or nozzle) bore surface to thereby decrease flow rate and pressure. However, forward movement of the pin also tends to displace material toward the gate and into the cavity, thereby increasing pressure, working against the intended action of the pin to restrict flow.

Like the embodiment shown in FIGS. 6–9, and the embodiment shown in FIGS. 11 and 12, movement of the valve pin away from the gate is also intended to increase the flow rate and pressure. This movement, however, also tends to displace material away from the gate and decrease pressure. Accordingly, although either design can be used, the reverse taper design has been found to give better control stability in tracking the target pressure.

The embodiment shown in FIGS. 13–15 also includes a tip heater 219 disposed about an insert 221 in the nozzle. The tip heater provides extra heat at the gate to keep the material at its processing temperature. The foregoing tip heater is described in U.S. Pat. No. 5,871,786, entitled "Tip Heated Hot Runner Nozzle." Heat pipes 242 are also provided to conduct heat uniformly about the injection nozzle 215 and to the tip area. Heat pipes such as these are described in U.S. Pat. No. 4,389,002.

FIGS. 13–15 show the valve pin in three different positions. FIG. 13 represents the position of the valve pin at the start of an injection cycle. Generally, an injection cycle includes: 1) an injection period during which substantial pressure is applied to the melt stream from the injection molding machine to inject the material in the mold cavity; 2) a reduction of the pressure from the injection molding machine in which melt material is packed into the mold cavity at a relatively constant pressure; and 3) a cooling period in which the pressure decreases to zero and the article in the mold solidifies.

Just prior to the start of injection, tapered control surface 205 is in contact with manifold surface 209 to prevent any material flow. At the start of injection the pin 200 will be opened to allow material flow. To start the injection cycle the valve pin 200 is displaced toward the gate to permit material flow, as shown in FIG. 14. (Note: for some applications, not all the pins will be opened initially, for some gates pin opening will be varied to sequence the fill into either a single cavity or multiple cavities). FIG. 15 shows the valve pin at the end of the injection cycle after pack. The part is ejected from the mold while the pin is in the position shown in FIG. 15.

As in previous embodiments, pin position will be controlled by a controller 210 based on pressure readings fed to the controller from pressure sensor 217. In a preferred embodiment, the controller is a programmable controller, or "PLC," for example, model number 90-30PLC manufactured by GE-Fanuc. The controller compares the sensed pressure to a target pressure and adjusts the position of the valve pin via servo valve 212 to track the target pressure, displacing the pin forward toward the gate to increase material flow (and pressure) and withdrawing the pin away from the gate to decrease material flow (and pressure). In a preferred embodiment, the controller performs this comparison and controls pin position according to a PID algorithm. Furthermore, as an alternative, valve 212 can also be a high speed proportional valve.

The controller also performs these functions for the other injection nozzles (not shown) coupled to the manifold 231. Associated with each of these nozzles is a valve pin or some type of control valve to control the material flow rate, a pressure transducer, an input device for reading the output signal of the pressure transducer, means for signal comparison and PID calculation (e.g., the controller 210), means for setting, changing and storing a target profile (e.g., interface 214), an output means for controlling a servo valve or proportional valve, and an actuator to move the valve pin. The actuator can be pneumatic, hydraulic or electric. The foregoing components associated with each nozzle to control the flow rate through each nozzle are called a control zone or axis of control. Instead of a single controller used to control all control zones, alternatively, individual controllers can be used in a single control zone or group of control zones.

An operator interface 214, for example, a personal computer, is used to program a particular target pressure profile into controller 210. Although a personal computer is used, the interface 214 can be any appropriate graphical or alpha numeric display, and could be directly mounted to the controller. As in previous embodiments, the target profile is selected for each nozzle and gate associated therewith by pre-selecting a target profile (preferably including at least parameters for injection pressure, injection time, pack pressure and pack time), programming the target profile into controller 210, and running the process.

In the case of a multicavity application in which different parts are being produced in independent cavities associated with each nozzle (a "family tool" mold), it is preferable to create each target profile separately, since different shaped and sized cavities can have different profiles which produce good parts.

For example, in a system having a manifold with four nozzles coupled thereto for injecting into four separate cavities, to create a profile for a particular nozzle and cavity, three of the four nozzles are shut off while the target profile is created for the fourth. Three of the four nozzles are shut off by keeping the valve pins in the position shown in FIGS. 13 or 15 in which no melt flow is permitted into the cavity.

To create the target profile for the particular nozzle and cavity associated therewith, the injection molding machine is set at maximum injection pressure and screw speed, and parameters relating to the injection pressure, injection time, pack pressure and pack time are set on the controller 210 at values that the molder estimates will generate good parts based on part size, shape, material being used, experience, etc. Injection cycles are run for the selected nozzle and cavity, with alterations being made to the above parameters depending on the condition of the part being produced. When satisfactory parts are produced, the profile that produced the satisfactory parts is determined for that nozzle and cavity associated therewith.

This process is repeated for all four nozzles (keeping three valve pins closed while the selected nozzle is profiled) until target profiles are ascertained for each nozzle and cavity associated therewith. Preferably, the acceptable target profiles are stored in computer member, for example, on a file stored in interface 214 and used by controller 210 for production. The process can then be run for all four cavities using the four particularized profiles.

Of course, the foregoing process of profile creation is not limited to use with a manifold having four nozzles, but can be used with any number of nozzles. Furthermore, although it is preferable to profile one nozzle and cavity at a time (while the other nozzles are closed) in a "family tool" mold application, the target profiles can also be created by running all nozzles simultaneously, and similarly adjusting each nozzle profile according the quality of the parts produced. This would be preferable in an application where all the nozzles are injecting into like cavities, since the profiles should be similar, if not the same, for each nozzle and cavity associated therewith.

In single cavity applications (where multiple nozzles from a manifold are injecting into a single cavity), the target profiles would also be created by running the nozzles at the same time and adjusting the profiles for each nozzle according to the quality of the part being produced. The system can also be simplified without using interface 214, in which each target profile can be stored on a computer readable medium in controller 210, or the parameters can be set manually on the controller.

FIG. 14 shows the pin position in a position that permits material flow during injection and/or pack. As described above, when the target profile calls for an increase in pressure, the controller will cause the valve pin 200 to move forward to increase gap 207, which increases material flow, which increases the pressure sensed by pressure transducer 217. If the injection molding machine is not providing adequate pressure (i.e., greater than the target pressure), however, moving the pin forward will not increase the pressure sensed by transducer 217 enough to reach the target pressure, and the controller will continue to move the pin forward calling for an increase in pressure. This could lead to a loss of control since moving the pin further forward will tend to cause the head 227 of the valve pin to close the gate and attenuate material flow through and about the gate.

Accordingly, to prevent loss of control due to inadequate injection pressure, the output pressure of the injection molding machine can be monitored to alert an operator when the pressure drops below a particular value relative to the target pressure. Alternatively, the forward stroke of the valve pin (from the position in FIG. 13 to the position in FIG. 14) can be limited during injection and pack. In a preferred embodiment, the pin stroke is limited to approximately 4 millimeters. Greater or smaller ranges of pin movement can be used depending on the application. If adequate injection pressure is not a problem, neither of these safeguards is necessary.

To prevent the movement of the valve pin too far forward during injection and pack several methods can be used. For example, a control logic performed by the controller 210 can be used in which the output signal from the controller to the servo valve is monitored. Based on this signal, an estimate of the valve pin position is made.

If the valve pin position exceeds a desired maximum, for example, 4 millimeters, then the forward movement of the pin is halted, or reversed slightly away from the gate. At the end of the injection cycle, the control logic is no longer needed, since the pin is moved to the closed position of FIG. 15 and attenuation of flow is no longer a concern. Thus, at the end of the pack portion of the injection cycle, a signal is sent to the servo valve to move the pin forward to the closed position of FIG. 15.

Other methods and apparatus for detecting and limiting forward displacement of the valve pin 200 can be used during injection and pack. For example, the pressure at the injection molding machine nozzle can be measured to monitor the material pressure supplied to the manifold. If the input pressure to the manifold is less than the target pressure, or less than a specific amount above the target pressure, e.g., 500 p.s.i., an error message is generated.

Another means for limiting the forward movement of the pin is a mechanical or proximity switch which can be used to detect and limit the displacement of the valve pin towards the gate instead of the control logic previously described. The mechanical or proximity switch indicates when the pin travels beyond the control range (for example, 4 millimeters). If the switch changes state, the direction of the pin travel is halted or reversed slightly to maintain the pin within the desired range of movement.

Another means for limiting the forward movement of the pin is a position sensor, for example, a linear voltage differential transformer (LVDT) that is mounted onto the pin shaft to give an output signal proportional to pin distance traveled. When the output signal indicates that the pin travels beyond the control range, the movement is halted or reversed slightly.

Still another means for limiting the forward movement of the pin is an electronic actuator. An electronic actuator is used to move the pin instead of the hydraulic or pneumatic actuator shown in FIGS. 13–15. An example of a suitable electronic actuator is shown in co-pending U.S. Ser. No. 09/187,974. Using an electronic actuator, the output signal to the servo valve motor can be used to estimate pin position, or an encoder can be added to the motor to give an output signal proportional to pin position. As with previous options, if the pin position travels beyond the control range, then the direction is reversed slightly or the position maintained.

At the end of the pack portion of the injection cycle, the valve pin 200 is moved all the way forward to close off the gate as shown in FIG. 15. In the foregoing example, the full stroke of the pin (from the position in FIG. 13 to the position in FIG. 15) is approximately 12 millimeters. Of course, different ranges of movement can be used depending on the application.

The gate remains closed until just prior to the start of the next injection cycle when it is opened and moved to the position shown in FIG. 13. While the gate is closed, as shown in FIG. 15, the injection molding machine begins plastication for the next injection cycle as the part is cooled and ejected from the mold.

FIG. 16 shows time versus pressure graphs (235, 237, 239, 241) of the pressure detected by four pressure transducers associated with four nozzles mounted in manifold block 231. The four nozzles are substantially similar to the nozzle shown in FIGS. 13–15, and include pressure transducers coupled to the controller 210 in the same manner as pressure transducer 217.

The graphs of FIGS. 16 (a–d) are generated on the user interface 214 so that a user can observe the tracking of the actual pressure versus the target pressure during the injection cycle in real time, or after the cycle is complete. The four different graphs of FIG. 16 show four independent target pressure profiles ("desired") emulated by the four individual nozzles. Different target profiles are desirable to uniformly fill different sized individual cavities associated with each nozzle, or to uniformly fill different sized sections of a single cavity. Graphs such as these can be generated with respect to any of the previous embodiments described herein.

The valve pin associated with graph 235 is opened sequentially at 0.5 seconds after the valves associated with the other three graphs (237, 239 and 241 ) were opened at 0.00 seconds. Referring back to FIGS. 13–15, just before opening, the valve pins are in the position shown in FIG. 13, while at approximately 6.25 seconds at the end of the injection cycle all four valve pins are in the position shown in FIG. 15. During injection (for example, 0.00 to 1.0 seconds in FIG. 16b) and pack (for example, 1.0 to 6.25 seconds in FIG. 16b) portions of the graphs, each valve pin is controlled to a plurality of positions to alter the pressure sensed by the pressure transducer associated therewith to track the target pressure.

Figure 17:
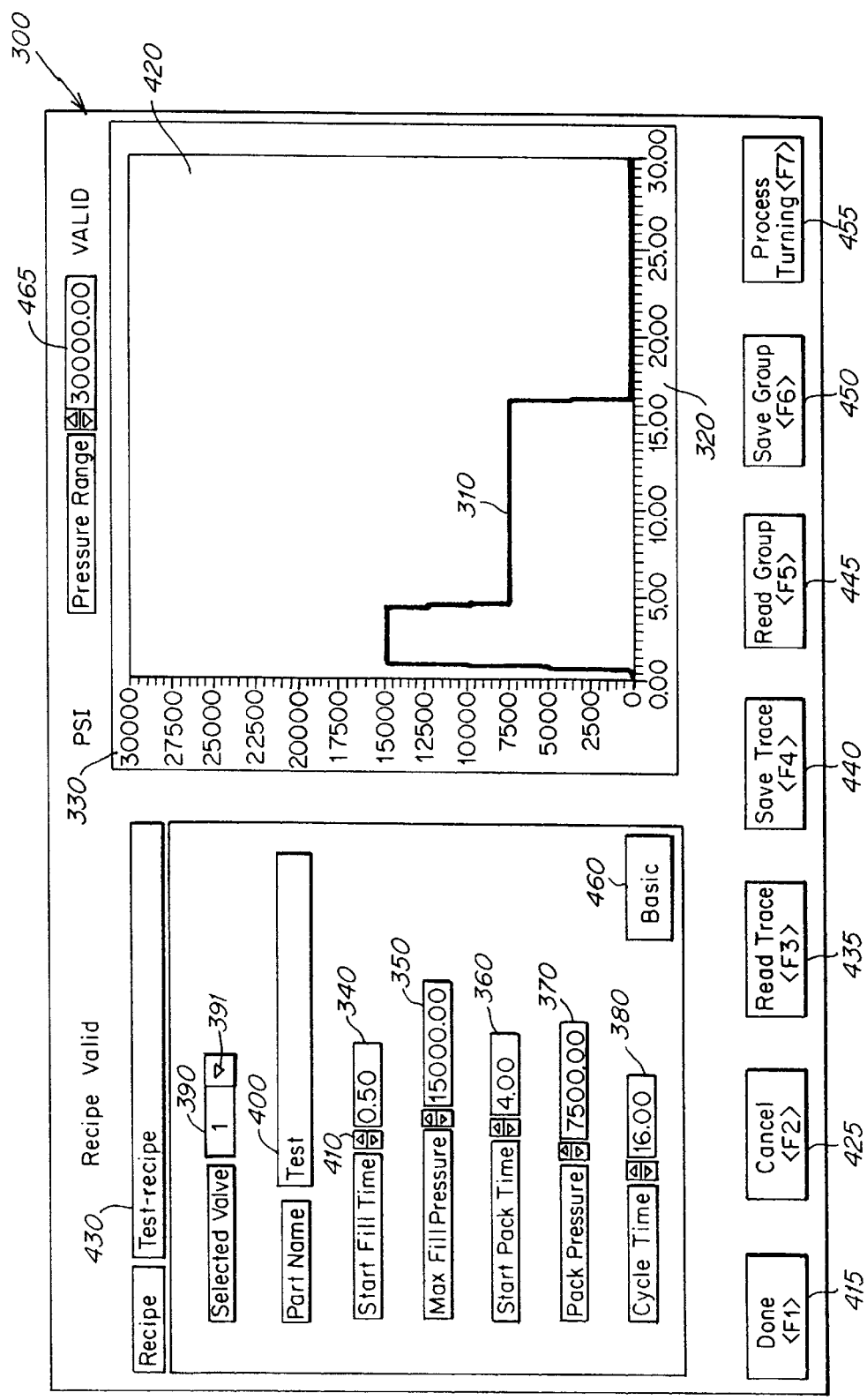
FIGS. 17 and 18 are screen icons displayed on interface 114 of FIG. 13 which are used to display, create, edit, and store target profiles.

Through the user interface 214, target profiles can be designed, and changes can be made to any of the target profiles using standard windows-based editing techniques. The profiles are then used by controller 210 to control the position of the valve pin. For example, FIG. 17 shows an example of a profile creation and editing screen icon 300 generated on interface 214.

Screen icon 300 is generated by a windows-based application performed on interface 214. Alternatively, this icon could be generated on an interface associated with controller 210. Screen icon 300 provides a user with the ability to create a new target profile or edit an existing target profile for any given nozzle and cavity associated therewith. Screen icon 300 and the profile creation text techniques described herein are described with reference to FIGS. 13–15, although they are applicable to all embodiments described herein.

A profile 310 includes (x, y) data pairs, corresponding to time values 320 and pressure values 330 which represent the desired pressure sensed by the pressure transducer for the particular nozzle being profiled. The screen icon shown in FIG. 17 is shown in a "basic" mode in which a limited group of parameters are entered to generate a profile. For example, in the foregoing embodiment, the "basic" mode permits a user to input start time displayed at 340, maximum fill pressure displayed at 350 (also known as injection pressure), the start of pack time displayed at 360, the pack pressure displayed at 370, and the total cycle time displayed at 380.

The screen also allows the user to select the particular valve pin they are controlling displayed at 390, and name the part being molded displayed at 400. Each of these parameters can be adjusted independently using standard windows-based editing techniques such as using a cursor to actuate up/down arrows 410, or by simply typing in values on a keyboard. As these parameters are entered and modified, the profile will be displayed on a graph 420 according to the parameters selected at that time.

By clicking on a pull-down menu arrow 391, the user can select different nozzle valves in order to create, view or edit a profile for the selected nozzle valve and cavity associated therewith. Also, a part name 400 can be entered and displayed for each selected nozzle valve.

The newly edited profile can be saved in computer memory individually, or saved as a group of profiles for a group of nozzles that inject into a particular single or multi-cavity mold. The term "recipe" is used to describe a group of profiles for a particular mold and the name of the particular recipe is displayed at 430 on the screen icon.

To create a new profile or edit an existing profile, first the user selects a particular nozzle valve of the group of valves for the particular recipe group being profiled. The valve selection is displayed at 390. The user inputs an alpha/numeric name to be associated with the profile being created, for family tool molds this may be called a part name displayed at 400. The user then inputs a time displayed at 340 to specify when injection starts. A delay can be with particular valve pins to sequence the opening of the valve pins and the injection of melt material into different gates of a mold.

The user then inputs the fill (injection) pressure displayed at 35. In the basic mode, the ramp from zero pressure to max fill pressure is a fixed time, for example, 0.3 seconds. The user next inputs the start pack time to indicate when the pack phase of the injection cycle starts. The ramp from the filling phase to the packing phase is also fixed time in the basic mode, for example, 0.3 seconds.

The final parameter is the cycle time which is displayed at 380 in which the user specifies when the pack phase (and the injection cycle) ends. The ramp from the pack phase to zero pressure will be instantaneous when a valve pin is used to close the gate, as in the embodiment of FIG. 13, or slower in a thermal gate (see FIG. 1) due to the residual pressure in the cavity which will decay to zero pressure once the part solidifies in the mold cavity.

User input buttons 415 through 455 are used to save and load target profiles. Button 415 permits the user to close the screen. When this button is clicked, the current group of profiles will take effect for the recipe being profiled. Cancel button 425 is used to ignore current profile changes and revert back to the original profiles and close the screen. Read Trace button 435 is used to load an existing and saved target profile from memory. The profiles can be stored in memory contained in the interface 215 or the controller 210. Save trace button 440 is used to save the current profile. Read group button 445 is used to load an existing recipe group. Save group button 450 is used to save the current group of target profiles for a group of nozzle valve pins. The process tuning button 455 allows the user to change the PID settings (for example, the gains) for a particular nozzle valve in a control zone. Also displayed is a pressure range 465 for the injection molding application.

Figure 18:
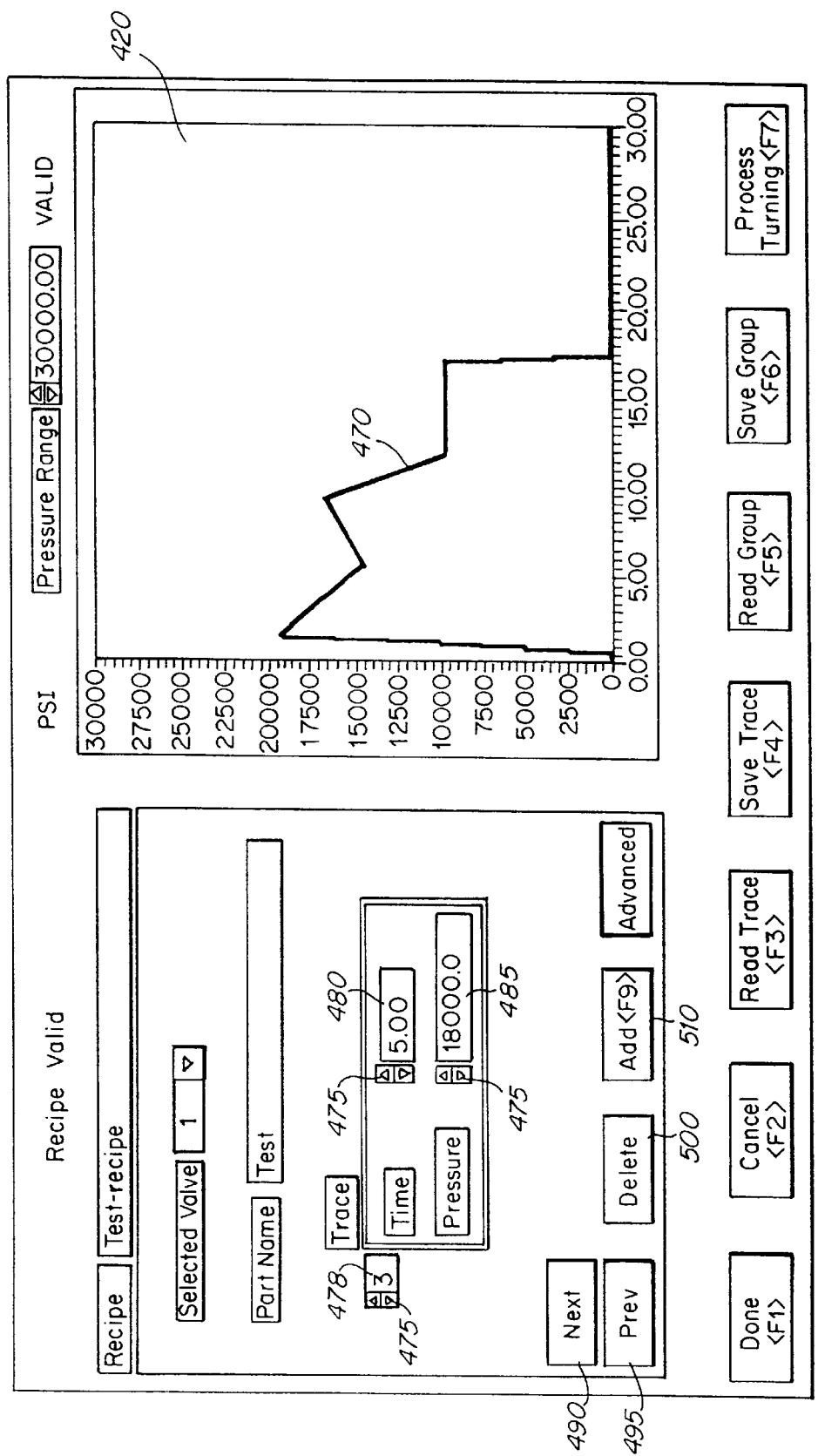

Button 460 permits the user to toggle to an "advanced" mode profile creation and editing screen. The advanced profile creation and editing screen is shown in FIG. 18. The advanced mode allows a greater number of profile points to be inserted, edited, or deleted than the basic mode. As in the basic mode, as the profile is changed, the resulting profile is displayed.

The advanced mode offers greater profitability because the user can select values for individual time and pressure data pairs. As shown in the graph 420, the profile 470 displayed is not limited to a single pressure for fill and pack, respectively, as in the basic mode. In the advanced mode, individual (x, y) data pairs (time and pressure) can be selected anywhere during the injection cycle.

To create and edit a profile using advanced mode, the user can select a plurality of times during the injection cycle (for example 16 different times), and select a pressure value for each selected time. Using standard windows-based editing techniques (arrows 475) the user assigns consecutive points along the profile (displayed at 478), particular time values displayed at 480 and particular pressure values displayed at 485.

The next button 490 is used to select the next point on the profile for editing. Prev button 495 is used to select the previous point on the profile for editing. Delete button 500 is used for deleting the currently selected point. When the delete button is used the two adjacent points will be redrawn showing one straight line segment.

The add button 510 is used to add a new point after the currently selected point in which time and pressure values are entered for the new point. When the add button is used the two adjacent points will be redrawn showing two segments connecting to the new point.

Figure 19:
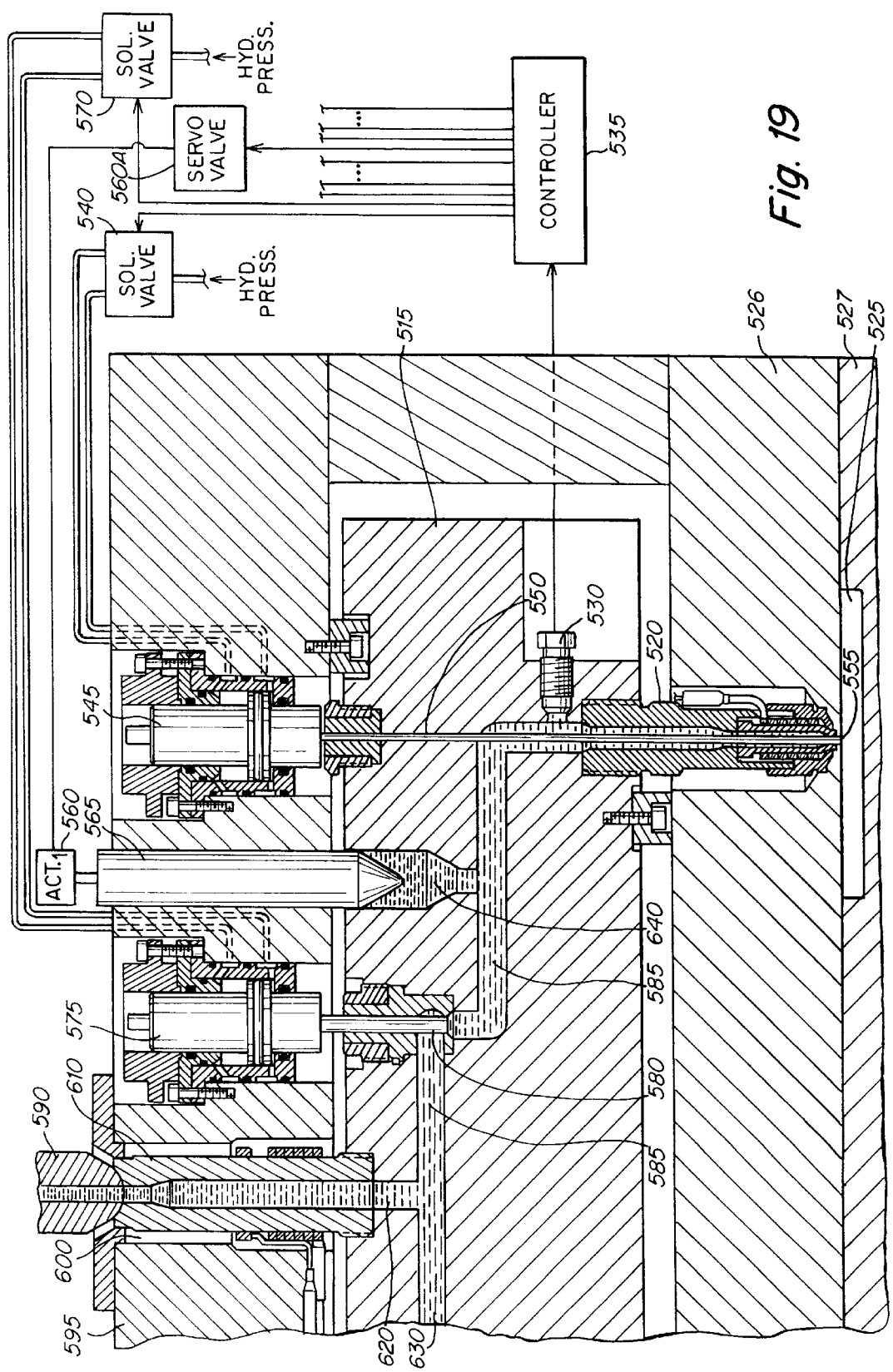
FIG. 19 is a fragmentary cross-sectional partially schematic view of another alternative embodiment of an injection molding system having flow control in which a ram is used to inject material from a well in the manifold into the mold cavity.

FIGS. 19–23 show another alternative embodiment of an injection molding system. The system includes a manifold 515 having a plurality of nozzles 520 coupled thereto for injecting melt material into a plurality of cavities 525. Alternatively, the nozzles can also inject into a single cavity. In FIG. 19, only one nozzle 520 is shown but the following description applies to all nozzles coupled to manifold 515.

As in previous embodiments, each nozzle in the system includes a pressure transducer 530 associated therewith for sensing the pressure of the melt material in the manifold which thereby gives an indication of rate of meltflow through nozzle 520 and into cavity 525 with respect to each injection molding nozzle. Mold cavity 525 is formed by mold halves 526 and 527, which are separated to eject the molded part formed in cavity 525 after the injection cycle. As in previous embodiments, the pressure transducer can also be located in the nozzle, the manifold, or the cavity.

As in previous embodiments, a controller 535 receives signals from pressure transducers 530 coupled to each nozzle 520 (only one of which is shown). The controller 535 controls solenoid valve 540 which controls the movement of a piston in actuator 545 which is coupled to and acts to reciprocate the valve pin 550 to open and close gate 555 to cavity 525.

The controller also sends a signal to servo valve 560A which controls actuator 560 which in turn controls the movement of a ram 565, and further controls solenoid valve 570 which is coupled to another actuator 575 which controls a valve 580 which is adapted to open and close a manifold channel 585 which leads to nozzle 520. Each injection nozzle coupled to manifold 515 (not shown) includes the foregoing actuators 545, 575 and 560 and ram 565 and solenoid valves 540 and 570 and servo valve 560A associated therewith for controlling flow from each nozzle.

The actuators are mounted in a clamp plate 595 which also includes an opening 600 that receives an inlet bushing 610 threadably mounted to the manifold 515. The inlet bushing 610 receives a nozzle 590 from an injection molding machine. The injection molding machine can be, for example, a reciprocating or non-reciprocating extruder. The injection molding machine nozzle 590 feeds melt material into the central bushing 610 into a central channel 620 which branches off via a plurality of channels 585 and 630 (and others not shown) to a corresponding plurality of injection molding nozzles 520.

The foregoing embodiment is similar to previous embodiments in that pressure transducer 530 is used to measure pressure indicative of flow rate of melt material into cavity 525 during the injection cycle. (The actuators described herein are hydraulic actuators, however, pneumatic or electric or other types of actuation can also be used.) Also, as in previous embodiments, a controller 535 compares the pressure sensed by the pressure transducer to target values of a target profile and issues control signals to increase or decrease pressure to track the target profile for each nozzle.

In previous embodiments the controller controlled the position of a valve pin to regulate flow rate independently at each gate during injection. The foregoing embodiment also enables the flow rate of plastic to be controlled independently through each nozzle 520 and each gate during injection. However, in the embodiment shown in FIGS. 19–23, a valve pin is not used to control flow rate as in previous embodiments. Rather, valve pin 550 is used only to open and close gate 555.

In the foregoing embodiment, ram 565 and well 640 are used to regulate the flow of melt material through nozzle 520 and into cavity 525 in the following manner.

Figure 20:
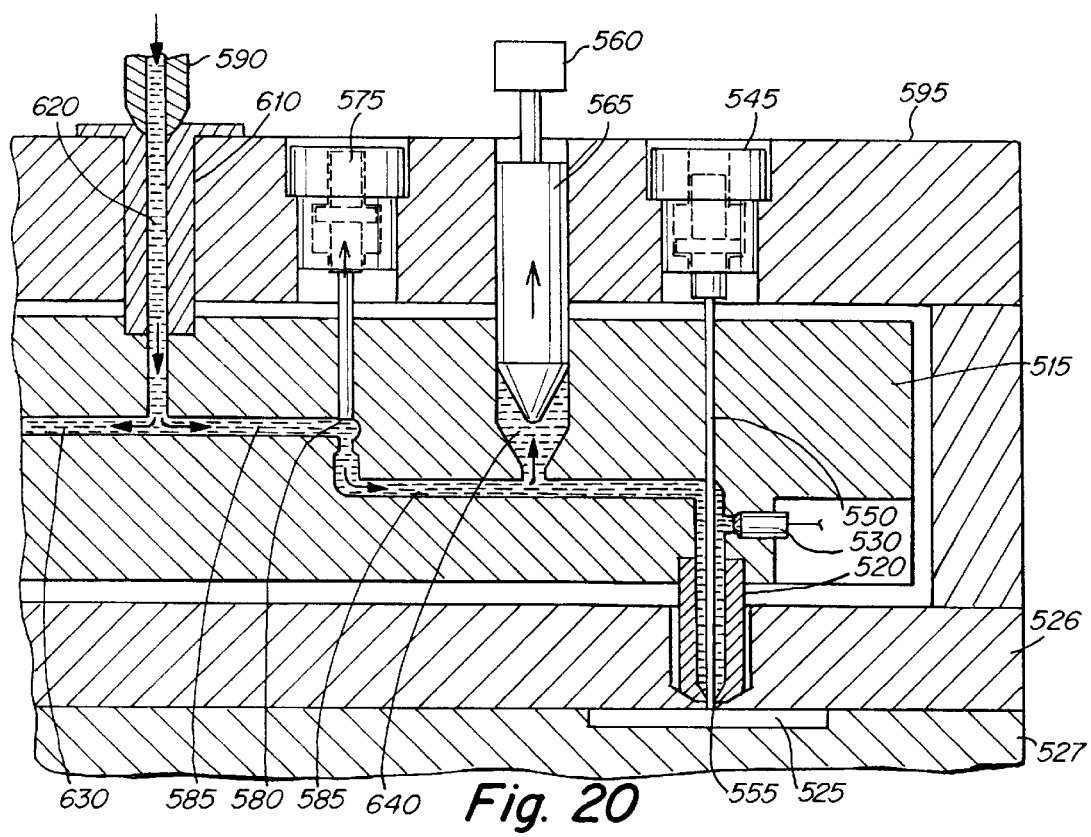
FIG. 20 is a fragmentary view of the embodiment shown in FIG. 19 in which the well 640 is being filled by the injecting molding machine.
Figure 21:
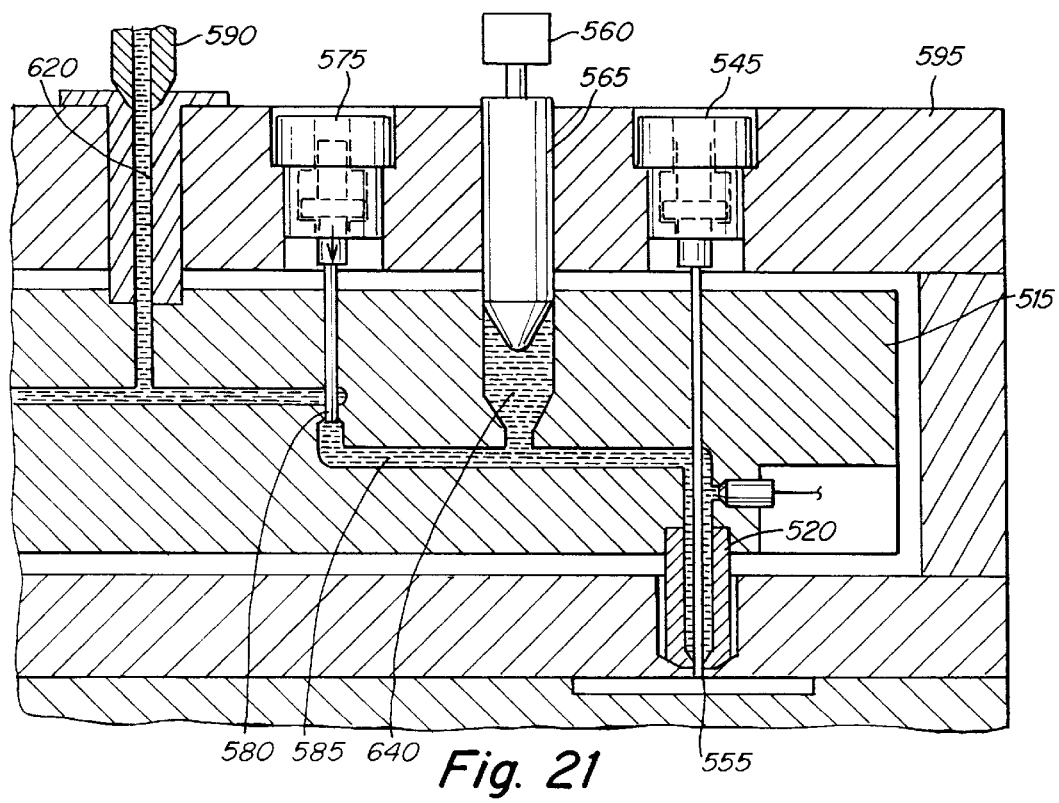
FIG. 21 is a view similar to FIG. 20 in which the well is full of material and the system is ready to inject material into the mold cavity.

At the start of the injection cycle, valve gate 555 is closed by valve pin 550 and valve 580 is opened to permit flow through manifold channel 585 (see FIG. 20). The injection molding machine nozzle 590 injects melt material through the inlet bushing 610 into the manifold 515, such that it fills well 640 (see FIG. 20). The valve pin 550 is still in the closed position while the well 640 is being filled. Ram 565 is in a predetermined adjustable retracted position to permit a specific volume of melt material to gather in well 640 (see FIG. 21). FIG. 21 shows the system ready to inject melt material into cavity 525.

Figure 22:
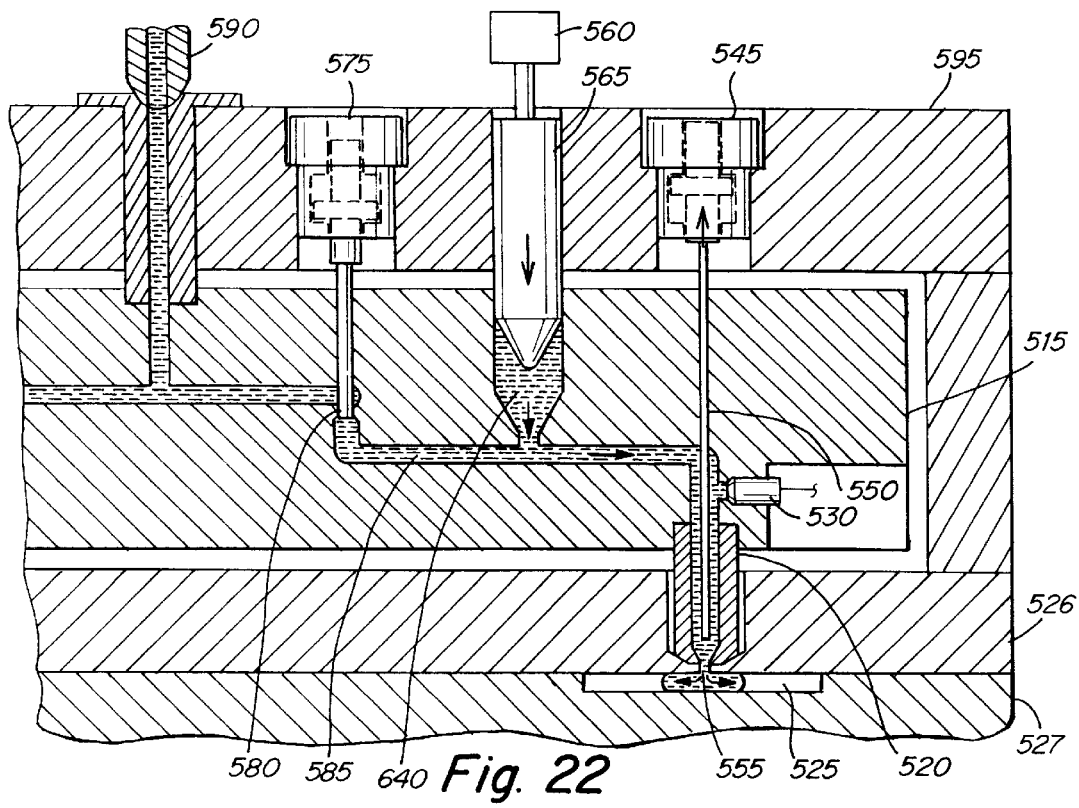
FIG. 22 is a view similar to FIGS. 20 and 21 in which injection into the mold cavity has begun.
Figure 23:
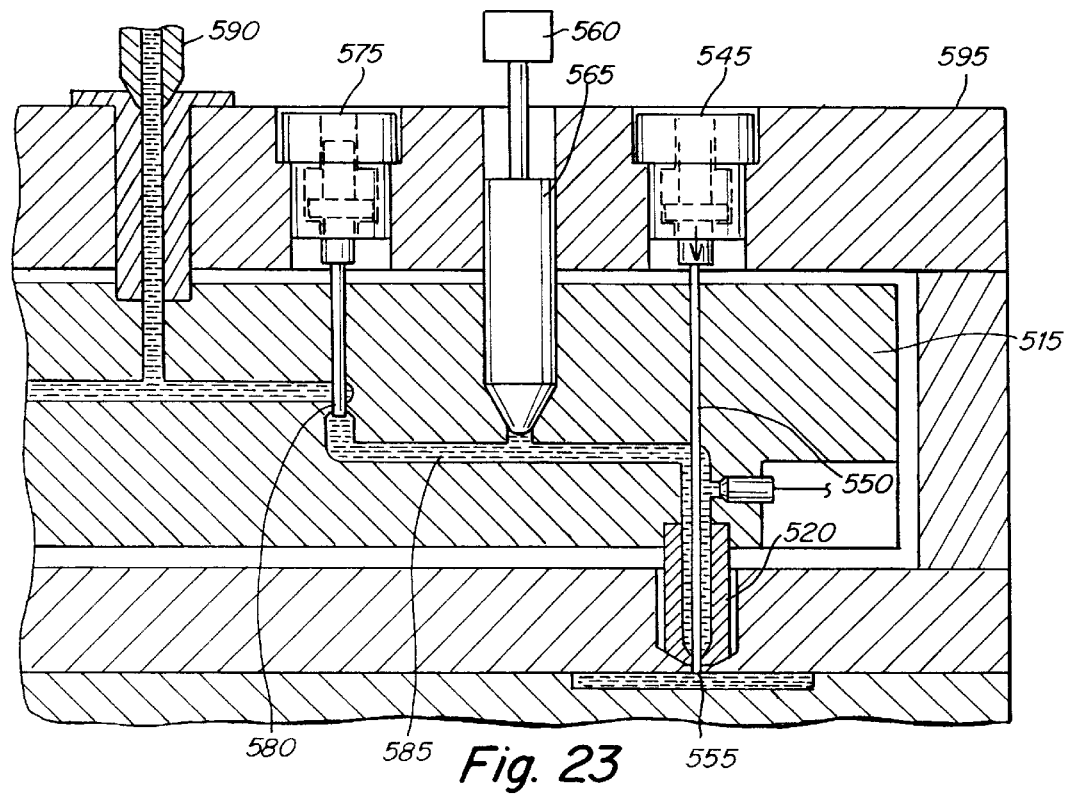
FIG. 23 is a view similar to FIGS. 20–22 in which the injection cycle is complete.

The controller 535 then signals the servo valve 540 to cause actuator 545 to retract valve pin 550 and open gate 555, while also signaling servo valve 570 to cause actuator 575 to close valve 580 and shut off manifold channel 585. Closing valve 580 when injecting into the cavity prevents backflow of material through channel 585. This position is shown in FIG. 22.

The controller then signals actuator 560 to move ram 565 forward to inject material from the well 640 through the nozzle 520 and into the cavity 525. During this time, the controller controls the velocity at which the ram moves forward, according to the pressure sensed by pressure transducer 530, in relation to a target pressure profile. Accordingly, if the pressure transducer 530 senses a pressure that is below the target pressure for that particular time during the injection cycle, the controller 535 signals the actuator 560 to increase the velocity of the ram 565, conversely, if the pressure sensed is greater than the target pressure, the controller will control the actuator to decrease the velocity of the ram forward. When the ram reaches its lowermost position, the cavity 525 is full and the gate is closed (see FIG. 23). Alternatively, ram 565 can be velocity controlled by using a linear transducer to monitor ram position. If so, at the end of injection, the ram is not bottomed out, and control can be transferred to the pressure transducer 530 during pack.

As stated above, a reciprocating or non-reciprocating extruder can be used. If a non-reciprocating extruder is used, plastication into the manifold can be continuous, and the valve 580 is used to shut off the manifold channel 585 during injection so that during this time no plastic can flow through the manifold channel. When well 640 is filled with melt material, plastication in the non-reciprocating extruder can be stopped until the next cycle.

As in previous embodiments described herein, preferably a PID algorithm is used to control the actuator 560 to track the target profile. The target profile can be created in the same manner as described above with respect to previous embodiments.

Using the embodiment shown in FIGS. 19–23, the flow rate of plastic through each gate is controlled independently. Additionally, the use of well 640 enables one to control the specific volume of plastic injected into each cavity 525, which leads to part-to-part consistency, especially when molding in multi-cavity applications in which each cavity 525 is an identical part. By altering the position of ram 565 when injecting melt material into well 640, the volume of material in well 640 can be controlled, thereby controlling the volume of material into cavity 525.

FIGS. 24–28 show an alternative embodiment in which a load cell 140 is used to sense the melt pressure acting on the face 142 of valve pin 41. Where possible, reference characters are used that refer to elements common to FIG. 1. As in previous embodiments, an actuator 49 is used to translate the valve pin 41 toward and away from the gate. The actuator 49 includes a housing 144 and a piston 146 slidably mounted within the housing. The actuator is fed by pneumatic or hydraulic lines 148 and 150. Other actuators, for example, electrical actuators may also be used.

Figure 26:
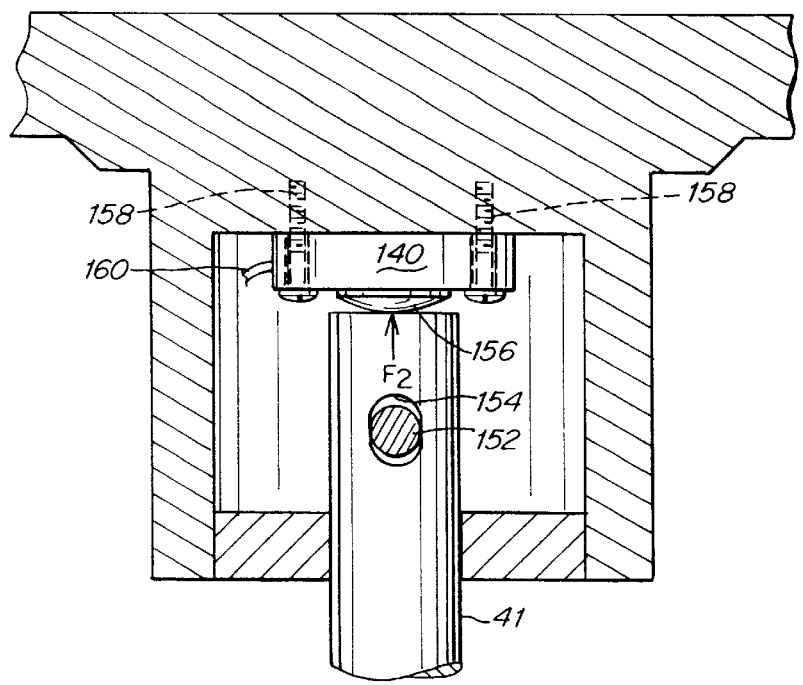
FIG. 26 is an enlarged view of the load cell and valve pin of FIG. 24.

The valve pin 41 is mounted to the piston 146 so that valve pin translates through the injection nozzle 23 with movement of the piston. The valve pin is mounted to the piston via a pin 152. The pin 152 is slotted so that a clearance 154 exists in which the valve pin can translate with respect to the pin 152 and piston 146. The valve pin bears against a button 156 on the load cell 140. The load cell 140 is,mounted via screws 158 to the piston. Thus, as shown in FIG. 26, a force F2 acting on the valve pin will cause the load button 156 to depress. Excitation voltages or other types of signals which indicate the proportionate force on the load button 156 are carried through cable 160 and fed to a controller 151.

Figure 24:
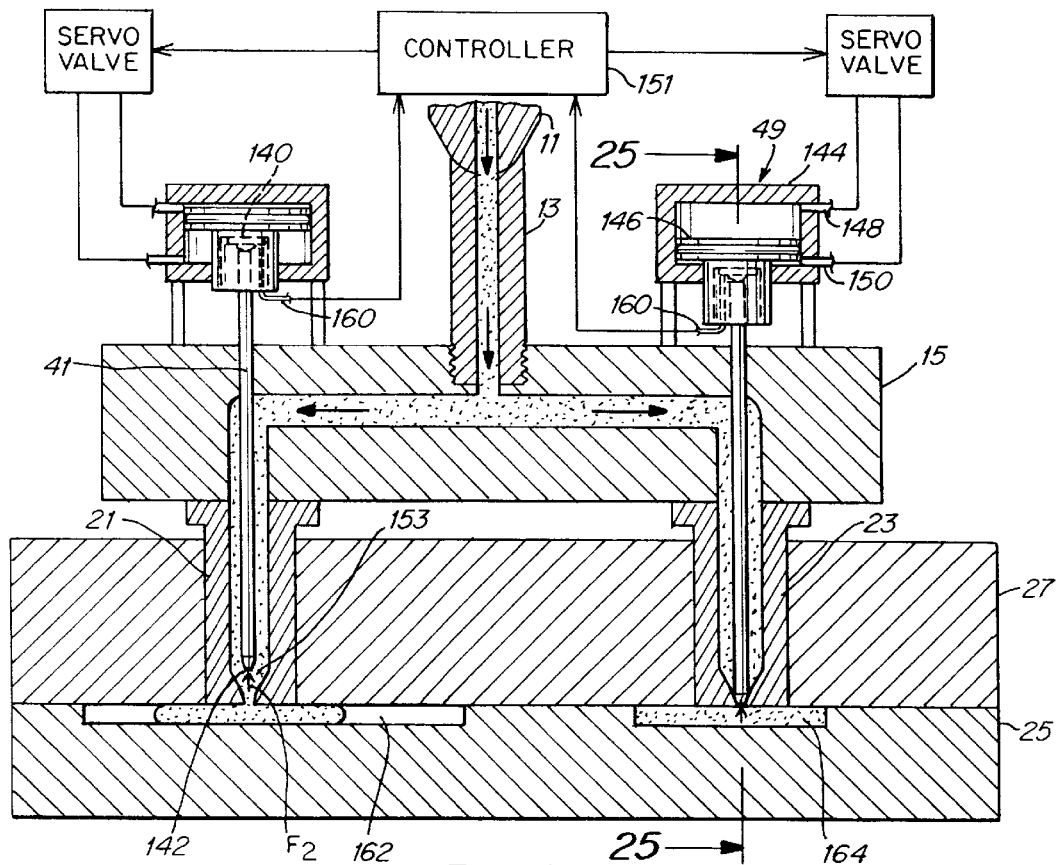
FIG. 24 is a cross-sectional partially schematic view of another alternative embodiment of an injection molding system having flow control in which a load cell behind the valve pin is used to control the flow rate in each injection nozzle.
Figure 25:
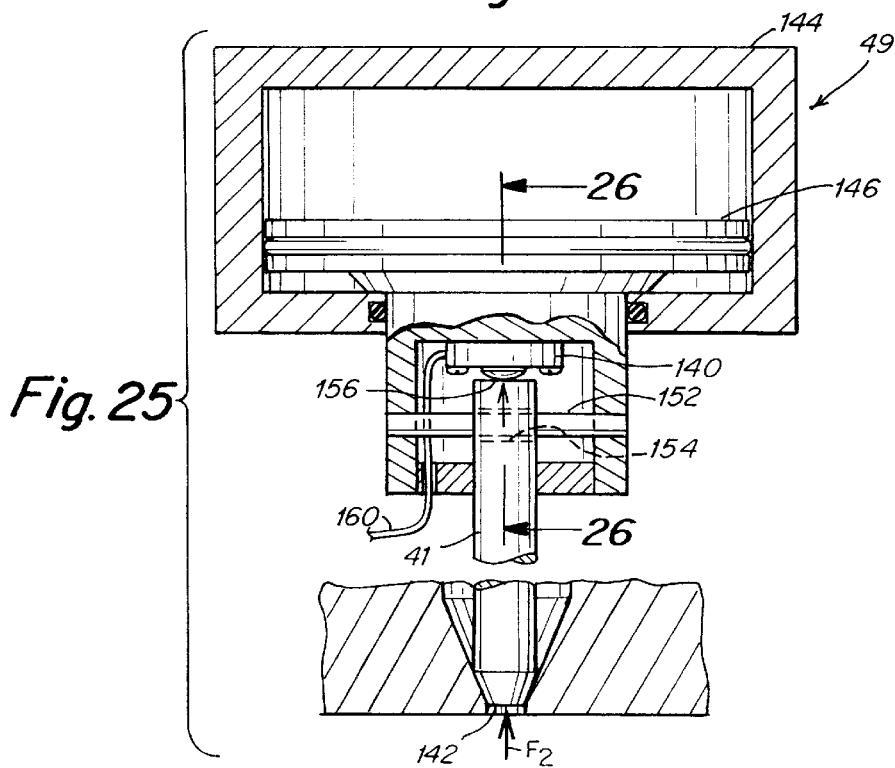
FIG. 25 is a enlarged fragmentary cross-sectional view of the valve pin and actuator of FIG. 24.

In operation, as seen in FIG. 24, the melt material is injected from an injection molding machine nozzle 11 into an extended inlet 13 mounted to a manifold 15 through respective injection molding nozzles 21 and 23 and into mold cavities 162 and 164. In the embodiment shown, a multi-cavity mold is shown in which nozzles 21 and 23 inject melt material to form different size molded parts in cavities 162 and 164, respectively. As stated above with respect to the embodiment shown in FIG. 1, a mold cavity with multiple gates can be used, or multiple mold cavities with cavities having the same size can be used.

When the valve pin 41 is retracted to permit melt material to be injected into the cavity 162, the melt pressure will act on the face of the valve pin 142 with the resulting force being transmitted through the shaft of the valve pin to the load sensor 140 (see FIGS. 26–27). Thus, the load (F2) sensed by load cell 140 is directly related to the melt flow rate into the melt cavity.

Sheer stresses caused by the melt streaming downward over the valve pin will tend to reduce the pressure sensed by the load cell but such stresses are typically less than the nominal load due to the melt pressure. Thus, the resultant force F2 will tend to compress the valve pin toward the load cell, with the possible exception of the initial opening of the valve, and the load cell provides an accurate indicator of the melt pressure at the gate. If the application results in sheer stresses exceeding F2, the load cell can be pre-loaded to compensate for such stresses.

Similar to previous embodiments described above, the signal transmitted through cable 160 is compared by controller 151 with a target value of a target profile and the controller adjusts the position of the valve pin accordingly to increase or decrease flow rate. In this embodiment, the target profile is also a time versus pressure profile, but the pressure is the a result of the force of the pin on the load cell, as opposed to previous embodiments in which a pressure transducer directly senses the force of the flow of the melt material. The profile is created in similar fashion to the embodiments described above: running the process and adjusting the profile until acceptable parts are produced.

The valve pin controls the flow rate through the gate using a tapered edge 155 to form a control gap 153 close to the gate. It should be noted, however, that any of the other valve pin designs described herein can be used with the load cell 140. Accordingly, when the pressure sensed by the load cell is less than the target pressure on the target profile, the controller 151 signals the actuator to retract the valve pin to increase the size of the control gap 153 and, consequently, the flow rate. If the pressure sensed by the load cell 140 is greater than the target pressure, the controller 151 signals the actuator to displace the valve pin toward the gate to decrease the size of the control gap 153 and consequently, the flow rate.

Figures 27A, 27B:
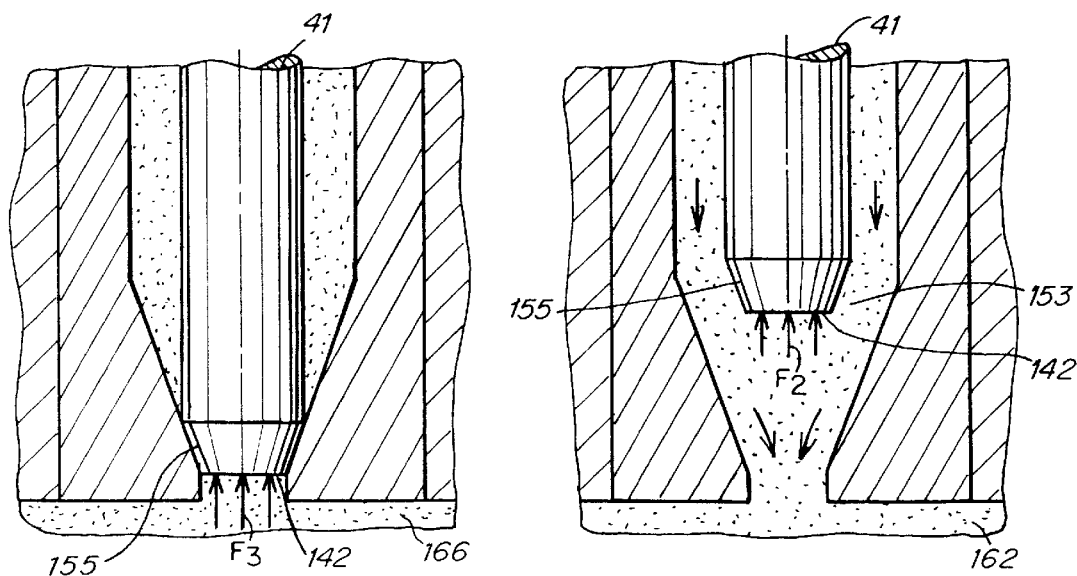
FIGS. 27A and 27B show an enlarged view of the tip of the valve pin closing the gate and controlling the flow rate, respectively.

The use of the load cell has an additional application shown in FIG. 27A. In a single cavity multiple gate system it is often desirable to open gates in a cascading fashion as soon as the flow front of the melt material reaches the gate. When melt material 166 has flowed into the gate area of the valve pin, a force F3 from the melt in the cavity is exerted on the face 142 of the valve pin.

In this way, gates can be sequentially opened in cascading fashion by sensing the force of the melt pressure on the face of the valve pin when the valve pin is closed. Given typical gate diameters of 0.2 inches and melt pressures of 10,000 psi, the resulting force of 300 pounds is readily measured by available load sensors, since the force of the cell equals the area of the gate times the pressure at the gate. Thus, this melt detection can then be used to signal the opening of the gate as in the sequential valve gate. This assures that the gate does not open prematurely.

Figure 28A:
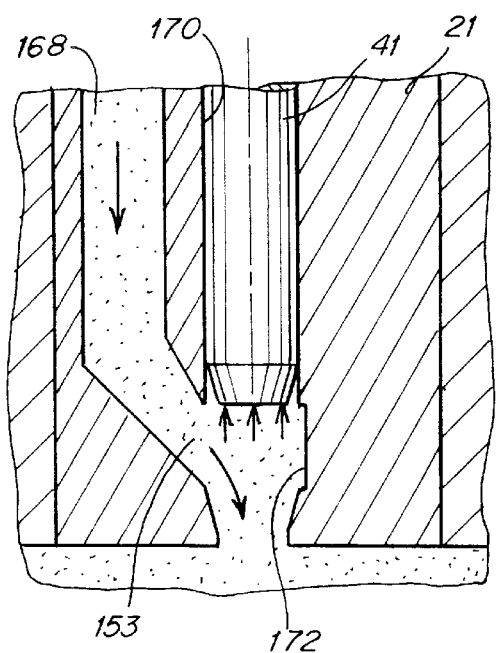
FIGS. 28A and 28B shown an alternative structure of an injection molding nozzle for use in the system shown in FIG. 24.
Figure 28B:
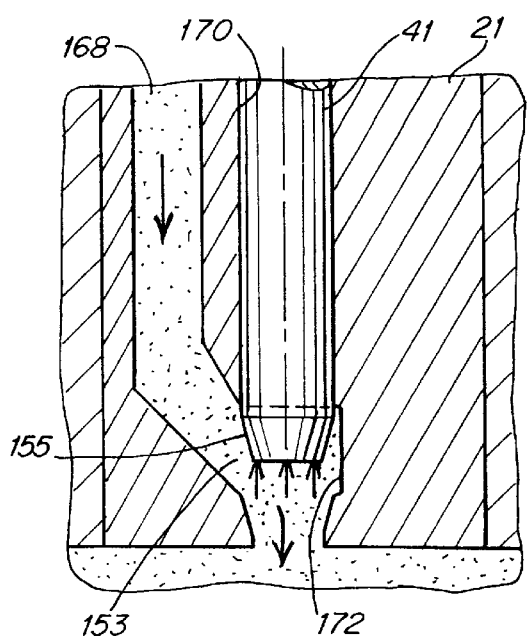

FIGS. 28A and 28B show an alternative embodiment in which the sheer stress on the valve pin is reduced. The nozzle 21 is designed to include a channel for melt flow 168 and a bore 170 through which the valve pin reciprocates. As such, the flow does not cause any axial sheer stress on the valve pin and thus reduces errors in pressure sensing. An indent 172 is provided in the nozzle 21 so that side load on the valve pin is reduced, i.e., to equalize pressure on both sides of the valve pin. An additional benefit to the configuration shown in FIGS. 28A and 28B is that since the flow of material is away from the valve pin, the valve pin does not "split" the flow of material, which can tend to cause part lines or a flow streak on the molded part.

Figure 29:
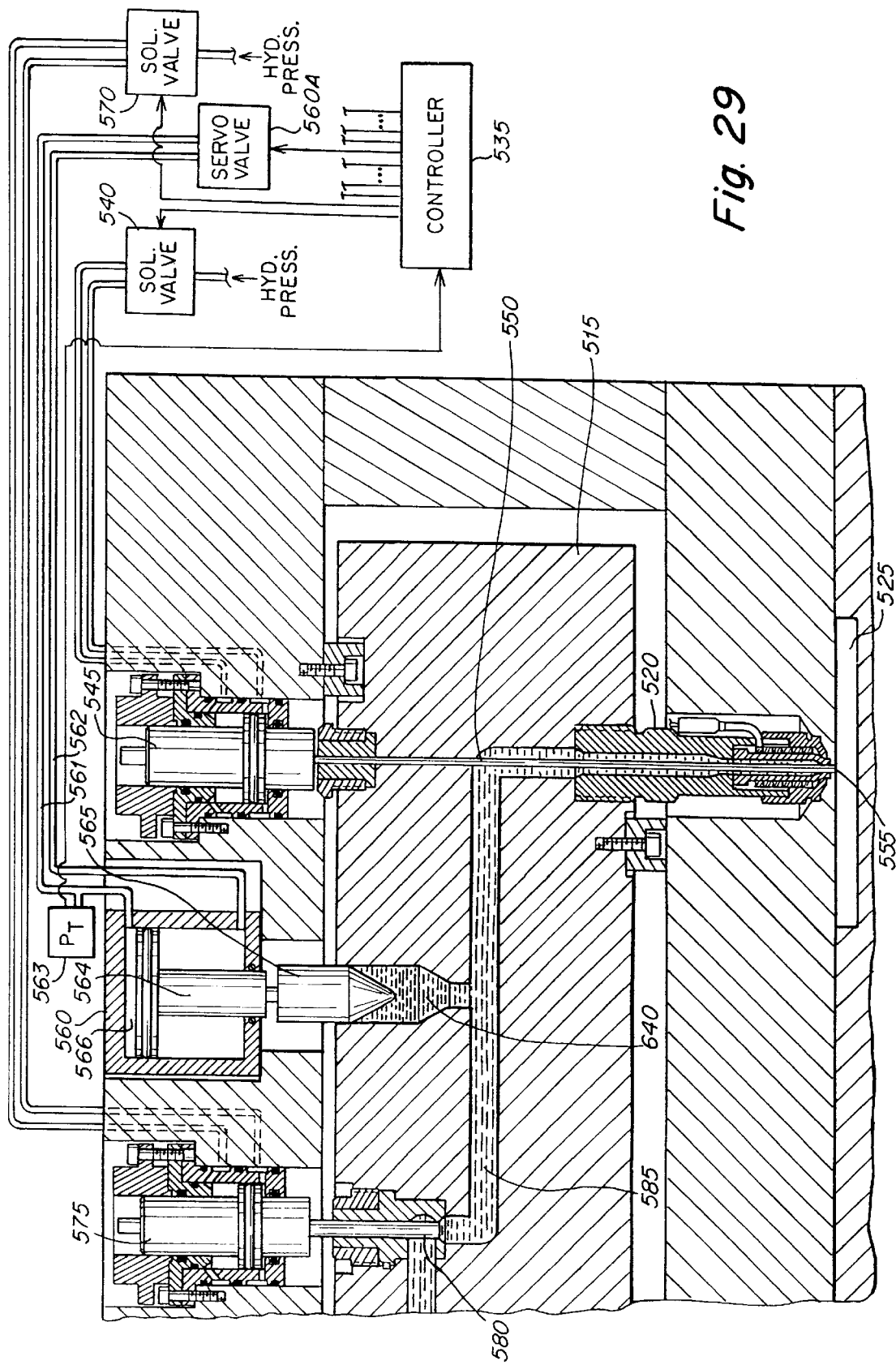
FIG. 29 is a cross-sectional partially schematic view of an alternative embodiment of an injection molding system having flow control similar to FIG. 19 in which a pressure transducer is used to sense the hydraulic pressure supplied to the actuator.

FIG. 29 shows another alternative embodiment of the present invention similar to FIG. 19. As in FIG. 19, a ram 565 is used to force material from well 640 into cavity 525 at a controlled rate. The rate is controlled by signals sent from controller 535 to servo valve 560A, which in turn controls the velocity at which actuator 560 moves ram 565 forward.

In FIG. 29, actuator 560 is shown in more detail including piston 564, actuator chamber 566, and hydraulic lines 561 and 562 controlled by servo valve 560A. Energizing hydraulic line 561 and filling chamber 566 causes piston 564 and ram 565 to move forward and displace material from well 640 through channel 585 and nozzle 520, and into cavity 525. In the embodiment of FIG. 19, the controller controls the rate at which the ram injects material according to signals received by pressure transducer 530, compared to a target profile. In the embodiment of FIG. 29, pressure transducer 530 has been removed in favor of pressure transducer 563 mounted along hydraulic line 561 which leads to chamber 566. The pressure transducer 560 senses the hydraulic fluid pressure in line 561 and sends a proportional signal to the controller 535. Since the pressure of the hydraulic fluid entering chamber 566 is directly related to the rate at which the ram 565 moves forward, and the rate at which the ram moves forward is directly related to the rate of material flow into the cavity 525, the pressure sensed by pressure transducer 560 is directly related to the rate of material flow into the cavity 525, and can be used to control the material flow rate.

Accordingly, as in previous embodiments, a target profile is created that has been demonstrated to generate acceptable molded parts. In the embodiment of FIG. 29, however, the target profile represents target values of the hydraulic pressure sensed by pressure transducer 563, as opposed to directly sensing the material pressure. In operation, the controller compares the pressure signal sensed from pressure transducer 563 to the target pressure profile for gate 555. If the pressure sensed is too low, the controller will increase the hydraulic pressure in line 561 (which increases the velocity of the ram which increases flow rate of the material), if the pressure is too high the controller will decrease the hydraulic pressure (which decreases the velocity of the ram which decreases the rate of material flow).

The target pressure profile of the hydraulic fluid will appear similar to a conventional material profile, since the pressure of the hydraulic fluid will rise rapidly during the injection portion of the cycle, level off during the pack portion of the cycle, and go to zero pressure as cycle ends the valve pin 550 closes.

Although only one injection nozzle 520 and cavity 525 is shown, there is a like arrangement associated with each injection nozzle of actuators 575, 565, 545, as well as solenoid valves 540 and 570 and servo valve 560, to independently control the melt flowing from each gate, according to the target profile created for that gate. Also, although a single cavity 525 is shown, each nozzle may inject to multiple cavities or a single cavity mold. Only a single controller 535, however, is needed to control all the nozzles associated with manifold 515.

Using the foregoing arrangement of FIG. 29, as in previous embodiments, the material flow from each nozzle of the manifold can be controlled independently.

Figure 30:
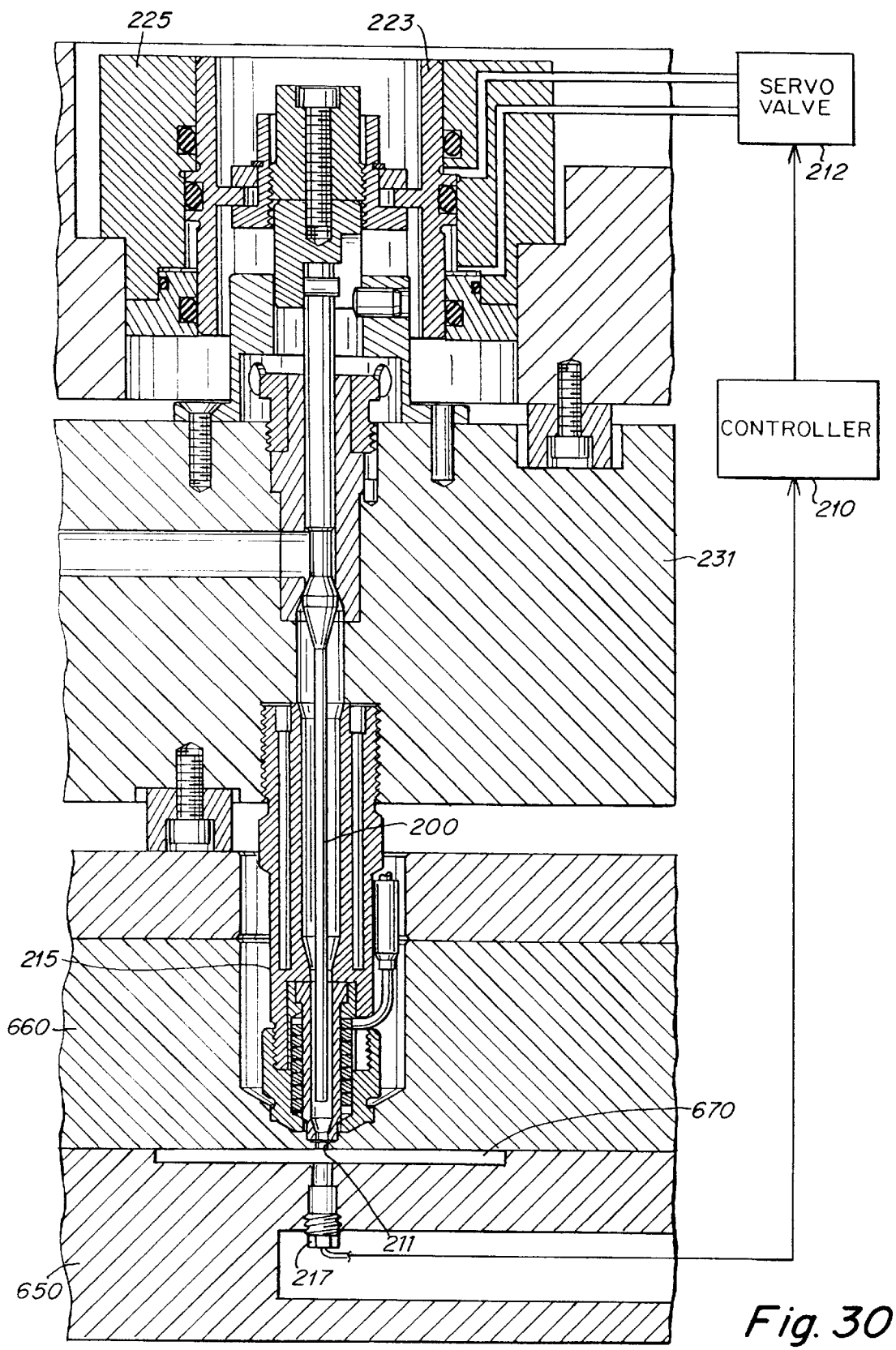
FIG. 30 shows a fragmentary cross-sectional view of an alternative embodiment of an injection molding system having flow control similar to FIG. 13 in which the pressure transducer is mounted in the mold cavity.

FIG. 30 shows another alternative embodiment of the present invention. The embodiment of FIG. 30 is substantially the same as the embodiment shown in FIG. 13 with the exception that pressure transducer 217 has been moved from manifold 231 to inside the mold half 650 which, together with mold half 660, forms mold cavity 670 in which the molded part is formed. Accordingly, in this embodiment, the target profile represents target values of the pressure sensed by pressure transducer 217 inside the cavity opposite the gate 211.

The operation of the embodiment of FIG. 30 is the same as that described in the embodiment shown in FIG. 13 in terms of target profile creation and use of valve pin 200 to control the material flow (interface 214 is not shown FIG. 30 but can be used). However, placing the pressure transducer in the cavity offers several advantages, for example, in the cavity the pressure transducer 217 is not exposed to the high temperatures generated by the manifold, as in FIG. 13. Also, the presence of the pressure transducer in the manifold may slightly disrupt material flow in the manifold. Another consideration in choosing whether to mount the transducer in the mold or in the manifold is whether the mold geometry permits the transducer to be mounted in the mold.

Figure 31:
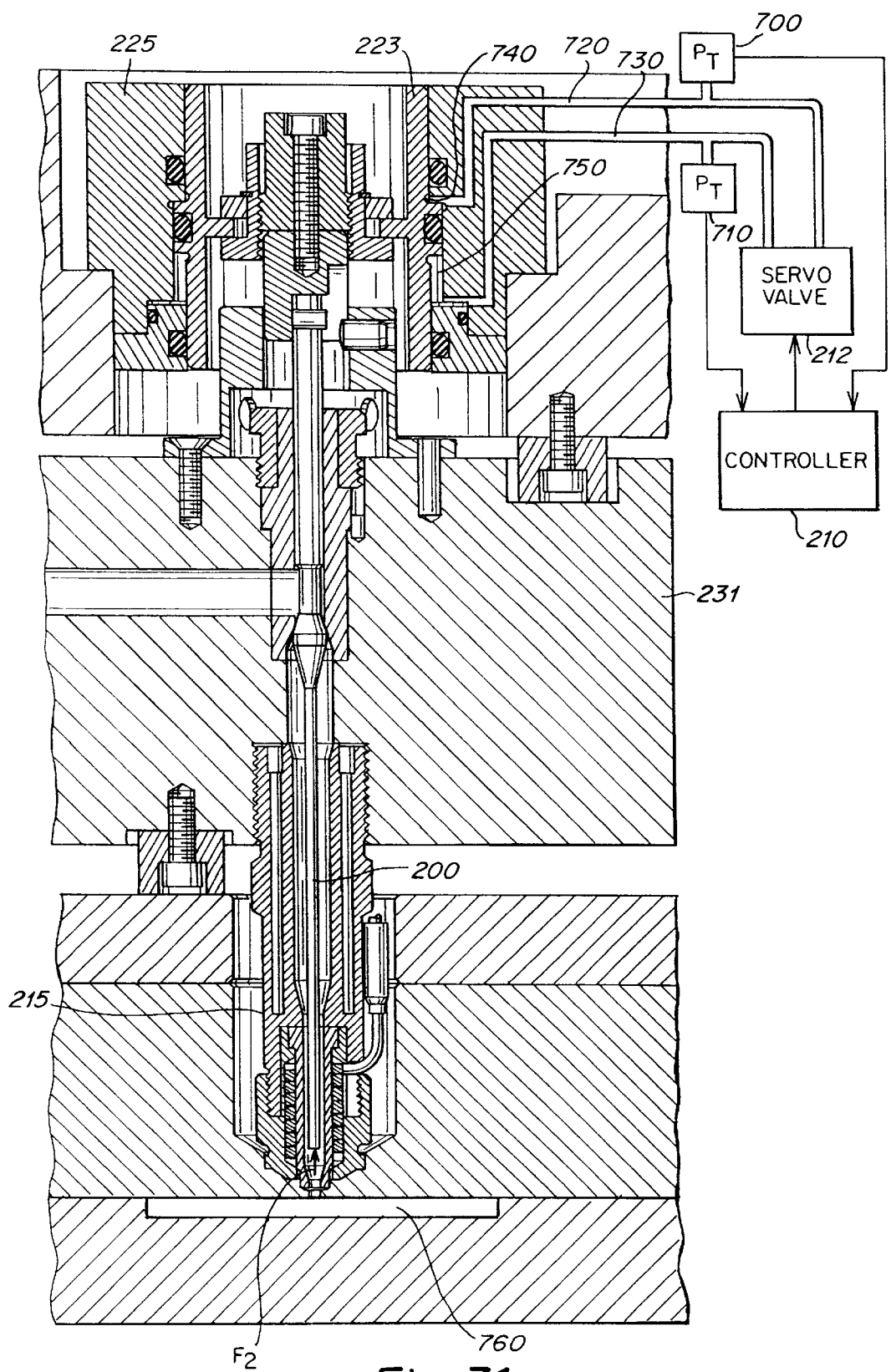
FIG. 31 is a fragmentary cross-sectional view of an alternative embodiment of an injection molding system having flow control in which flow control is achieved by measuring the differential pressure of the actuator chambers.

FIG. 31 is another alternative embodiment of the present invention that is similar to FIG. 13 (like reference characters are used wherever possible). Target profile creation as well as the flow control operation by valve pin 200 is substantially the same as described above. FIG. 31, however, does not include a pressure transducer 217 as shown in FIG. 13 to directly sense the flow of melt material into the cavity. Rather, similar to the embodiment shown in FIG. 24, the arrangement shown in FIG. 31 performs flow control by sensing the material pressure F2 exerted by the melt material on the valve pin.

In FIG. 24 measuring the load on the valve pin was performed using a load cell 140, however, in FIG. 31, it is performed by pressure transducers 700 and 710 mounted along hydraulic lines 720 and 730 which lead to actuator chambers 740 and 750, respectively. Energizing lines 720 and 730 and filling actuator chambers 740 and 750, enables axial movement of piston 223, thereby moving valve pin 200 and affecting the flow rate of the material into the cavity 760 as described above.

Pressure transducers 700 and 710 sense a differential pressure which is directly related to the force exerted on valve pin 200, which is directly related to the flow rate of the material. For example, when the material flow causes a force F2 to act on valve pin 200, the force relates up the valve pin to the piston, which in turn tends to increase the pressure in chamber 740 and line 720 and decrease the pressure in chamber 750 and line 730, directly causing a change in the difference in the pressures sensed by the transducers 700 and 710. Accordingly, the differential pressure is directly related to the flow rate of the material into the cavity.

Once an acceptable target profile of differential pressure is developed using techniques described above, the controller will cause the servo valve 212 to track this target profile by altering the position of the valve pin to change the flow rate of the material and track the differential pressure target profile. For example, if the differential pressure is too high (e.g., the pressure sensed by transducer 700 is higher than the pressure sensed by transducer 710 by an amount greater than the target differential pressure) the controller will cause servo valve to retract the valve pin to reduce the flow rate, thereby reducing the force F2 on the valve pin, thereby decreasing the pressure in chamber 740 and line 720, thereby decreasing the pressure sensed by transducer 700, thereby decreasing the difference in pressure sensed by transducers 700 and 710. Note, in certain applications the differential pressure may be negative due to the sheer force of the material on the valve pin, this however will not affect the controller's ability to track the target profile.

As in the embodiment shown in FIG. 24, the embodiment shown in FIG. 31 offers the advantage that it is not necessary to mount a pressure transducer in the mold or the manifold. As in all previous embodiments, the embodiment shown in FIG. 31 enables the material flow from each nozzle attached to the manifold to be independently profileable.

Figure 32:
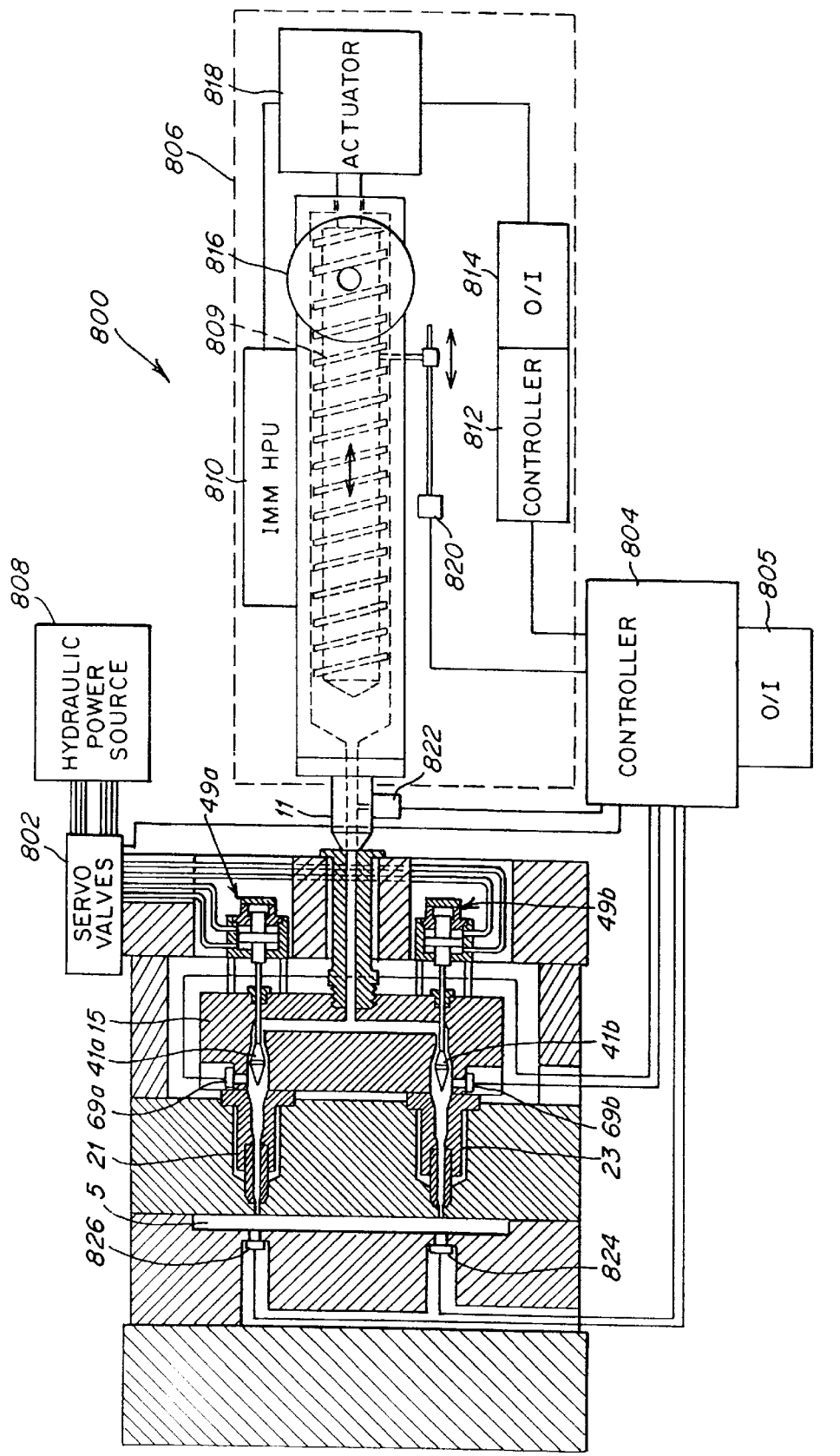
FIG. 32 is a schematic representation of an injection molding system utilizing the hot runner system shown in FIG. 1.

FIG. 32 shows an entire control system arrangement 800 which can be used with any of the embodiments described above in FIGS. 1–31. In FIG. 32, the system is shown with the manifold, nozzle and mold arrangement shown in FIG. 1, and like reference characters are used wherever possible.

Similarly to FIG. 1, the control system 800 includes a manifold 15 for dispensing material injected from machine nozzle 11 through injection molding nozzles 21 and 23 into a mold cavity 5. As explained above, each nozzle has a valve pin 41a and 41b associated therewith that is used to independently control the rate of material flow through nozzles 21 and 23 and into cavity 5. Servo valves 802 are controlled by controller 804 to in turn control actuators 49(a) and 49(b) to alter the respective positions of each valve pin according to a target pressure profile associated with that particular servo-valve, valve pin, injection nozzle, pressure transducer and gate (herein referred to as a "control zone"). As explained above, the valve pin of a control zone adjusts the flow rate of the material flowing to the gate of the control zone so that the pressure read by the pressure transducer in the control zone tracks the target values of pressure in the target profile for that control zone, throughout the injection cycle.

Real-time control is provided via feedback from pressure transducers 69(a) and 69(b) which record material pressure values, feed them back into controller 804, which compares the pressure values to target values throughout the injection cycle. The controller then displaces the valve pins, according to whether an increase or a decrease in material pressure is called for by the target profiles. According to one preferred embodiment, the target profiles are executed by, for example, a PID algorithm stored in the controller 804.

The controller 804 can include a programmable logic controller (PLC) to provide input/output connections. For example, the PLC can be used to capture the material pressure data from the pressure transducers 69(a) and 69(b), and also provide control signals to servo valves 802. The controller 804 is connected to both the servo valves 802 and the hydraulic power source 808 to monitor and control the hydraulic power source. The operator interface 805 is, for example, the same as interface 214 described with reference to FIGS. 14–18 above.

A complete control system 800 is shown in FIG. 32 which includes an injection molding machine 806, which injects material into manifold 15 via nozzle 11. The machine includes a reciprocating screw 809 which is used to force material out of the injection molding machine fed from hopper 816. The screw is attached to a hydraulic actuator 818 which is controlled by the machine controller 812 which includes an operator interface 814. Pressurized hydraulic fluid is supplied to the actuator via an injection molding machine hydraulic power unit 810. Using the operator interface, a user can set injection time, injection pressure, pack pressure, pack time, etc., for any given injection cycle.

In addition to controlling the rate of material flow through each control zone, the controller 804 also interfaces with the injection molding machine in several ways. The controller 804 is coupled to the injection molding machine controller 812. The injection molding machine controller 812 can provide several different signals to the controller 804. For example, the controller 812 can indicate to the controller 804 that all gates and guards on the injection molding machine are closed and the machine 806 is in a state in which injection can occur. This signal should be received while the controller 804 is performing its controlling functions during the injection cycle.

The injection molding machine also can include an emergency stop button which could be wired to the controller 804 in which the controller 804 would not perform controlling operations if the emergency stop is indicated. The controller 812 also can provide a signal to the controller 804 to indicate the start of injection based on physical characteristics of the injection molding machine. This signal is to remain high until the end of injection and pack. Accordingly, the controller 804 can use this "start of injection" signal to begin control according to the target profiles. For example, the rising edge of the start of injection signal can indicate to the controller 804 that the start of injection has begun.

A start of injection signal can also be provided to controller 804 by a linear position transducer 820 indicating that the screw 809 is in a position in which injection has begun. Another way to provide a start of injection signal is to measure the pressure of the material in the machine nozzle 11 by a pressure transducer 820 coupled to controller 804. Basing the start of injection signal on these physical readings associated with the injection molding machine can insure that adequate pressure is being supplied to the manifold when the controller 804 begins executing the target profiles.

It is also desirable to provide an end of injection signal to the controller 804. One way to provide such a signal is to detect the falling edge of the injection molding machine "on" signal described above. The end of injection signal can also be indicated by the rising edge of an "injection molding machine injection complete" signal provided by controller 812. Lastly, the controller 804 itself can provide an end of injection signal, when all profiles have been completed. Thus, the end of injection signal is used to indicate to either the injection molding machine 806, the controller 804 or both, that the injection process is completed and all injection functionality should be discontinued.

The injection molding machine 812 can also provide a signal to the controller 804 that the injection molding machine has transitioned from "injection pressure" to "pack pressure." According to one embodiment, controller 804 can use this signal to determine when the injection molding machine is transitioning and determine if said transitioning is prior to the target profiles transitioning to a pack pressure. This early transitioning of the injection molding machine can result in a cavity or cavities not filling entirely. Thus, controller 804 could use this signal to generate a warning message via operator interface 805 if early transitioning occurs.

The injection molding machine controller 812 can also provide a signal to the controller 804 that the injection molding machine has reached the end of its injection forward sequence (i.e., that the screw 809 has reached its forward-most position). The controller 804 could use this signal to alert an operator via operator interface 805 if the injection molding machine has stopped injecting before all of the target profiles have been completed. This signal can also be used to indicate that cycle times are not being minimized if the injection molding machine is still injecting after the controller 804 has completed all target profiles during the injection cycle.

The injection molding machine controller 812 may also provide a signal as to when the pre-decompression (when the screw 809 is reset prior to plastication), or decompression (when the screw 809 is reset after plastication), is complete. The signal can be used to indicate when the controller 804 can close valve pins 41(*a*) and 41(*b*) (i.e., withdraw the valve pins 41(*a*) and 41(*b*) until the manifold channels are closed) to be in position for the next injection cycle. If this signal is not provided, the controller will simply set a period of time from the end of the injection cycle to close the valve pins 41(*a*) and 41(*b*).

The controller 804 also can communicate signals to the injection molding machine controller 812. The controller output interface 805 can also include an emergency stop as described above with respect to the injection molding machine. This emergency stop signal can be sent to the controller 812 and will act to halt the injection molding machine. The controller 804 can also provide a signal indicating to the controller 812 that the controller 804 is resident and must be interfaced with. The signal can be carried, for example, by a jumper cable connecting both controllers. The jumper will complete an input circuit with the injection molding machine indicating that the controller 804 is resident.

The controller 804 can also provide a "ready" signal to controller 812 indicating that the hydraulic power source 808 is ready and that no alarms are present that would inhibit injection.

Controller 804 can also provide a signal to controller 812 indicating that all target profiles being executed by controller 804 have transitioned from the fill stage of injection to the pack and hold stage. In one embodiment, the injection molding machine uses the signal to unload the high volume pumps no longer necessary in the pack and hold stages. Another use of the signal is to trigger the start of gas injection for a gas assist application. The target profile of the injection cycle would end after injection of melt material after which gas is used to pack up the part.

The controller 804 can also provide a signal indicating that all the target profiles have been completed. The signal can then be used to abort the injection molding machine cycle and thus reduce wasted cycle time. This signal can also be used to indicate that cycle times are not being minimized if the injection molding machine is still injecting after the target profiles are completed. Accordingly, this information could be used to reset the injection molding machine cycle time. Controller 804 can also provide a signal to the injection molding machine indicating that there was a control problem during the injection cycle and therefore a high likelihood that the parts could be faulty.

The system 800 also includes cavity pressure transducers 824 and 826. These transducers provide useful information related to the molding process. The transducers can be used to monitor and display cavity pressure via pressure profile curves for each control zone. This information can be used for trouble shooting to determine if any process changes have occurred. The information can also be used for statistical process control to ensure that the process stays within determined operating limits. For example, pressure readings from these pressure transducers can establish acceptance criteria for peak pressure, pack pressure, average pressure, area under the pressure curve, or other pressure values during the injection cycle. Parts created during a cycle in which these criteria were not met can be rejected, or at least a notification can be generated at the operator interface 805 to warn the operator.

The use of cavity transducers 824 or 826 provides greater control of the process. For example, if one of the transducers consistently registers too high or too low a pressure at a particular point in the injection cycle, the target profile associated with that control zone can be altered accordingly, using operator interface 805. This can be especially useful in a large part having multiple gates. Placing cavity transducers at multiple points along the cavity provides information on how the part fills during the process and, if the part is not filling properly, on which target profiles of which control zones should be altered and how they should be altered.

Transducers 824 and 826 can also be used to trigger switchover in the target profiles (and/or the injection molding machine) from injection pressure to pack pressure. In the embodiments described above switchover from injection pressure to pack pressure is determined by the target profiles according to time, however, using the pressure transducers, a set point pressure can be established at which time the target profile switches to the "pack" area of the profile, independent of time. This can be done for each target profile separately, as there would be a cavity pressure transducer associated with each control zone. This variable can also be used to control when the injection molding machine switches from injection pressure to pack pressure.

Switchover can also be controlled by placing transducers at either end of cavity 5. When the pressure transducers detect material pressure at the end of the cavity, the controller 804 can switch the control zone (or zones) associated with that end of the cavity to the "pack" portion of the target profile. This method of controlling "switchover" can account for variations in material viscosity which can cause the part to fill more quickly or slowly, thus, making a time-based "switchover" inexact.

Figure 35:
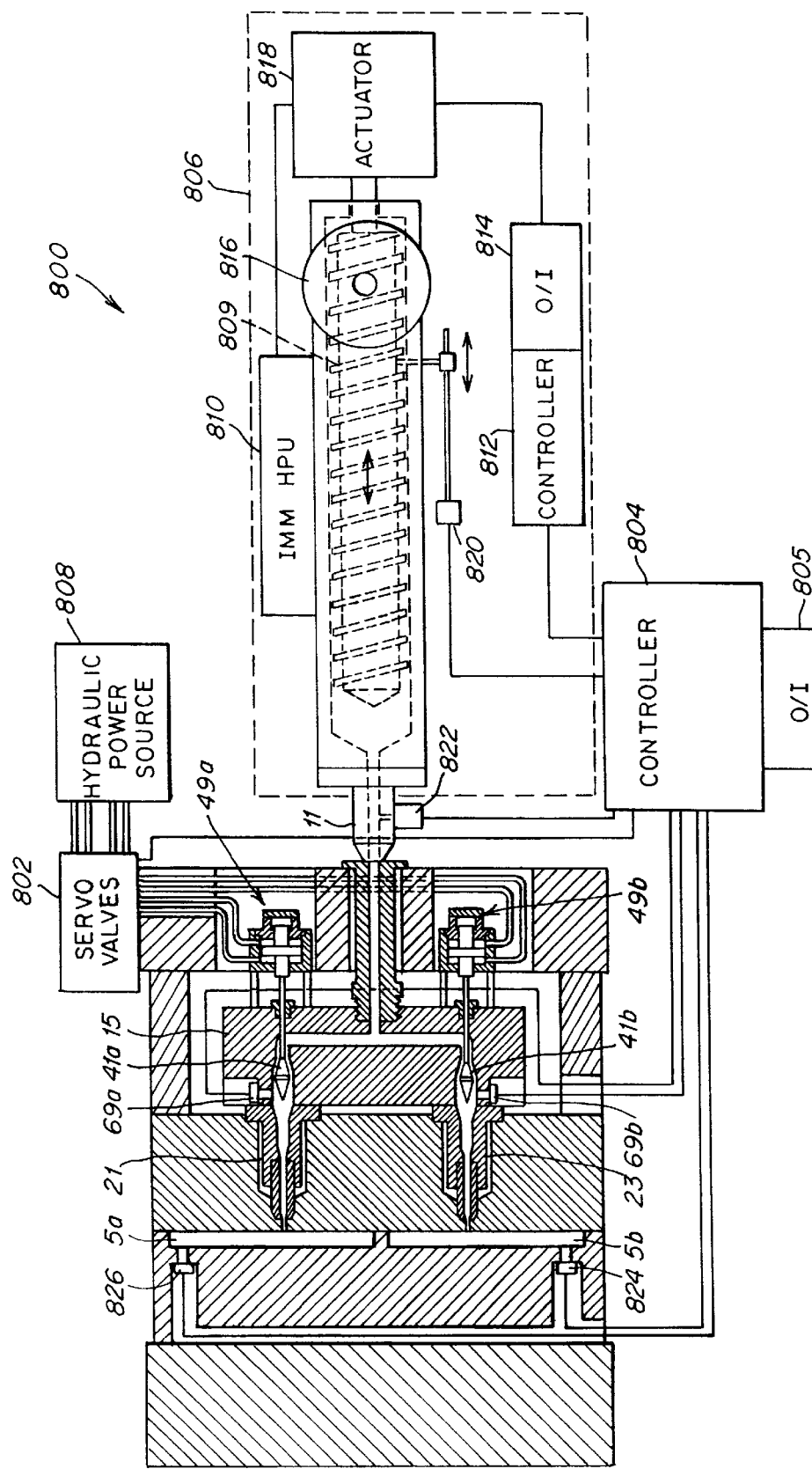
FIG. 35 is an alternative embodiment of the injection molding system of FIG. 32 in which the cavity pressure transducers 824 and 826 are located at the end of two mold cavities 5a and 5b.

Controlling "switchover" is also useful in multiple cavity applications, as shown in FIG. 35. In a mold have multiple like cavities 5a and 5b, ideally the controller 804 would "switchover" each control zone (one for each cavity when each cavity has a single gate) from injection to pack at the same point in time during the injection cycle. Material and flow variations in the multiple cavities, however, may cause the filling rates to be slightly different from one cavity to the next. Using a pressure transducer in each cavity 5a and 5b to trigger switchover independently for each control zone, as described above, compensates for these variations and can improve the repeatability of the process. Alternatively, the cavity pressure transducer can be used to "tweak" each target profile to create uniform cavity pressure readings (and uniform parts) from each cavity. In the multi-cavity application the pressure transducer can be located adjacent the gate similarly to FIG. 32, or at an end of each cavity 5a and 5b as shown. As described above, either location can be used to control switchover.

The cavity pressure transducers can also be used to determine the end of the pack period, unlike previous embodiments in which the profile itself dictates the end of pack at a particular time after the start of injection. Again referring to FIG. 35, transducers located at the end of the cavities 5a and 5b, can be used to determine the end of the pack period for individual cavities (or a single cavity) by indicating when the pressure at the end of the cavity reaches a particular value during pack indicating that the part is filled. Thus, the end of pack can be independently set in each control zone according to when a particular pressure is detected. If an extended valve pin is used (see FIGS. 11–15), the valve pins can be closed according to this pressure-based end of pack determination. The use of pressure to determine end of pack ensures consistent part weight by compensating for flow variations within the cavity or cavities which may change from shot to shot.

For cascade molding, cavity pressure transducers can be used to indicate the arrival of the material flow front at a gate downstream of the initial gate opened. Once the flow front is past the downstream gate, the cavity pressure transducer will see a rise in pressure. The controller 804 can then start the injection at the next gate based on a determined pressure set point measured by the cavity pressure transducer.

As shown in FIG. 32, the controller 804 also interfaces with machine nozzle pressure transducer 822. As explained above, this pressure can be used by the controller 804 to start the target profiles, and also be used to ensure that the supply pressure is high enough to run the process. If the injection molding machine 806 is supplying an inadequate pressure, a signal could be generated by the controller 804 and displayed on the operator interface 805.

The controller also interfaces with a linear transducer 820 that measures the position of the ram 809 and can be used as an indicator of the volume of material injected into the part. "Switchover" from injection pressure to pack pressure in both the target profiles and the injection molding machine (described above) can also be based on a set point value associated with linear transducer 820 indicating that the proper volume of material has been injected into the mold.

Figure 33:
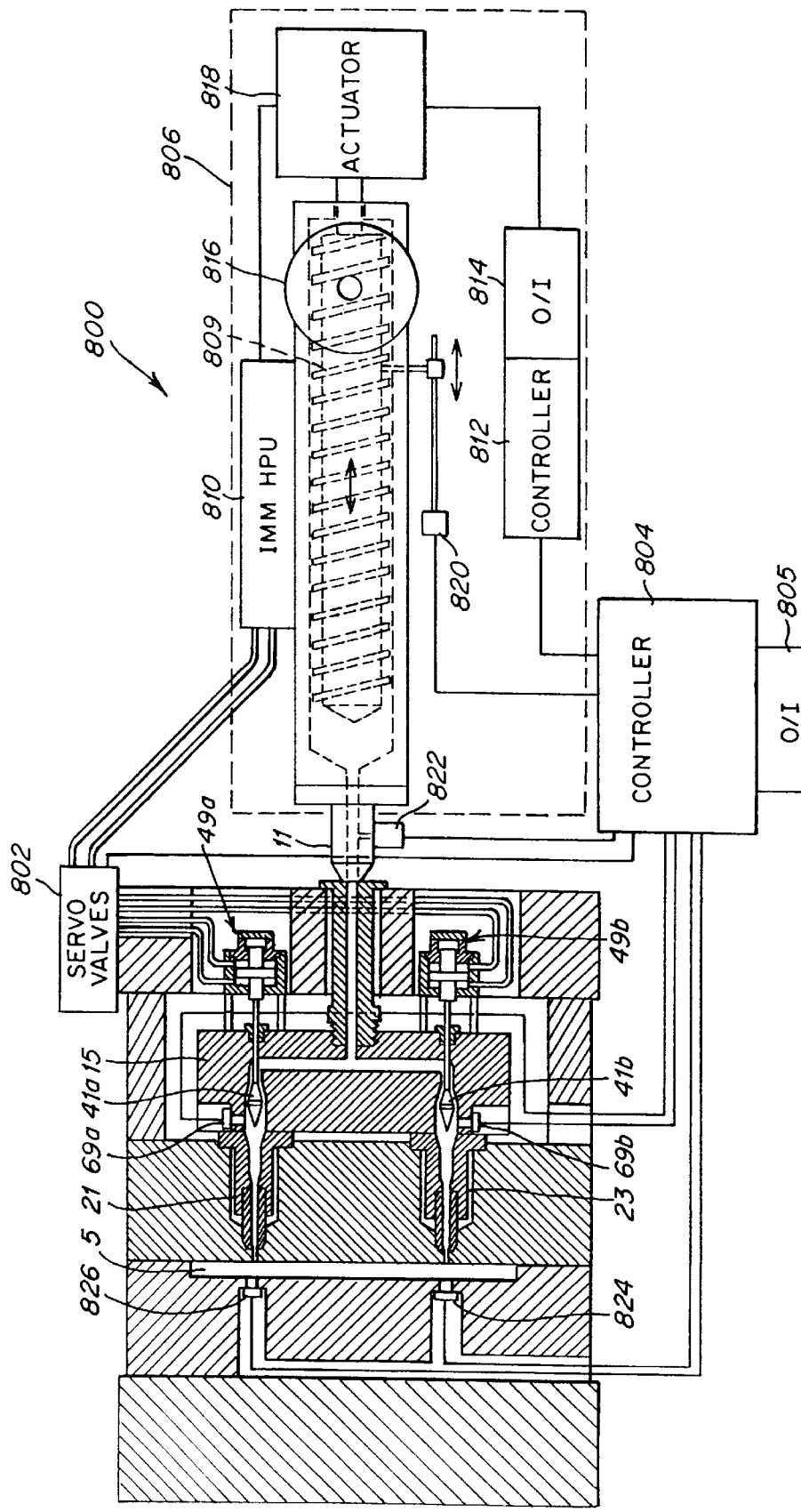
FIG. 33 is an alternative embodiment of the system of FIG. 32 in which the hydraulic power source associated with the servo valves 802 has been integrated with the injection molding machine hydraulic power unit.

FIG. 33 shows an alternative embodiment similar to the system shown in FIG. 32. In this embodiment, however, the hydraulic power source 808 has been eliminated and servo valves 802 are connected directly to the injection molding machine hydraulic power unit 810. Thus, hydraulic power to servo valves 802 used to manage the flow of pressurized fluid to actuators 49(a) and 49(b) comes directly off the injection molding machine power unit 810, and this configuration saves the expense of having a separate power source 808 to supply servo valves 802. The system is the same as the system shown in FIG. 32 in all other respects.

Several other alternative configurations are possible with respect to FIG. 33. For example, an accumulator (not shown) can also be connected to the hydraulic power unit 810 to ensure a steady supply of pressurized fluid to servo valves 802 of which there is a single servo valve for each actuator 49(a) and 49(b). Also, the servo valve 802 may be mounted to the injection molding machine directly or to the mold as shown.

Figure 34:
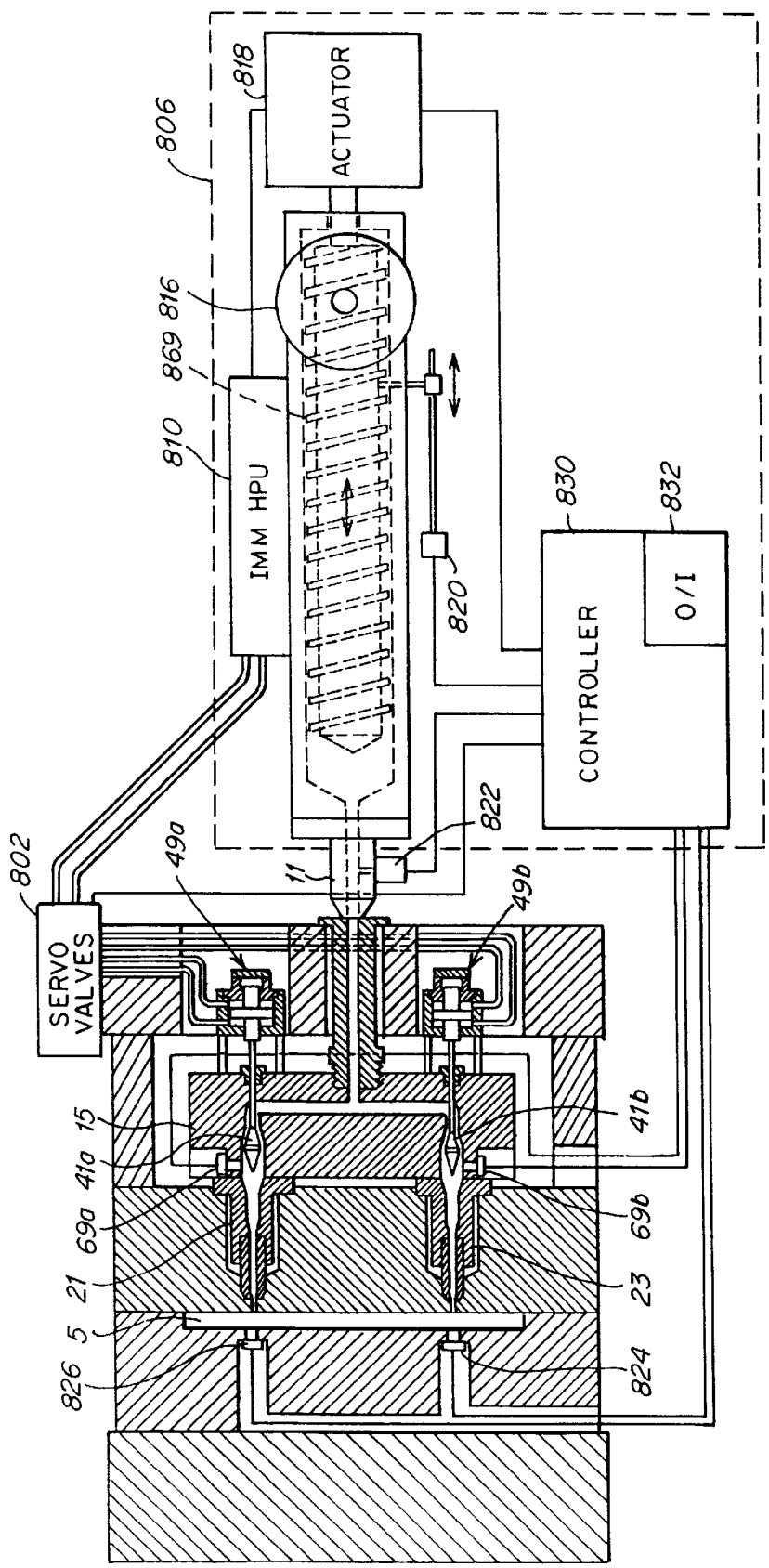
FIG. 34 is an alternative embodiment of the injection molding systems shown in FIGS. 32 and 33 in which the controller 804 and operator interface 805 have been integrated in the injection molding machine controller 830 and interface 832.

FIG. 34 shows another alternative embodiment of a injection molding system similar to the system shown in FIG. 33. In FIG. 34, however, the controller 804 and operator interface 805 has been integrated as part of the injection molding machine controller 830 and 832. Controller 830 and operator interface 832 perform the functions of controllers 804, 812, and operator interfaces 805 and 814 of FIGS. 32 and 33. This integration simplifies the system and reduces the hardware in the system.

The integration can be performed by simply mounting the programmable controller described above within controller 804 into the injection molding machine control cabinet which contains controller 812. In such a case the input and output functions performed by controller 804 would still be performed by the same PLC. Alternatively, a single PLC or other type of controller can be used to interface all injection molding machine controller functions and functions performed by controller 804. The operator interface 832 performs the functions of both operator interfaces 805 and 814 of FIGS. 32 and 33 and interfaces directly with the PLC that controls servo valves 802 for menus, set-up displays of process readings, and other functions.

The hydraulics in FIG. 34 are the same as in FIG. 33 with servo valves 802 being supplied hydraulic power by injection molding machine hydraulic power unit 810. Alternatively, separate hydraulic power sources can be used as shown in FIG. 32.

Figure 36:
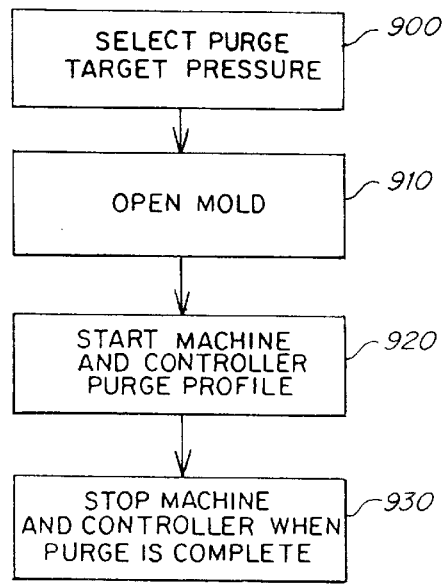
FIG. 36 is a flow chart depicting an illustrative embodiment of a method of open mold purging.

FIG. 36 shows a flow chart representing a method of open-mold purging according to another embodiment of the invention. To effect a material change when molding (e.g., a change in material color, grade, type, etc.), it is usually necessary to purge the injection molding system, including the manifold and the injection nozzles, of the material currently be used. Two methods of purging are generally known. One method is to simple change materials and mold parts until the previous material is completely purged. This method, however, can be time consuming and therefore costly, since it requires running repeated injection cycles.

The second method is called "open-mold" purging. As the name indicates, in open-mold purging, the mold is opened, and the injection molding machine screw is run "manually" as a non-reciprocating extruder while the injected material is flushed through the manifold and nozzles and into the area separating the open mold halves. This method of purging the injection molding system is faster, and therefore less costly, than running repeated injection cycles.

In a typical valve-gated injection molding application, the valve pin is simply moved into the retracted "open" position (as it is during an injection cycle), the mold is opened, and the injection molding machine screw is turned on. In a thermal-gate application having no valve pin, purging is accomplished simply by opening the mold and turning on the injection molding machine screw.

In the flow-control applications described herein, purging can be more complicated due to the geometry of the various valve pins. The embodiment shown in FIGS. 1–5, utilizes a "reverse-taper" valve pin 41 to control the flow, but is a thermal-gate application because the pin does not close the gate. During open mold purging, the valve pin of this embodiment should be in a fully-forward position to permit the maximum flow of purge material through the system, so that purging can be accomplished as quickly and efficiently as possible.

Thus, to purge in a system that uses the type of valve pin shown in FIGS. 1–5, the servo valves that energize the actuator 49 to control the motion of the of the valve pin can be set in a fixed position that biases the pin fully forward. This can be accomplished by manually setting the servo valves, or by programming a pressure profile into the controller (PID1, PID2, CPU) having a high constant target pressure to cause the valve pin 41 to move into the fully forward position. For example, if the target pressure is set at 10,000 p.s.i., and the highest pressure that the injection molding machine can supply to the pressure transducers 69 (PS1 and PS2) is 7,500 p.s.i., the controller will signal the servo valves to cause the actuator 49 to move the valve pin fully forward, calling for an increase in pressure as dictated by the purge pressure profile.

In the case of the valve pin shown in FIGS. 13–15, the valve pin 200 has a reverse taper control surface 205, and has an extended section to close the gate. The difficulty with this type of pin design, as discussed above, is that if the pin moves too far forward, the end of the pin will begin to close the gate inadvertently. Thus, if the method of purging explained above with respect to the reverse taper thermal-gate valve pin of FIGS. 1–5 is used, the controller 210 will signal the actuator to keep moving the valve pin forward in an attempt to achieve the 10,000 p.s.i. target pressure (which, as stated above, is higher than the maximum pressure supplied at transducer 217), until the pin inadvertently closes the gate. To avoid this problem the method of open mold purging depicted in the flow chart of FIG. 36 has been created to enable the system to achieve a maximum purge flow while preventing the valve pin from closing the gate.

Figure 37:
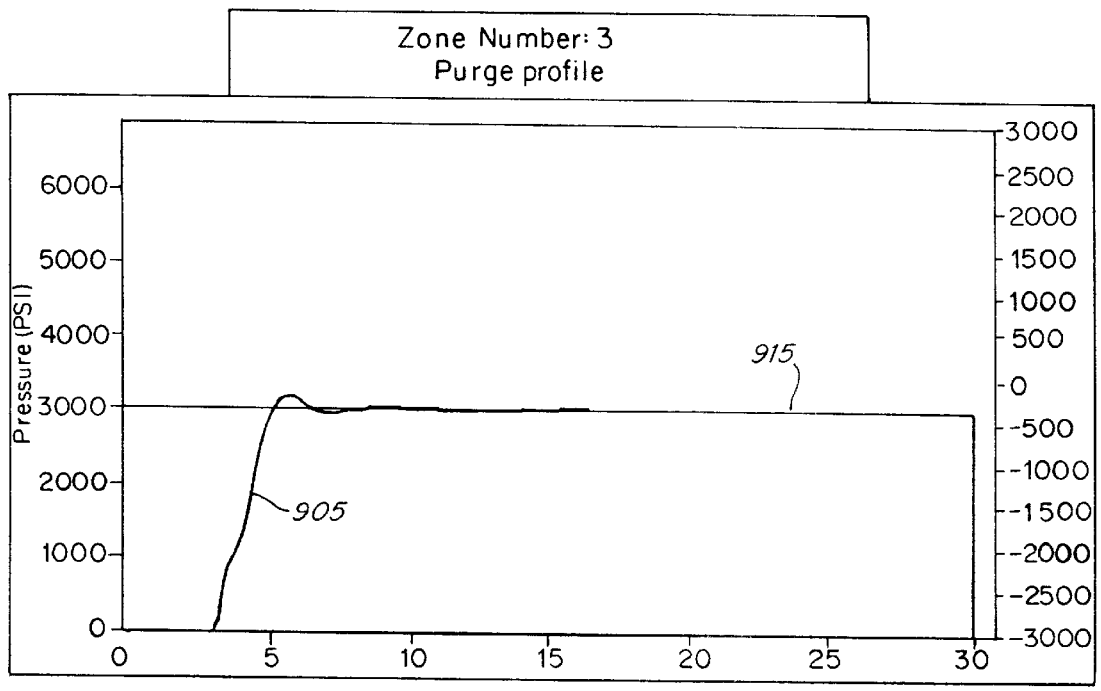
FIG. 37 is a representation of a screen icon generated on interface 214, showing actual and target purge pressure profile traces.

According to the foregoing preferred method of open mold purging, in step 900 the user selects a target purge pressure profile. This is performed similarly to the manner in which a user selects a target pressure profile during an injection cycle when molding parts, as explained above with reference to FIGS. 17 and 18 (edit and select profile figures). The purge profile, however, is typically a rectangular profile having a constant pressure setpoint, as shown in FIG. 37 (target purge pressure of 3,000 p.s.i.). The target pressure value is selected so that the valve pin is as close to a "fully forward" position as possible, without the end 227 of the valve pin being in a position to hinder or close flow through the gate.

Thus, in step 900, the pressure should be selected to be significantly lower than the machine delivery pressure to prevent continued forward movement from the valve pin, yet high enough so that the control gap 207 between the pin and the manifold does not substantially restrict the flow of purge material. Of course, the ideal target value of pressure will be different from machine to machine, application to application, and material to material, thus, different target values may have to tested to determine what value will work for a particular application. By way of example, a target purge pressure of 3,000 p.s.i. has been shown to work for a machine delivering 15,000 p.s.i. to a manifold having four injection nozzles coupled thereto. FIG. 37 depicts a screen icon displayed on interface 214 that shows the actual pressure 905 sensed by the transducers 217 tracking the target purge pressure 915, which is a rectangular constant pressure profile.

The target purge pressure is entered via a graphical user interface icon similar to those shown in FIGS. 17 and 18, which preferably enables the user to select a "purge" mode, and which then prompts the user to select a purge pressure. After selecting a desired target purge pressure, the mold is opened in step 910. In step 920, purging begins by starting the injection molding machine in manual non-reciprocating extruder mode.

Preferably, the injection molding machine provides the controller 210 with a start of injection signal, with which, upon receipt, the controller begins to control the valve pin to yield the target purge pressure. Some machines, however, do not provide such a signal when the mold is opened and the machine is run in manual mode as an extruder. Thus, in such a case the user can manually start both the injection molding machine and instruct the controller to begin purge mode.

Unlike a normal injection cycle in which a part is being molded, the timing between the machine and the controller is not critical, as the purge time is not preset and is determined by the machine operator. For example, flow-control by the controller 210 can begin before the machine starts injection. In such a case, the pin will travel fully forward and close the gate in attempting to attain the target purge pressure. One the machine begins injection, the pressure detected by the transducer 217 will quickly become higher than the target purge pressure because the gate is closed, and controller will cause the pin to retract to reduce the pressure and track the target purge pressure. The profile in FIG. 37 shows this method, as the profile indicates that the controller began reading pressure values before the machine has been turned on, resulting in a several millisecond period that the actual pressure 905 is zero prior to the machine is turned on. Thus, purging is accomplished despite the fact that the timing between the injection molding machine and the controller is not exact.

Another way to time the start of injection and the start of flow control according to the purge target profile, is to move the valve pins forward to close the gate when the operator selects purge mode. Typically, when the controller begins to control according to a target profile, the pins are fully retracted, and move forward when the profile calls for an increase in pressure. By moving the pins forward prior to injection, the start of flow control can be triggered when the pressure transducers detect a particular pressure, e.g., 200 p.s.i. When the pressure is detected the controller will begin flow control according to the purge profile, and will cause the valve pin to be retracted to lower the pressure, since the pressure will quickly rise above the purge pressure with the gates closed. Thus, using this alternate method of beginning purging, flow control will begin at substantially the same time as machine injection, but requires the additional functionality of the controller moving the pins to close the gate when the operator selects the purge routine.

In step 930 the operator stops the purge routine by turning off the machine and ending the purge control profile. The operator makes this determination based on experience and inspection of the material. Accordingly, when the controller 210 is executing the purge profile, a "stop purge" button is displayed on the graphical user interface so that the operator can end the purge routine being executed by the controller by pressing a single button. The controller will instruct the actuator to retract the pins to the starting position when the operator stops the purge routine. At this time the injection molding machine can be returned to automatic mode, a target profile can be programmed into the controller, and parts can be molded using the new material.

It should be understood that usually the purge routine will be carried out for all injection nozzles coupled to the manifold, and that the purge pressures are the same for each nozzle. However, as described herein, the pressure profiles for each nozzle are independently profitable, thus, different purge pressures can be chosen for different nozzles, and all nozzles need not be purged at the same time, i.e., the gate to one or more nozzles can remain closed while the remaining nozzles are purged.

Having thus described certain embodiments of the present invention, various alterations, modifications, and improvements will readily occur to those skilled in the art. Such alterations, modifications, and improvements are intended to be within the spirit and scope of the invention. For example, in the embodiments shown in FIGS. 31–33, although only two gates are shown to a single cavity 5, more gates (and associated nozzles, valve pins, actuators and servo valves, i.e., control zones) may be used which gate into one or more cavities.

Additionally, servo valves 802 are shown in FIGS. 32–35 (and previous embodiments), however, the invention is not so limited and other types of valves such as proportional valves may be used. Also, although hydraulic actuators 49a and 49b are used in FIGS. 32–35 (and previous embodiments), pneumatic or electronic actuators can be used to control the valve pins (for example, the electronic actuators disclosed in co-pending patent application Ser. No. 09/187,974 entitled ELECTRONIC ACTUATOR FOR PIN). Thus, the invention is not limited to a particular type of actuator. Further still, although a hydraulic-powered injection molding machine is shown in FIGS. 32–35, the invention is not limited to a particular type of injection molding machine. For example, an electronic injection molding machine could be used.

Accordingly, the foregoing description is by way of example only, and not intended to be limiting. The invention is limited only as defined in the following claims and the equivalents thereof.

What is claimed is:

1. A method of open-mold purging in an injection molding system including a manifold to receive material injected from an injection molding machine, comprising the steps of:
   (A) selecting a target purge pressure;
   (B) injecting material from the injection molding machine into the manifold; and
   (C) controlling the purge pressure to substantially track the target purge pressure; wherein the purge pressure is controllable between the injection molding machine and the gate independently from the injection molding machine pressure.

2. The method of claim 1, wherein step (A) includes selecting a target purge pressure that is greater than the pressure supplied by the injection molding machine.

3. The method of claim 1, wherein step (A) includes selecting a target purge pressure that is less than the pressure supplied by the injection molding machine.

4. The method of claim 1, wherein step (C) is performed inside the manifold.

5. The method of claim 1, wherein step (C) is performed inside an injection nozzle.

6. An injection molding system comprising:
   a mold;
   an injection molding machine;
   a manifold; and
   a controller used to control open mold purging of the manifold, wherein the controller controls a pressure of material used to purge the manifold, independently from the injection molding machine injection pressure and between the injection molding machine and the gate.

7. The injection molding system of claim 6, wherein the controller controls the pressure of material based on a selected target purge pressure.

8. An injection molding system comprising:
   a manifold to deliver material into a mold that is injected into the manifold from an injection molding machine; and
   a controller used to control open mold purging of the manifold, the controller to control a pressure of material used to purge the manifold, independently from the injection molding machine injection pressure and between the injection molding machine and the gate.

9. The injection molding system of claim 8, wherein the controller controls the purge pressure using a valve pin.

10. The injection molding system of claim 8, wherein the controller controls the purge pressure inside the manifold.

* * * * *